(12) United States Patent
Abdelazim et al.

(10) Patent No.: US 12,448,442 B2
(45) Date of Patent: Oct. 21, 2025

(54) TREATMENT OF T CELL LYMPHOMA

(71) Applicant: INNATE PHARMA, Marseilles (FR)

(72) Inventors: Hatem Abdelazim, Marseilles (FR); Carine Paturel, Marcy l'Etoile (FR)

(73) Assignee: INNATE PHARMA, Marseilles (FR)

( * ) Notice: Subject to any disclaimer, the term of this patent is extended or adjusted under 35 U.S.C. 154(b) by 821 days.

(21) Appl. No.: 17/381,418

(22) Filed: Jul. 21, 2021

(65) Prior Publication Data

US 2021/0355213 A1 Nov. 18, 2021

Related U.S. Application Data

(63) Continuation of application No. PCT/EP2020/051234, filed on Jan. 20, 2020.

(60) Provisional application No. 62/795,194, filed on Jan. 22, 2019.

(51) Int. Cl.
| | | |
|---|---|---|
| A61P 35/00 | (2006.01) | |
| A61K 31/282 | (2006.01) | |
| A61K 31/7068 | (2006.01) | |
| A61K 39/395 | (2006.01) | |
| C07K 16/28 | (2006.01) | |
| G01N 33/574 | (2006.01) | |
| A61K 39/00 | (2006.01) | |

(52) U.S. Cl.
CPC ........ *C07K 16/2803* (2013.01); *A61K 31/282* (2013.01); *A61K 31/7068* (2013.01); *A61K 39/39558* (2013.01); *A61P 35/00* (2018.01); *G01N 33/57426* (2013.01); *A61K 2039/505* (2013.01); *C07K 2317/732* (2013.01); *G01N 2333/70503* (2013.01)

(58) Field of Classification Search
CPC .......... C07K 16/2803; C07K 2317/732; A61P 35/00; A61K 31/282; A61K 31/7068; A61K 39/39558; A61K 2039/505; G01N 33/57426; G01N 2333/70503
See application file for complete search history.

(56) References Cited

U.S. PATENT DOCUMENTS

| | | |
|---|---|---|
| 7,399,595 B2 | 7/2008 | Bensussan et al. |
| 7,919,085 B2 | 4/2011 | Bensussan et al. |
| 8,268,308 B2 | 9/2012 | Bensussan et al. |
| 8,518,655 B2 | 8/2013 | Bensussan et al. |
| 9,181,341 B2 | 11/2015 | Anfosi et al. |
| 9,828,427 B2 | 11/2017 | Anfosi et al. |
| 10,174,112 B2 | 1/2019 | Bonnafous et al. |
| 10,246,510 B2 | 4/2019 | Gauthier et al. |
| 10,280,222 B2 | 5/2019 | Gauthier et al. |
| 10,577,419 B2 | 3/2020 | Gauthier et al. |
| 11,066,470 B2 | 7/2021 | Gauthier et al. |
| 11,078,275 B2 | 8/2021 | Bonnafous et al. |
| 11,848,990 B2 | 12/2023 | Bogatin et al. |
| 2016/0002345 A1 | 1/2016 | Bonnafous et al. |
| 2018/0291102 A1 | 10/2018 | Gaulard et al. |
| 2019/0248895 A1 | 8/2019 | Paturel et al. |
| 2020/0199228 A1 | 6/2020 | Gauthier et al. |
| 2021/0087270 A1 | 3/2021 | Paturel et al. |
| 2021/0340254 A1 | 11/2021 | Gauthier et al. |
| 2021/0363248 A1 | 11/2021 | Bonnafous et al. |

FOREIGN PATENT DOCUMENTS

| | | | |
|---|---|---|---|
| WO | WO 2014/044686 | 3/2014 | |
| WO | WO-2015136052 A1 * | 9/2015 | ....... A61K 39/39533 |
| WO | WO 2018/073363 | 4/2018 | |

OTHER PUBLICATIONS

Guo et al (Efficacy of gemcitabine combined with oxaliplatin, L-asparaginase and dexamethasone in patients with newly-diagnosed extranodal NK/T-cell lymphoma, Molecular and Clinical Oncology 2: 1172-1176) (Year: 2014).*
Rudikoff et al. (Proceedings of the National Academy of Sciences, 1982, 79:1979-1983) (Year: 1982).*
MacCallum et al. (Journal of Molecular Biology, 1996, 262:732-745) (Year: 1996).*
Casset et al. (Biochemical and Biophysical Research Communications, 2003, 307:198-205) (Year: 2003).*
Holm et al. (Molecular Immunology, 2007:1075-1084) (Year: 2007).*
Chen et al. (Journal of Molecular Biology, 1999, 293:865-881) (Year: 1999).*
Berenbaum et al (Synergy, additivism and antagonism in immunosuppression, Clin. Exp. Immunol., 28, pp. 1-18, 1977) (Year: 1977).*
Weisenthal et al (Synergy analysis of "classic" and newer drug combinations, http://weisenthal.org/synergy1.htm, 2012) (Year: 2012).*
Cheminant, M. et al. "157. KIR3DL2 is Expressed in Peripheral T-Cell Lymphomas and May Be a Therapeutic Target" *Hematological Oncology*, 15th International Conference on Malignant Lymphoma Palazzo dei Congressi, Lugano, Switzerland, Jun. 18-22, 2019, pp. 204-205, vol. 37, Issue S2 Supplement, abstract.
Argnani, L. et al. "Cutaneous T-cell lymphomas: Focusing on novel agents in relapsed and refractory disease" *Cancer Treatment Reviews*, Oct. 28, 2017, pp. 61-69, vol. 61.
Marie-Cardine, A. et al. "IPH4102, a Humanized KIR3DL2 Antibody with Potent Activity against Cutaneous T-cell Lymphoma" *Cancer Research*, Nov. 1, 2014, pp. 6060-6070, vol. 74, No. 21.
Marin-Acevedo, J. A. et al. "Next generation of immune checkpoint therapy in cancer: new developments and challenges" *Journal of Hematology & Oncology*, 2018, pp. 1-20, vol. 11, No. 39.
Prince, H. M. et al. "Integrating novel systemic therapies for the treatment of mycosis fungoides and Sézary syndrome" *Best Practice & Research Clinical Haematology*, Jul. 18, 2018, pp. 322-335, vol. 31, No. 3.

(Continued)

*Primary Examiner* — Nelson B Moseley, II
*Assistant Examiner* — Dennis J Sullivan
(74) *Attorney, Agent, or Firm* — SALIWANCHIK, LLOYD & EISENSCHENK

(57) ABSTRACT

The present invention relates to methods for the treatment of T cell lymphomas using compounds that specifically bind KIR3DL2 in combination with chemotherapeutic agents, notably gemcitabine and/or oxaliplatin. The treatments are particularly useful in the treatment of peripheral T cell lymphomas, for example PTCL-NOS.

12 Claims, 3 Drawing Sheets

Specification includes a Sequence Listing.

(56) References Cited

OTHER PUBLICATIONS

Yao, Y.-Y. et al. "Retrospective Study of Pegaspargase, Gemcitabine, Oxaliplatin and Dexamethasone (Peg-GemOD) as a First-Line Therapy for Advanced-Stage Extranodal NK/T Cell Lymphoma" *Indian J Hematol Blood Transfus.*, Jan.-Mar. 2017, pp. 74-81, vol. 33, No. 1.
Written Opinion in International Application No. PCT/EP2020/051234, Apr. 23, 2020, pp. 1-7.
Claims pending in U.S. Appl. No. 18/285,668, filed Oct. 5, 2023, p. 1.
Claims pending in U.S. Appl. No. 18/396,776, filed Oct. 5, 2023, pp. 1-3.

\* cited by examiner

SEQUENCE LISTING

```
<160> NUMBER OF SEQ ID NOS: 70

<210> SEQ ID NO 1
<211> LENGTH: 434
<212> TYPE: PRT
<213> ORGANISM: homo sapiens

<400> SEQUENCE: 1

Leu Met Gly Gly Gln Asp Lys Pro Phe Leu Ser Ala Arg Pro Ser Thr
1               5                   10                  15

Val Val Pro Arg Gly Gly His Val Ala Leu Gln Cys His Tyr Arg Arg
            20                  25                  30

Gly Phe Asn Asn Phe Met Leu Tyr Lys Glu Asp Arg Ser His Val Pro
        35                  40                  45

Ile Phe His Gly Arg Ile Phe Gln Glu Ser Phe Ile Met Gly Pro Val
    50                  55                  60

Thr Pro Ala His Ala Gly Thr Tyr Arg Cys Arg Gly Ser Arg Pro His
65                  70                  75                  80

Ser Leu Thr Gly Trp Ser Ala Pro Ser Asn Pro Leu Val Ile Met Val
                85                  90                  95

Thr Gly Asn His Arg Lys Pro Ser Leu Leu Ala His Pro Gly Pro Leu
            100                 105                 110

Leu Lys Ser Gly Glu Thr Val Ile Leu Gln Cys Trp Ser Asp Val Met
        115                 120                 125

Phe Glu His Phe Leu His Arg Asp Gly Ile Ser Glu Asp Pro Ser
    130                 135                 140

Arg Leu Val Gly Gln Ile His Asp Gly Val Ser Lys Ala Asn Phe Ser
145                 150                 155                 160

Ile Gly Pro Leu Met Pro Val Leu Ala Gly Thr Tyr Arg Cys Tyr Gly
                165                 170                 175

Ser Val Pro His Ser Pro Tyr Gln Leu Ser Ala Pro Ser Asp Pro Leu
            180                 185                 190

Asp Ile Val Ile Thr Gly Leu Tyr Glu Lys Pro Ser Leu Ser Ala Gln
        195                 200                 205

Pro Gly Pro Thr Val Gln Ala Gly Glu Asn Val Thr Leu Ser Cys Ser
    210                 215                 220
```

-continued

```
Ser Trp Ser Ser Tyr Asp Ile Tyr His Leu Ser Arg Glu Gly Glu Ala
225                 230                 235                 240

His Glu Arg Arg Leu Arg Ala Val Pro Lys Val Asn Arg Thr Phe Gln
            245                 250                 255

Ala Asp Phe Pro Leu Gly Pro Ala Thr His Gly Gly Thr Tyr Arg Cys
        260                 265                 270

Phe Gly Ser Phe Arg Ala Leu Pro Cys Val Trp Ser Asn Ser Ser Asp
    275                 280                 285

Pro Leu Leu Val Ser Val Thr Gly Asn Pro Ser Ser Ser Trp Pro Ser
290                 295                 300

Pro Thr Glu Pro Ser Ser Lys Ser Gly Ile Cys Arg His Leu His Val
305                 310                 315                 320

Leu Ile Gly Thr Ser Val Val Ile Phe Leu Phe Ile Leu Leu Leu Phe
                325                 330                 335

Phe Leu Leu Tyr Arg Trp Cys Ser Asn Lys Lys Asn Ala Ala Val Met
            340                 345                 350

Asp Gln Glu Pro Ala Gly Asp Arg Thr Val Asn Arg Gln Asp Ser Asp
        355                 360                 365

Glu Gln Asp Pro Gln Glu Val Thr Tyr Ala Gln Leu Asp His Cys Val
    370                 375                 380

Phe Ile Gln Arg Lys Ile Ser Arg Pro Ser Gln Arg Pro Lys Thr Pro
385                 390                 395                 400

Leu Thr Asp Thr Ser Val Tyr Thr Glu Leu Pro Asn Ala Glu Pro Arg
                405                 410                 415

Ser Lys Val Val Ser Cys Pro Arg Ala Pro Gln Ser Gly Leu Glu Gly
            420                 425                 430

Val Phe

<210> SEQ ID NO 2
<211> LENGTH: 455
<212> TYPE: PRT
<213> ORGANISM: homo sapiens

<400> SEQUENCE: 2

Met Ser Leu Thr Val Val Ser Met Ala Cys Val Gly Phe Phe Leu Leu
1               5                   10                  15

Gln Gly Ala Trp Pro Leu Met Gly Gly Gln Asp Lys Pro Phe Leu Ser
            20                  25                  30

Ala Arg Pro Ser Thr Val Val Pro Arg Gly Gly His Val Ala Leu Gln
        35                  40                  45

Cys His Tyr Arg Arg Gly Phe Asn Asn Phe Met Leu Tyr Lys Glu Asp
    50                  55                  60

Arg Ser His Val Pro Ile Phe His Gly Arg Ile Phe Gln Glu Ser Phe
65                  70                  75                  80

Ile Met Gly Pro Val Thr Pro Ala His Ala Gly Thr Tyr Arg Cys Arg
                85                  90                  95

Gly Ser Arg Pro His Ser Leu Thr Gly Trp Ser Ala Pro Ser Asn Pro
            100                 105                 110

Val Val Ile Met Val Thr Gly Asn His Arg Lys Pro Ser Leu Leu Ala
        115                 120                 125

His Pro Gly Pro Leu Leu Lys Ser Gly Glu Thr Val Ile Leu Gln Cys
    130                 135                 140

Trp Ser Asp Val Met Phe Glu His Phe Leu Leu His Arg Glu Gly Ile
145                 150                 155                 160
```

-continued

Ser Glu Asp Pro Ser Arg Leu Val Gly Gln Ile His Asp Gly Val Ser
              165                 170                 175

Lys Ala Asn Phe Ser Ile Gly Pro Leu Met Pro Val Leu Ala Gly Thr
          180                 185                 190

Tyr Arg Cys Tyr Gly Ser Val Pro His Ser Pro Tyr Gln Leu Ser Ala
      195                 200                 205

Pro Ser Asp Pro Leu Asp Ile Val Ile Thr Gly Leu Tyr Glu Lys Pro
  210                 215                 220

Ser Leu Ser Ala Gln Pro Gly Pro Thr Val Gln Ala Gly Glu Asn Val
225                 230                 235                 240

Thr Leu Ser Cys Ser Ser Trp Ser Ser Tyr Asp Ile Tyr His Leu Ser
              245                 250                 255

Arg Glu Gly Glu Ala His Glu Arg Arg Leu Arg Ala Val Pro Lys Val
          260                 265                 270

Asn Arg Thr Phe Gln Ala Asp Phe Pro Leu Gly Pro Ala Thr His Gly
      275                 280                 285

Gly Thr Tyr Arg Cys Phe Gly Ser Phe Arg Ala Leu Pro Cys Val Trp
  290                 295                 300

Ser Asn Ser Ser Asp Pro Leu Leu Val Ser Val Thr Gly Asn Pro Ser
305                 310                 315                 320

Ser Ser Trp Pro Ser Pro Thr Glu Pro Ser Ser Lys Ser Gly Ile Cys
              325                 330                 335

Arg His Leu His Val Leu Ile Gly Thr Ser Val Val Ile Phe Leu Phe
          340                 345                 350

Ile Leu Leu Leu Phe Phe Leu Leu Tyr Arg Trp Cys Ser Asn Lys Lys
      355                 360                 365

Asn Ala Ala Val Met Asp Gln Glu Pro Ala Gly Asp Arg Thr Val Asn
  370                 375                 380

Arg Gln Asp Ser Asp Glu Gln Asp Pro Gln Glu Val Thr Tyr Ala Gln
385                 390                 395                 400

Leu Asp His Cys Val Phe Ile Gln Arg Lys Ile Ser Arg Pro Ser Gln
              405                 410                 415

Arg Pro Lys Thr Pro Leu Thr Asp Thr Ser Val Tyr Thr Glu Leu Pro
          420                 425                 430

Asn Ala Glu Pro Arg Ser Lys Val Val Ser Cys Pro Arg Ala Pro Gln
      435                 440                 445

Ser Gly Leu Glu Gly Val Phe
  450                 455

<210> SEQ ID NO 3
<211> LENGTH: 123
<212> TYPE: PRT
<213> ORGANISM: mus musculus

<400> SEQUENCE: 3

Gln Val Gln Leu Lys Glu Ser Gly Pro Gly Leu Val Ala Pro Ser Gln
1               5                   10                  15

Ser Leu Ser Ile Thr Cys Thr Val Ser Gly Phe Ser Leu Thr Ser Phe
              20                  25                  30

Gly Val His Trp Val Arg Gln Pro Pro Gly Lys Gly Leu Glu Trp Leu
          35                  40                  45

Gly Val Ile Trp Ala Gly Gly Ser Thr Asn Tyr Asn Ser Ala Leu Met
      50                  55                  60

Ser Arg Leu Ser Ile Ser Lys Asp Asn Ser Lys Ser Gln Val Phe Leu
65                  70                  75                  80

Lys Met Asn Ser Leu Gln Asn Asp Asp Thr Ala Met Tyr Tyr Cys Ala
                85                  90                  95

Arg Gly Asn Ser Asn His Tyr Val Ser Ser Phe Tyr Tyr Phe Asp Tyr
            100                 105                 110

Trp Gly Gln Gly Thr Thr Leu Thr Val Ser Ser
            115                 120

<210> SEQ ID NO 4
<211> LENGTH: 106
<212> TYPE: PRT
<213> ORGANISM: mus musculus

<400> SEQUENCE: 4

Asp Ile Gln Met Thr Gln Ser Pro Ser Ser Leu Ser Ala Ser Leu Gly
1               5                   10                  15

Gly Lys Val Thr Ile Thr Cys Lys Ala Ser Gln Asp Ile Asn Lys Tyr
            20                  25                  30

Ile Ala Trp Tyr Gln His Lys Pro Gly Lys Pro Arg Leu Leu Ile
            35                  40                  45

His Tyr Thr Ser Thr Leu Gln Pro Gly Ile Pro Ser Arg Phe Ser Gly
        50                  55                  60

Ser Gly Ser Gly Arg Asp Tyr Ser Phe Ser Ile Ser Asn Leu Glu Pro
65                  70                  75                  80

Glu Asp Ile Thr Thr Tyr Tyr Cys Leu Gln Tyr Asp Asn Leu Trp Thr
                85                  90                  95

Phe Gly Gly Gly Thr Lys Leu Glu Ile Lys
            100                 105

<210> SEQ ID NO 5
<211> LENGTH: 119
<212> TYPE: PRT
<213> ORGANISM: mus musculus

<400> SEQUENCE: 5

Gln Ile Gln Leu Val Gln Ser Gly Pro Glu Leu Lys Lys Pro Gly Glu
1               5                   10                  15

Thr Val Lys Ile Ser Cys Lys Ala Ser Gly Tyr Thr Phe Thr Asn Phe
            20                  25                  30

Gly Met Asn Trp Val Lys Gln Ala Pro Gly Lys Gly Leu Lys Trp Met
            35                  40                  45

Gly Trp Ile Asn Thr Tyr Thr Gly Glu Pro Thr Tyr Ala Asp Asp Phe
        50                  55                  60

Lys Gly Arg Phe Ala Phe Ser Leu Glu Thr Ser Ala Ser Thr Ala Tyr
65                  70                  75                  80

Leu Gln Ile Asn Asn Leu Lys Asn Glu Asp Met Ala Thr Tyr Phe Cys
                85                  90                  95

Ala Arg Asn Gly Asn Phe Gly Tyr Tyr Phe Asp Tyr Trp Gly Gln Gly
            100                 105                 110

Thr Thr Leu Thr Val Ser Ser
            115

<210> SEQ ID NO 6
<211> LENGTH: 112
<212> TYPE: PRT
<213> ORGANISM: mus musculus

<400> SEQUENCE: 6

-continued

Asp Val Leu Met Thr Gln Thr Pro Leu Ser Leu Pro Val Ser Leu Gly
1               5                   10                  15

Asp Gln Ala Ser Phe Ser Cys Arg Ser Ser Gln Asn Ile Val His Ser
            20                  25                  30

Asn Gly Asn Thr Tyr Leu Glu Trp Tyr Leu Gln Lys Pro Gly Gln Ser
        35                  40                  45

Pro Ser Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Thr Arg Val Glu Ala Glu Asp Leu Gly Val Tyr Tyr Cys Phe Gln Gly
                85                  90                  95

Ser His Val Pro Phe Thr Phe Gly Ser Gly Thr Lys Leu Glu Ile Lys
                100                 105                 110

<210> SEQ ID NO 7
<211> LENGTH: 5
<212> TYPE: PRT
<213> ORGANISM: mus musculus

<400> SEQUENCE: 7

Asn Phe Gly Met Asn
1               5

<210> SEQ ID NO 8
<211> LENGTH: 6
<212> TYPE: PRT
<213> ORGANISM: mus musculus

<400> SEQUENCE: 8

Gly Tyr Thr Phe Thr Asn
1               5

<210> SEQ ID NO 9
<211> LENGTH: 10
<212> TYPE: PRT
<213> ORGANISM: mus musculus

<400> SEQUENCE: 9

Gly Tyr Thr Phe Thr Asn Phe Gly Met Asn
1               5                   10

<210> SEQ ID NO 10
<211> LENGTH: 15
<212> TYPE: PRT
<213> ORGANISM: Mus musculus

<400> SEQUENCE: 10

Trp Ile Asn Thr Tyr Thr Gly Glu Pro Thr Tyr Ala Asp Asp Phe
1               5                   10                  15

<210> SEQ ID NO 11
<211> LENGTH: 8
<212> TYPE: PRT
<213> ORGANISM: Mus musculus

<400> SEQUENCE: 11

Trp Ile Asn Thr Tyr Thr Gly Glu
1               5

<210> SEQ ID NO 12
<211> LENGTH: 10

```
<212> TYPE: PRT
<213> ORGANISM: Mus musculus

<400> SEQUENCE: 12

Asn Gly Asn Phe Gly Tyr Tyr Phe Asp Tyr
1               5                   10

<210> SEQ ID NO 13
<211> LENGTH: 16
<212> TYPE: PRT
<213> ORGANISM: Mus musculus

<400> SEQUENCE: 13

Arg Ser Ser Gln Asn Ile Val His Ser Asn Gly Asn Thr Tyr Leu Glu
1               5                   10                  15

<210> SEQ ID NO 14
<211> LENGTH: 7
<212> TYPE: PRT
<213> ORGANISM: Mus musculus

<400> SEQUENCE: 14

Lys Val Ser Asn Arg Phe Ser
1               5

<210> SEQ ID NO 15
<211> LENGTH: 7
<212> TYPE: PRT
<213> ORGANISM: Mus musculus

<400> SEQUENCE: 15

Lys Val Ser Asn Arg Phe Ser
1               5

<210> SEQ ID NO 16
<211> LENGTH: 112
<212> TYPE: PRT
<213> ORGANISM: Mus musculus

<400> SEQUENCE: 16

Gln Leu Val Gln Ser Gly Pro Glu Leu Lys Asn Pro Gly Glu Thr Val
1               5                   10                  15

Lys Ile Ser Cys Lys Ala Ser Gly Tyr Thr Phe Thr Asn Tyr Gly Met
            20                  25                  30

Asn Trp Val Lys Gln Ala Pro Gly Lys Gly Leu Lys Trp Met Gly Trp
        35                  40                  45

Ile Asn Thr Tyr Thr Gly Glu Pro Thr Tyr Ala Asp Asp Phe Lys Gly
    50                  55                  60

Arg Phe Ala Phe Ser Leu Glu Thr Ser Ala Ser Thr Ala Tyr Leu Gln
65                  70                  75                  80

Ile Asn Asn Leu Lys Asn Glu Asp Thr Ala Thr Tyr Phe Cys Ala His
                85                  90                  95

Gly Pro Trp Leu Ala Tyr Trp Gly Gln Gly Thr Leu Val Thr Val Ser
            100                 105                 110

<210> SEQ ID NO 17
<211> LENGTH: 107
<212> TYPE: PRT
<213> ORGANISM: Mus musculus

<400> SEQUENCE: 17

Asp Ile Lys Met Thr Gln Ser Pro Ser Ser Met Tyr Ala Ser Leu Gly
```

```
                1               5                   10                  15
            Glu Arg Val Thr Ile Thr Cys Lys Ala Ser Gln Asp Ile Asn Val Tyr
                            20                  25                  30

Leu Ser Trp Phe Gln Gln Lys Pro Gly Lys Ser Pro Lys Thr Leu Ile
                        35                  40                  45

Tyr Arg Ala Ile Arg Leu Val Asp Gly Val Pro Ser Arg Phe Ser Gly
                    50                  55                  60

Ser Gly Ser Gly Gln Asp Tyr Ser Leu Thr Ile Ser Ser Leu Asp Tyr
            65                  70                  75                  80

Glu Asp Met Gly Ile Tyr Tyr Cys Leu Gln Tyr Asp Glu Leu Pro Tyr
                            85                  90                  95

Thr Phe Gly Gly Gly Thr Lys Leu Glu Ile Glu
                        100                 105
```

<210> SEQ ID NO 18
<211> LENGTH: 5
<212> TYPE: PRT
<213> ORGANISM: Mus musculus

<400> SEQUENCE: 18

```
Asn Tyr Gly Met Asn
1               5
```

<210> SEQ ID NO 19
<211> LENGTH: 6
<212> TYPE: PRT
<213> ORGANISM: Mus musculus

<400> SEQUENCE: 19

```
Gly Tyr Thr Phe Thr Asn
1               5
```

<210> SEQ ID NO 20
<211> LENGTH: 10
<212> TYPE: PRT
<213> ORGANISM: Mus musculus

<400> SEQUENCE: 20

```
Gly Tyr Thr Phe Thr Asn Tyr Gly Met Asn
1               5                   10
```

<210> SEQ ID NO 21
<211> LENGTH: 17
<212> TYPE: PRT
<213> ORGANISM: Mus musculus

<400> SEQUENCE: 21

```
Trp Ile Asn Thr Tyr Thr Gly Glu Pro Thr Tyr Ala Asp Asp Phe Lys
1               5                   10                  15

Gly
```

<210> SEQ ID NO 22
<211> LENGTH: 10
<212> TYPE: PRT
<213> ORGANISM: Mus musculus

<400> SEQUENCE: 22

```
Trp Ile Asn Thr Tyr Thr Gly Glu Pro Thr
1               5                   10
```

<210> SEQ ID NO 23

```
<211> LENGTH: 6
<212> TYPE: PRT
<213> ORGANISM: Mus musculus

<400> SEQUENCE: 23

Gly Pro Trp Leu Ala Tyr
1               5

<210> SEQ ID NO 24
<211> LENGTH: 11
<212> TYPE: PRT
<213> ORGANISM: Mus musculus

<400> SEQUENCE: 24

Lys Ala Ser Gln Asp Ile Asn Val Tyr Leu Ser
1               5                   10

<210> SEQ ID NO 25
<211> LENGTH: 7
<212> TYPE: PRT
<213> ORGANISM: Mus musculus

<400> SEQUENCE: 25

Arg Ala Ile Arg Leu Val Asp
1               5

<210> SEQ ID NO 26
<211> LENGTH: 9
<212> TYPE: PRT
<213> ORGANISM: Mus musculus

<400> SEQUENCE: 26

Leu Gln Tyr Asp Glu Leu Pro Tyr Thr
1               5

<210> SEQ ID NO 27
<211> LENGTH: 117
<212> TYPE: PRT
<213> ORGANISM: Mus musculus

<400> SEQUENCE: 27

Gln Ile Gln Leu Val Gln Ser Gly Pro Glu Leu Lys Lys Pro Gly Glu
1               5                   10                  15

Thr Val Arg Ile Ser Cys Lys Ala Ser Gly Tyr Thr Phe Thr Ile Ala
                20                  25                  30

Gly Met Gln Trp Val Gln Lys Met Pro Gly Lys Gly Leu Lys Trp Ile
            35                  40                  45

Gly Trp Ile Asn Thr His Ser Gly Val Pro Lys Tyr Ala Glu Asp Phe
        50                  55                  60

Lys Gly Arg Phe Ala Phe Ser Leu Glu Thr Ser Ala Asn Ile Ala Tyr
65                  70                  75                  80

Leu Gln Ile Ser Asn Leu Lys Asn Glu Asp Thr Ala Thr Tyr Phe Cys
                85                  90                  95

Ala Arg Gly Gly Asp Glu Gly Val Met Asp Tyr Trp Gly Gln Gly Thr
            100                 105                 110

Ser Val Thr Val Ser
        115

<210> SEQ ID NO 28
<211> LENGTH: 107
<212> TYPE: PRT
<213> ORGANISM: Mus musculus
```

<400> SEQUENCE: 28

Asp Ile Val Met Thr Gln Ser His Lys Phe Met Ser Thr Ser Val Gly
1               5                   10                  15

Asp Arg Val Ser Ile Thr Cys Lys Ala Ser Gln Asp Val Ser Thr Ala
            20                  25                  30

Val Ala Trp Tyr His Gln Lys Pro Gly Gln Ser Pro Lys Leu Leu Ile
        35                  40                  45

Tyr Trp Ala Ser Thr Arg His Thr Gly Val Pro Asp Arg Phe Ser Gly
50                  55                  60

Ser Gly Ser Gly Thr Asp Tyr Thr Leu Thr Ile Ser Ala Leu Gln Ala
65                  70                  75                  80

Glu Asp Leu Ala Leu Tyr Tyr Cys Gln Gln His Tyr Asn Thr Pro Trp
                85                  90                  95

Thr Phe Gly Gly Gly Thr Lys Leu Glu Ile Lys
            100                 105

<210> SEQ ID NO 29
<211> LENGTH: 120
<212> TYPE: PRT
<213> ORGANISM: Mus musculus

<400> SEQUENCE: 29

Gln Val Gln Leu Gln Gln Ser Ala Ala Glu Leu Ala Arg Pro Gly Ala
1               5                   10                  15

Ser Val Lys Met Ser Cys Lys Ala Ser Gly Tyr Thr Phe Thr Ser Tyr
            20                  25                  30

Thr Met His Trp Val Lys Gln Arg Pro Gly Gln Gly Leu Glu Trp Ile
        35                  40                  45

Gly Tyr Ile Asn Pro Ser Ser Gly Tyr Thr Asp Tyr Asn Gln Lys Phe
50                  55                  60

Lys Asp Lys Thr Thr Leu Thr Ala Asp Arg Ser Ser Ser Thr Ala Tyr
65                  70                  75                  80

Met Gln Leu Ser Ser Leu Thr Ser Glu Asp Ser Ala Val Tyr Tyr Cys
                85                  90                  95

Ala Arg Leu Gly Lys Gly Leu Leu Pro Pro Phe Asp Tyr Trp Gly Gln
            100                 105                 110

Gly Ser Thr Leu Thr Val Ser Ser
        115                 120

<210> SEQ ID NO 30
<211> LENGTH: 113
<212> TYPE: PRT
<213> ORGANISM: Mus musculus

<400> SEQUENCE: 30

Glu Ile Val Leu Thr Gln Ser Ile Pro Ser Leu Thr Val Ser Ala Gly
1               5                   10                  15

Glu Arg Val Thr Ile Ser Cys Lys Ser Asn Gln Asn Leu Leu Trp Ser
            20                  25                  30

Gly Asn Gln Arg Tyr Cys Leu Val Trp His Gln Trp Lys Pro Gly Gln
        35                  40                  45

Thr Pro Thr Pro Leu Ile Thr Trp Thr Ser Asp Arg Tyr Ser Gly Val
50                  55                  60

Pro Asp Arg Phe Ile Gly Ser Gly Ser Val Thr Asp Phe Thr Leu Thr
65                  70                  75                  80

```
Ile Ser Ser Val Gln Ala Glu Asp Val Ala Val Tyr Phe Cys Gln Gln
                85                  90                  95

His Leu His Ile Pro Tyr Thr Phe Gly Gly Gly Thr Lys Leu Glu Ile
            100                 105                 110

Lys

<210> SEQ ID NO 31
<211> LENGTH: 119
<212> TYPE: PRT
<213> ORGANISM: Mus musculus

<400> SEQUENCE: 31

Glu Val Gln Leu Gln Gln Ser Gly Pro Glu Leu Val Lys Pro Gly Ala
1               5                   10                  15

Ser Met Lys Ile Ser Cys Lys Ala Ser His Tyr Ser Phe Ile Gly Tyr
            20                  25                  30

Thr Met Asn Trp Val Lys Gln Arg His Gly Lys Asn Leu Glu Trp Ile
        35                  40                  45

Gly Leu Ile Asn Pro Tyr Asn Gly Asp Thr Thr Tyr Asn Gln Lys Phe
    50                  55                  60

Lys Gly Lys Ala Ser Leu Thr Val Asp Lys Ser Ser Thr Ala Tyr
65                  70                  75                  80

Met Glu Ile Leu Ser Leu Thr Ser Glu Asp Ser Ala Val Tyr Tyr Cys
                85                  90                  95

Ala Arg Glu Asn Trp Gly Tyr Pro Tyr Ala Met Asp Tyr Trp Gly Gln
            100                 105                 110

Gly Thr Ser Val Thr Val Ser
        115

<210> SEQ ID NO 32
<211> LENGTH: 117
<212> TYPE: PRT
<213> ORGANISM: Mus musculus

<400> SEQUENCE: 32

Gln Ile Gln Leu Val Gln Ser Gly Pro Glu Leu Lys Lys Pro Gly Glu
1               5                   10                  15

Thr Val Arg Ile Ser Cys Lys Ala Ser Gly Tyr Thr Phe Thr Thr Ala
            20                  25                  30

Gly Met Gln Trp Val Gln Lys Thr Pro Gly Lys Gly Leu Lys Trp Ile
        35                  40                  45

Gly Trp Ile Asn Ser His Ser Gly Val Pro Lys Tyr Ala Glu Asp Phe
    50                  55                  60

Lys Gly Arg Phe Ala Phe Ser Leu Glu Thr Ser Ala Ser Thr Ala Tyr
65                  70                  75                  80

Leu Gln Ile Ser Thr Leu Lys Asn Glu Asp Thr Ala Thr Tyr Phe Cys
                85                  90                  95

Ala Arg Gly Gly Asp Glu Gly Val Met Asp Tyr Trp Gly Gln Gly Thr
            100                 105                 110

Ser Val Thr Val Ser
        115

<210> SEQ ID NO 33
<211> LENGTH: 107
<212> TYPE: PRT
<213> ORGANISM: Mus musculus

<400> SEQUENCE: 33
```

Asp Ile Val Met Thr Gln Ser His Lys Phe Met Ser Thr Ser Leu Gly
1               5                   10                  15

Asp Arg Val Ser Phe Thr Cys Lys Ala Ser Gln Asp Val Ser Thr Ala
            20                  25                  30

Val Ala Trp Tyr Gln Gln Lys Pro Gly Gln Ser Pro Lys Leu Leu Ile
        35                  40                  45

Tyr Trp Thr Ser Thr Arg His Thr Gly Val Pro Asp Arg Phe Thr Gly
    50                  55                  60

Ser Gly Ser Gly Thr Asp Tyr Thr Leu Thr Ile Ser Ser Val Gln Ala
65                  70                  75                  80

Glu Asp Leu Ala Leu Tyr Tyr Cys Gln Gln His Tyr Ser Thr Pro Trp
                85                  90                  95

Thr Phe Gly Gly Gly Thr Lys Leu Glu Ile Lys
            100                 105

<210> SEQ ID NO 34
<211> LENGTH: 6
<212> TYPE: PRT
<213> ORGANISM: Mus musculus

<400> SEQUENCE: 34

Gly Tyr Thr Phe Thr Thr
1               5

<210> SEQ ID NO 35
<211> LENGTH: 5
<212> TYPE: PRT
<213> ORGANISM: Mus musculus

<400> SEQUENCE: 35

Thr Ala Gly Met Gln
1               5

<210> SEQ ID NO 36
<211> LENGTH: 10
<212> TYPE: PRT
<213> ORGANISM: Mus musculus

<400> SEQUENCE: 36

Gly Tyr Thr Phe Thr Thr Ala Gly Met Gln
1               5                   10

<210> SEQ ID NO 37
<211> LENGTH: 17
<212> TYPE: PRT
<213> ORGANISM: Mus musculus

<400> SEQUENCE: 37

Trp Ile Asn Ser His Ser Gly Val Pro Lys Tyr Ala Glu Asp Phe Lys
1               5                   10                  15

Gly

<210> SEQ ID NO 38
<211> LENGTH: 9
<212> TYPE: PRT
<213> ORGANISM: Mus musculus

<400> SEQUENCE: 38

Trp Ile Asn Ser His Ser Gly Val Pro
1               5

```
<210> SEQ ID NO 39
<211> LENGTH: 9
<212> TYPE: PRT
<213> ORGANISM: Mus musculus

<400> SEQUENCE: 39

Gly Gly Asp Glu Gly Val Met Asp Tyr
1               5

<210> SEQ ID NO 40
<211> LENGTH: 11
<212> TYPE: PRT
<213> ORGANISM: Mus musculus

<400> SEQUENCE: 40

Lys Ala Ser Gln Asp Val Ser Thr Ala Val Ala
1               5                   10

<210> SEQ ID NO 41
<211> LENGTH: 7
<212> TYPE: PRT
<213> ORGANISM: Mus musculus

<400> SEQUENCE: 41

Trp Thr Ser Thr Arg His Thr
1               5

<210> SEQ ID NO 42
<211> LENGTH: 9
<212> TYPE: PRT
<213> ORGANISM: Mus musculus

<400> SEQUENCE: 42

Gln Gln His Tyr Ser Thr Pro Trp Thr
1               5

<210> SEQ ID NO 43
<211> LENGTH: 107
<212> TYPE: PRT
<213> ORGANISM: Artificial
<220> FEATURE:
<223> OTHER INFORMATION: Synthetic

<400> SEQUENCE: 43

Asp Ile Gln Met Thr Gln Ser Pro Ser Phe Leu Ser Ala Ser Val Gly
1               5                   10                  15

Asp Arg Val Thr Ile Thr Cys Lys Ala Ser Gln Asp Val Ser Thr Ala
            20                  25                  30

Val Ala Trp Tyr Gln Gln Lys Pro Gly Gln Pro Pro Lys Leu Leu Ile
        35                  40                  45

Tyr Trp Thr Ser Thr Arg His Thr Gly Val Pro Asp Arg Phe Ser Gly
    50                  55                  60

Ser Gly Ser Gly Thr Asp Phe Thr Leu Thr Ile Ser Ser Leu Gln Ala
65                  70                  75                  80

Glu Asp Val Ala Val Tyr Tyr Cys Gln Gln His Tyr Ser Thr Pro Trp
                85                  90                  95

Thr Phe Gly Gly Gly Thr Lys Val Glu Ile Lys
            100                 105

<210> SEQ ID NO 44
<211> LENGTH: 107
<212> TYPE: PRT
```

<213> ORGANISM: Artificial
<220> FEATURE:
<223> OTHER INFORMATION: Synthetic

<400> SEQUENCE: 44

Asp Ile Gln Met Thr Gln Ser Pro Ser Phe Leu Ser Ala Ser Val Gly
1               5                   10                  15

Asp Arg Val Thr Ile Thr Cys Lys Ala Ser Gln Asp Val Ser Thr Ala
            20                  25                  30

Val Ala Trp Tyr Gln Gln Lys Pro Gly Gln Pro Pro Lys Leu Leu Ile
        35                  40                  45

Tyr Trp Thr Ser Thr Arg His Thr Gly Val Pro Asp Arg Phe Ser Gly
50                  55                  60

Ser Gly Ser Gly Thr Asp Tyr Thr Leu Thr Ile Ser Ser Leu Gln Ala
65                  70                  75                  80

Glu Asp Val Ala Val Tyr Tyr Cys Gln Gln His Tyr Ser Thr Pro Trp
                85                  90                  95

Thr Phe Gly Gly Gly Thr Lys Val Glu Ile Lys
            100                 105

<210> SEQ ID NO 45
<211> LENGTH: 107
<212> TYPE: PRT
<213> ORGANISM: Artificial
<220> FEATURE:
<223> OTHER INFORMATION: Synthetic

<400> SEQUENCE: 45

Asp Ile Val Met Thr Gln Ser Pro Ser Phe Leu Ser Ala Ser Val Gly
1               5                   10                  15

Asp Arg Val Thr Ile Thr Cys Lys Ala Ser Gln Asp Val Ser Thr Ala
            20                  25                  30

Val Ala Trp Tyr Gln Gln Lys Pro Gly Gln Pro Pro Lys Leu Leu Ile
        35                  40                  45

Tyr Trp Thr Ser Thr Arg His Thr Gly Val Pro Asp Arg Phe Ser Gly
50                  55                  60

Ser Gly Ser Gly Thr Asp Tyr Thr Leu Thr Ile Ser Ser Val Gln Ala
65                  70                  75                  80

Glu Asp Val Ala Val Tyr Tyr Cys Gln Gln His Tyr Ser Thr Pro Trp
                85                  90                  95

Thr Phe Gly Gly Gly Thr Lys Val Glu Ile Lys
            100                 105

<210> SEQ ID NO 46
<211> LENGTH: 107
<212> TYPE: PRT
<213> ORGANISM: Artificial
<220> FEATURE:
<223> OTHER INFORMATION: Synthetic

<400> SEQUENCE: 46

Asp Ile Val Met Thr Gln Ser Pro Ser Phe Leu Ser Ala Ser Val Gly
1               5                   10                  15

Asp Arg Val Thr Phe Thr Cys Lys Ala Ser Gln Asp Val Ser Thr Ala
            20                  25                  30

Val Ala Trp Tyr Gln Gln Lys Pro Gly Gln Ser Pro Lys Leu Leu Ile
        35                  40                  45

Tyr Trp Thr Ser Thr Arg His Thr Gly Val Pro Asp Arg Phe Ser Gly
50                  55                  60

```
Ser Gly Ser Gly Thr Asp Tyr Thr Leu Thr Ile Ser Ser Val Gln Ala
 65                  70                  75                  80

Glu Asp Val Ala Val Tyr Tyr Cys Gln Gln His Tyr Ser Thr Pro Trp
                 85                  90                  95

Thr Phe Gly Gly Gly Thr Lys Val Glu Ile Lys
            100                 105
```

<210> SEQ ID NO 47
<211> LENGTH: 107
<212> TYPE: PRT
<213> ORGANISM: Artificial
<220> FEATURE:
<223> OTHER INFORMATION: Synthetic

<400> SEQUENCE: 47

```
Asp Ile Val Met Thr Gln Ser His Lys Phe Leu Ser Ala Ser Val Gly
  1               5                  10                  15

Asp Arg Val Thr Phe Thr Cys Lys Ala Ser Gln Asp Val Ser Thr Ala
                 20                  25                  30

Val Ala Trp Tyr Gln Gln Lys Pro Gly Gln Ser Pro Lys Leu Leu Ile
             35                  40                  45

Tyr Trp Thr Ser Thr Arg His Thr Gly Val Pro Asp Arg Phe Ser Gly
 50                  55                  60

Ser Gly Ser Gly Thr Asp Tyr Thr Leu Thr Ile Ser Ser Val Gln Ala
 65                  70                  75                  80

Glu Asp Val Ala Val Tyr Tyr Cys Gln Gln His Tyr Ser Thr Pro Trp
                 85                  90                  95

Thr Phe Gly Gly Gly Thr Lys Leu Glu Ile Lys
            100                 105
```

<210> SEQ ID NO 48
<211> LENGTH: 118
<212> TYPE: PRT
<213> ORGANISM: Artificial
<220> FEATURE:
<223> OTHER INFORMATION: Synthetic

<400> SEQUENCE: 48

```
Gln Val Gln Leu Val Gln Ser Gly Ser Glu Leu Lys Lys Pro Gly Ala
  1               5                  10                  15

Ser Val Lys Val Ser Cys Lys Ala Ser Gly Tyr Thr Phe Thr Thr Ala
                 20                  25                  30

Gly Met Gln Trp Val Gln Lys Ser Pro Gly Gln Gly Leu Glu Trp Met
             35                  40                  45

Gly Trp Ile Asn Ser His Ser Gly Val Pro Lys Tyr Ala Glu Asp Phe
 50                  55                  60

Lys Gly Arg Phe Val Phe Ser Leu Asp Thr Ser Val Ser Thr Ala Tyr
 65                  70                  75                  80

Leu Gln Ile Ser Ser Leu Lys Ala Glu Asp Thr Ala Val Tyr Phe Cys
                 85                  90                  95

Ala Arg Gly Gly Asp Glu Gly Val Met Asp Tyr Trp Gly Gln Gly Thr
            100                 105                 110

Thr Val Thr Val Ser Ser
            115
```

<210> SEQ ID NO 49
<211> LENGTH: 118
<212> TYPE: PRT

<213> ORGANISM: Artificial
<220> FEATURE:
<223> OTHER INFORMATION: Synthetic

<400> SEQUENCE: 49

Gln Ile Gln Leu Val Gln Ser Gly Ser Glu Leu Lys Lys Pro Gly Ala
1               5                   10                  15

Ser Val Lys Val Ser Cys Lys Ala Ser Gly Tyr Thr Phe Thr Thr Ala
            20                  25                  30

Gly Met Gln Trp Val Arg Gln Ala Pro Gly Gln Gly Leu Glu Trp Ile
        35                  40                  45

Gly Trp Ile Asn Ser His Ser Gly Val Pro Lys Tyr Ala Glu Asp Phe
    50                  55                  60

Lys Gly Arg Phe Val Phe Ser Leu Asp Thr Ser Val Ser Thr Ala Tyr
65                  70                  75                  80

Leu Gln Ile Ser Ser Leu Lys Ala Glu Asp Thr Ala Val Tyr Phe Cys
                85                  90                  95

Ala Arg Gly Gly Asp Glu Gly Val Met Asp Tyr Trp Gly Gln Gly Thr
            100                 105                 110

Thr Val Thr Val Ser Ser
        115

<210> SEQ ID NO 50
<211> LENGTH: 118
<212> TYPE: PRT
<213> ORGANISM: Artificial
<220> FEATURE:
<223> OTHER INFORMATION: Synthetic

<400> SEQUENCE: 50

Gln Ile Gln Leu Val Gln Ser Gly Ser Glu Leu Lys Lys Pro Gly Ala
1               5                   10                  15

Ser Val Lys Val Ser Cys Lys Ala Ser Gly Tyr Thr Phe Thr Thr Ala
            20                  25                  30

Gly Met Gln Trp Val Gln Lys Ser Pro Gly Gln Gly Leu Glu Trp Ile
        35                  40                  45

Gly Trp Ile Asn Ser His Ser Gly Val Pro Lys Tyr Ala Glu Asp Phe
    50                  55                  60

Lys Gly Arg Phe Ala Phe Ser Leu Asp Thr Ser Val Ser Thr Ala Tyr
65                  70                  75                  80

Leu Gln Ile Ser Ser Leu Lys Ala Glu Asp Thr Ala Val Tyr Phe Cys
                85                  90                  95

Ala Arg Gly Gly Asp Glu Gly Val Met Asp Tyr Trp Gly Gln Gly Thr
            100                 105                 110

Thr Val Thr Val Ser Ser
        115

<210> SEQ ID NO 51
<211> LENGTH: 118
<212> TYPE: PRT
<213> ORGANISM: Artificial
<220> FEATURE:
<223> OTHER INFORMATION: Synthetic

<400> SEQUENCE: 51

Gln Ile Gln Leu Val Gln Ser Gly Ser Glu Leu Lys Lys Pro Gly Ala
1               5                   10                  15

Ser Val Lys Val Ser Cys Lys Ala Ser Gly Tyr Thr Phe Thr Thr Ala
            20                  25                  30

Gly Met Gln Trp Val Gln Lys Thr Pro Gly Lys Gly Leu Glu Trp Ile
            35                  40                  45

Gly Trp Ile Asn Ser His Ser Gly Val Pro Lys Tyr Ala Glu Asp Phe
        50                  55                  60

Lys Gly Arg Phe Ala Phe Ser Leu Asp Thr Ser Ala Ser Thr Ala Tyr
 65                  70                  75                  80

Leu Gln Ile Ser Ser Leu Lys Ala Glu Asp Thr Ala Val Tyr Phe Cys
                85                  90                  95

Ala Arg Gly Gly Asp Glu Gly Val Met Asp Tyr Trp Gly Gln Gly Thr
                100                 105                 110

Ser Val Thr Val Ser Ser
            115

<210> SEQ ID NO 52
<211> LENGTH: 107
<212> TYPE: PRT
<213> ORGANISM: Artificial
<220> FEATURE:
<223> OTHER INFORMATION: Synthetic

<400> SEQUENCE: 52

Asp Ile Gln Met Thr Gln Ser Pro Ser Ser Leu Ser Ala Ser Val Gly
 1               5                  10                  15

Asp Arg Val Thr Ile Thr Cys Arg Ala Ser Glu Asn Ile Tyr Ser Asn
            20                  25                  30

Leu Ala Trp Tyr Gln Gln Lys Pro Gly Lys Ala Pro Lys Leu Leu Leu
        35                  40                  45

Tyr Ala Ala Thr Asn Leu Ala Asp Gly Val Pro Ser Arg Phe Ser Gly
 50                  55                  60

Ser Gly Ser Gly Thr Asp Tyr Thr Leu Thr Ile Ser Ser Leu Gln Pro
 65                  70                  75                  80

Glu Asp Phe Ala Thr Tyr Tyr Cys Gln His Phe Trp Gly Thr Pro Tyr
                85                  90                  95

Thr Phe Gly Gln Gly Thr Lys Leu Glu Ile Lys
            100                 105

<210> SEQ ID NO 53
<211> LENGTH: 107
<212> TYPE: PRT
<213> ORGANISM: Artificial
<220> FEATURE:
<223> OTHER INFORMATION: Synthetic

<400> SEQUENCE: 53

Asp Ile Gln Met Thr Gln Ser Pro Ser Ser Leu Ser Ala Ser Val Gly
 1               5                  10                  15

Asp Arg Val Thr Ile Thr Cys Arg Ala Ser Glu Asn Ile Tyr Ser Asn
            20                  25                  30

Leu Ala Trp Tyr Gln Gln Lys Pro Gly Lys Ala Pro Gln Leu Leu Val
        35                  40                  45

Tyr Ala Ala Thr Asn Leu Ala Asp Gly Val Pro Ser Arg Phe Ser Gly
 50                  55                  60

Ser Gly Ser Gly Thr Asp Tyr Thr Leu Thr Ile Ser Ser Leu Gln Pro
 65                  70                  75                  80

Glu Asp Phe Ala Thr Tyr Tyr Cys Gln His Phe Trp Gly Thr Pro Tyr
                85                  90                  95

Thr Phe Gly Gly Gly Thr Lys Leu Glu Ile Lys

-continued 100             105

<210> SEQ ID NO 54
<211> LENGTH: 107
<212> TYPE: PRT
<213> ORGANISM: Artificial
<220> FEATURE:
<223> OTHER INFORMATION: Synthetic

<400> SEQUENCE: 54

Asp Ile Gln Met Thr Gln Ser Pro Ser Ser Leu Ser Ala Ser Val Gly
1               5                   10                  15

Asp Arg Val Thr Ile Thr Cys Arg Ala Ser Glu Asn Ile Tyr Ser Asn
            20                  25                  30

Leu Ala Trp Tyr Gln Gln Lys Pro Gly Lys Ala Pro Gln Leu Leu Val
        35                  40                  45

Tyr Ala Ala Thr Asn Leu Ala Asp Gly Val Pro Ser Arg Phe Ser Gly
    50                  55                  60

Ser Gly Ser Gly Thr Gln Tyr Thr Leu Thr Ile Ser Ser Leu Gln Pro
65                  70                  75                  80

Glu Asp Phe Ala Thr Tyr Tyr Cys Gln His Phe Trp Gly Thr Pro Tyr
                85                  90                  95

Thr Phe Gly Gly Gly Thr Lys Leu Glu Ile Lys
            100             105

<210> SEQ ID NO 55
<211> LENGTH: 107
<212> TYPE: PRT
<213> ORGANISM: Artificial
<220> FEATURE:
<223> OTHER INFORMATION: Synthetic

<400> SEQUENCE: 55

Asp Ile Gln Met Thr Gln Ser Pro Ser Ser Leu Ser Ala Ser Val Gly
1               5                   10                  15

Asp Arg Val Thr Ile Thr Cys Arg Ala Ser Glu Asn Ile Tyr Ser Asn
            20                  25                  30

Leu Ala Trp Tyr Gln Gln Lys Gln Gly Lys Ala Pro Gln Leu Leu Val
        35                  40                  45

Tyr Ala Ala Thr Asn Leu Ala Asp Gly Val Pro Ser Arg Phe Ser Gly
    50                  55                  60

Ser Gly Ser Gly Thr Gln Tyr Thr Leu Thr Ile Asn Ser Leu Gln Pro
65                  70                  75                  80

Glu Asp Phe Ala Thr Tyr Tyr Cys Gln His Phe Trp Gly Thr Pro Tyr
                85                  90                  95

Thr Phe Gly Gly Gly Thr Lys Leu Glu Ile Lys
            100             105

<210> SEQ ID NO 56
<211> LENGTH: 107
<212> TYPE: PRT
<213> ORGANISM: Artificial
<220> FEATURE:
<223> OTHER INFORMATION: Synthetic

<400> SEQUENCE: 56

Asp Ile Gln Met Thr Gln Ser Pro Ser Ser Leu Ser Ala Ser Val Gly
1               5                   10                  15

Glu Thr Val Thr Ile Thr Cys Arg Ala Ser Glu Asn Ile Tyr Ser Asn
            20                  25                  30

Leu Ala Trp Tyr Gln Gln Lys Gln Gly Lys Ala Pro Gln Leu Leu Val
         35                  40                  45

Tyr Ala Ala Thr Asn Leu Ala Asp Gly Val Pro Ser Arg Phe Ser Gly
         50                  55                  60

Ser Gly Ser Gly Thr Gln Tyr Thr Leu Thr Ile Asn Ser Leu Gln Pro
 65                  70                  75                  80

Glu Asp Phe Ala Thr Tyr Tyr Cys Gln His Phe Trp Gly Thr Pro Tyr
                 85                  90                  95

Thr Phe Gly Gly Gly Thr Lys Leu Glu Ile Lys
             100                 105

<210> SEQ ID NO 57
<211> LENGTH: 120
<212> TYPE: PRT
<213> ORGANISM: Artificial
<220> FEATURE:
<223> OTHER INFORMATION: Synthetic

<400> SEQUENCE: 57

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
                 20                  25                  30

Thr Met His Trp Val Arg Gln Ala Pro Gly Gln Gly Leu Glu Trp Met
             35                  40                  45

Gly Tyr Ile Asn Pro Ser Ser Gly Tyr Thr Glu Asn Asn Arg Lys Phe
         50                  55                  60

Lys Asp Arg Val Thr Met Thr Arg Asp Thr Ser Thr Ser Thr Val Tyr
 65                  70                  75                  80

Met Glu Leu Ser Ser Leu Arg Ser Glu Asp Thr Ala Val Tyr Tyr Cys
                 85                  90                  95

Ala Arg Leu Gly Lys Gly Leu Leu Pro Pro Phe Asp Tyr Trp Gly Gln
             100                 105                 110

Gly Thr Thr Val Thr Val Ser Ser
         115                 120

<210> SEQ ID NO 58
<211> LENGTH: 120
<212> TYPE: PRT
<213> ORGANISM: Artificial
<220> FEATURE:
<223> OTHER INFORMATION: Synthetic

<400> SEQUENCE: 58

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
                 20                  25                  30

Thr Met His Trp Val Arg Gln Ala Pro Gly Gln Gly Leu Glu Trp Ile
             35                  40                  45

Gly Tyr Ile Asn Pro Ser Ser Gly Tyr Thr Glu Asn Asn Arg Lys Phe
         50                  55                  60

Lys Asp Lys Thr Thr Met Thr Ala Asp Thr Ser Thr Ser Thr Ala Tyr
 65                  70                  75                  80

Met Glu Leu Ser Ser Leu Arg Ser Glu Asp Thr Ala Val Tyr Tyr Cys
                 85                  90                  95

Ala Arg Leu Gly Lys Gly Leu Leu Pro Pro Phe Asp Tyr Trp Gly Gln

```
                    100                 105                 110
Gly Thr Thr Val Thr Val Ser Ser
        115                 120

<210> SEQ ID NO 59
<211> LENGTH: 120
<212> TYPE: PRT
<213> ORGANISM: Artificial
<220> FEATURE:
<223> OTHER INFORMATION: Synthetic

<400> SEQUENCE: 59

Gln Val Gln Leu Gln Gln Ser Gly Ala Glu Val Lys Lys Pro Gly Ala
1               5                   10                  15

Ser Val Lys Met Ser Cys Lys Ala Ser Gly Tyr Thr Phe Thr Ser Tyr
            20                  25                  30

Thr Met His Trp Val Arg Gln Ala Pro Gly Gln Gly Leu Glu Trp Ile
        35                  40                  45

Gly Tyr Ile Asn Pro Ser Ser Gly Tyr Thr Glu Asn Asn Arg Lys Phe
    50                  55                  60

Lys Asp Lys Thr Thr Leu Thr Ala Asp Thr Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Leu Gly Lys Gly Leu Leu Pro Pro Phe Asp Tyr Trp Gly Gln
            100                 105                 110

Gly Thr Thr Leu Thr Val Ser Ser
        115                 120

<210> SEQ ID NO 60
<211> LENGTH: 120
<212> TYPE: PRT
<213> ORGANISM: Artificial
<220> FEATURE:
<223> OTHER INFORMATION: Synthetic

<400> SEQUENCE: 60

Gln Val Gln Leu Val Gln Ser Gly Ala Glu Leu Ala Arg Pro Gly Ala
1               5                   10                  15

Ser Val Lys Val Ser Cys Lys Ala Ser Gly Tyr Thr Phe Thr Ser Tyr
            20                  25                  30

Thr Met His Trp Val Arg Gln Ala Pro Gly Gln Gly Leu Glu Trp Ile
        35                  40                  45

Gly Tyr Ile Asn Pro Ser Ser Gly Tyr Thr Glu Asn Asn Arg Lys Phe
    50                  55                  60

Lys Asp Lys Thr Thr Leu Thr Ala Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Leu Gly Lys Gly Leu Leu Pro Pro Phe Asp Tyr Trp Gly Gln
            100                 105                 110

Gly Thr Thr Val Thr Val Ser Ser
        115                 120

<210> SEQ ID NO 61
<211> LENGTH: 120
<212> TYPE: PRT
<213> ORGANISM: Artificial
<220> FEATURE:
```

<223> OTHER INFORMATION: Synthetic

<400> SEQUENCE: 61

```
Gln Val Gln Leu Gln Gln Ser Gly Ala Glu Val Lys Lys Pro Gly Ala
1               5                   10                  15
Ser Val Lys Met Ser Cys Lys Ala Ser Gly Tyr Thr Phe Thr Ser Tyr
                20                  25                  30
Thr Met His Trp Val Lys Gln Arg Pro Gly Gln Gly Leu Glu Trp Ile
            35                  40                  45
Gly Tyr Ile Asn Pro Ser Ser Gly Tyr Thr Glu Asn Asn Arg Lys Phe
        50                  55                  60
Lys Asp Lys Thr Thr Leu Thr Ala Asp Lys Ser Thr Ser Thr Ala Tyr
65                  70                  75                  80
Met Glu Leu Ser Ser Leu Arg Ser Glu Asp Thr Ala Val Tyr Tyr Cys
                85                  90                  95
Ala Arg Leu Gly Lys Gly Leu Leu Pro Pro Phe Asp Tyr Trp Gly Gln
            100                 105                 110
Gly Thr Thr Leu Thr Val Ser Ser
        115                 120
```

<210> SEQ ID NO 62
<211> LENGTH: 111
<212> TYPE: PRT
<213> ORGANISM: Mus musculus

<400> SEQUENCE: 62

```
Asp Ile Val Leu Thr Gln Ser Pro Ala Ser Leu Ala Val Ser Leu Gly
1               5                   10                  15
Gln Arg Ala Thr Ile Ser Cys Arg Ala Ser Glu Ser Val Asp Asn Phe
                20                  25                  30
Gly Ile Ser Phe Met Asn Trp Phe Gln Gln Lys Pro Gly Gln Pro Pro
            35                  40                  45
Lys Leu Leu Ile Tyr Ala Ala Ser Asn Gln Gly Ser Gly Val Pro Ala
        50                  55                  60
Arg Phe Ser Gly Ser Arg Ser Gly Thr Asp Phe Ser Leu Asn Ile His
65                  70                  75                  80
Pro Met Glu Glu Asp Asp Thr Ala Met Tyr Phe Cys Gln Gln Ser Lys
                85                  90                  95
Glu Val Pro Tyr Thr Phe Gly Gly Gly Thr Lys Leu Glu Ile Lys
            100                 105                 110
```

<210> SEQ ID NO 63
<211> LENGTH: 117
<212> TYPE: PRT
<213> ORGANISM: Mus musculus

<400> SEQUENCE: 63

```
Gln Val Gln Leu Gln Gln Ser Gly Ala Glu Leu Val Arg Pro Gly Val
1               5                   10                  15
Ser Val Lys Ile Ser Cys Lys Gly Ser Gly Tyr Thr Phe Thr Asp Tyr
                20                  25                  30
Ala Met Asn Trp Val Lys Gln Ser His Ala Lys Ser Leu Glu Trp Ile
            35                  40                  45
Gly Val Ile Ser Thr Tyr Tyr Gly Asp Ala Asn Tyr Asn Gln Lys Phe
        50                  55                  60
Lys Gly Lys Ala Thr Met Thr Val Asp Lys Ser Ser Ser Thr Ala Tyr
65                  70                  75                  80
```

```
Met Glu Leu Ala Arg Leu Thr Ser Glu Asp Ser Ala Ile Tyr Tyr Cys
            85                  90                  95

Ala Leu Ile Tyr Tyr Asp Tyr Asp Gly Ser Tyr Trp Gly Gln Gly Thr
            100                 105                 110

Thr Leu Thr Val Ser
        115
```

<210> SEQ ID NO 64
<211> LENGTH: 113
<212> TYPE: PRT
<213> ORGANISM: Mus musculus

<400> SEQUENCE: 64

```
Asp Val Val Met Thr Gln Thr Pro Leu Ser Leu Pro Val Ser Leu Gly
1               5                   10                  15

Asp Gln Ala Ser Ile Ser Cys Arg Ser Ser Gln Ser Leu Val His Ser
            20                  25                  30

Asn Gly Asn Thr Tyr Leu His Trp Tyr Leu Gln Lys Pro Gly Gln Ser
        35                  40                  45

Pro Lys Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Phe Cys Ser Gln Ser
                85                  90                  95

Thr His Val Pro Pro Tyr Thr Phe Gly Gly Gly Thr Lys Leu Glu Ile
            100                 105                 110

Lys
```

<210> SEQ ID NO 65
<211> LENGTH: 118
<212> TYPE: PRT
<213> ORGANISM: Mus musculus

<400> SEQUENCE: 65

```
Gln Val Gln Leu Gln Gln Ser Gly Ala Glu Leu Ala Arg Pro Gly Ala
1               5                   10                  15

Ser Val Lys Leu Ser Cys Lys Ala Ser Gly Tyr Thr Phe Thr Ser Tyr
            20                  25                  30

Trp Met Gln Trp Val Lys Gln Arg Pro Gly Gln Gly Leu Glu Trp Ile
        35                  40                  45

Gly Ala Ile Tyr Pro Gly Asp Gly Asp Thr Arg Tyr Thr Gln Lys Phe
    50                  55                  60

Lys Gly Lys Ala Thr Leu Thr Ala Asp Lys Ser Ser Ser Thr Ala Tyr
65                  70                  75                  80

Met Gln Leu Ser Ser Leu Ala Ser Glu Asp Ser Ala Val Tyr Tyr Cys
                85                  90                  95

Ala Arg Arg Tyr Asp Gly Tyr Tyr His Phe Asp Tyr Trp Gly Gln Gly
            100                 105                 110

Thr Thr Leu Thr Val Ser
        115
```

<210> SEQ ID NO 66
<211> LENGTH: 115
<212> TYPE: PRT
<213> ORGANISM: Mus musculus

<400> SEQUENCE: 66

Asp Ile Val Met Thr Gln Ser Pro Ser Ser Leu Ala Val Thr Ala Gly
1               5                   10                  15

Glu Lys Val Thr Met Ser Cys Lys Ser Ser Gln Ser Leu Leu Trp Ser
            20                  25                  30

Val Asn Gln Lys Asn Tyr Leu Ser Trp Tyr Gln Gln Lys Gln Arg Gln
        35                  40                  45

Pro Pro Lys Leu Leu Ile Tyr Gly Ala Ser Ile Arg Glu Ser Trp Val
    50                  55                  60

Pro Asp Arg Phe Thr Gly Ser Gly Ser Gly Thr Asp Phe Thr Leu Thr
65                  70                  75                  80

Ile Ser Asn Val His Ala Glu Asp Leu Ala Val Tyr Tyr Cys Gln His
                85                  90                  95

Asn His Gly Ser Phe Leu Pro Leu Thr Phe Gly Ser Gly Thr Lys Leu
            100                 105                 110

Glu Ile Lys
        115

<210> SEQ ID NO 67
<211> LENGTH: 120
<212> TYPE: PRT
<213> ORGANISM: Mus musculus

<400> SEQUENCE: 67

Gln Val Gln Leu Gln Gln Ser Gly Ala Glu Val Ala Arg Pro Gly Ala
1               5                   10                  15

Ser Val Lys Leu Ser Cys Lys Ser Ser Gly Phe Thr Phe Thr Thr Tyr
            20                  25                  30

Trp Met Gln Trp Val Lys Gln Arg Pro Gly Gln Gly Leu Glu Trp Ile
        35                  40                  45

Gly Ala Ile Tyr Pro Gly Asp Gly Asp Thr Arg Tyr Thr Gln Lys Phe
    50                  55                  60

Lys Gly Lys Ala Thr Leu Thr Ala Asp Lys Ser Ser Ile Thr Ala Tyr
65                  70                  75                  80

Met Gln Leu Ser Ser Leu Ala Ser Glu Asp Ser Ala Val Tyr Tyr Cys
                85                  90                  95

Ala Arg Arg Gly Asp Tyr Gly Asn Tyr Gly Met Asp Tyr Trp Gly Gln
            100                 105                 110

Gly Thr Ser Val Thr Val Ser Ser
        115                 120

<210> SEQ ID NO 68
<211> LENGTH: 112
<212> TYPE: PRT
<213> ORGANISM: Mus musculus

<400> SEQUENCE: 68

Asp Val Leu Met Thr Gln Thr Pro Leu Ser Leu Pro Val Ser Leu Gly
1               5                   10                  15

Asp Gln Ala Ser Ile Ser Cys Arg Ser Ser Gln Ser Ile Val His Ser
            20                  25                  30

Asn Gly Asn Thr Tyr Leu Glu Trp Tyr Leu Gln Lys Pro Gly Gln Ser
        35                  40                  45

Pro Lys Leu Leu Ile Tyr Lys Val Ser Asn His Phe Ser Gly Val Pro
    50                  55                  60

Asp Arg Phe Ser Gly Ser Gly Ser Gly Thr Asp Phe Thr Leu Lys Ile

```
                65                  70                  75                  80
Ser Arg Val Glu Ala Glu Asp Leu Gly Val Tyr Tyr Cys Phe Gln Gly
                    85                  90                  95

Ser His Val Pro Pro Thr Phe Gly Gly Gly Thr Lys Leu Glu Ile Lys
                    100                 105                 110

<210> SEQ ID NO 69
<211> LENGTH: 139
<212> TYPE: PRT
<213> ORGANISM: Mus musculus

<400> SEQUENCE: 69

Gln Val Gln Leu Gln Gln Ser Ala Ala Glu Leu Ala Arg Pro Gly Ala
1               5                   10                  15

Ser Val Lys Met Ser Cys Lys Ala Ser Gly Tyr Thr Phe Thr Ser Tyr
                20                  25                  30

Thr Met His Trp Val Lys Gln Arg Pro Gly Gln Gly Leu Glu Trp Ile
                35                  40                  45

Gly Tyr Ile Asn Pro Ser Ser Gly Tyr Thr Glu Asn Asn Arg Lys Phe
        50                  55                  60

Lys Asp Lys Thr Thr Leu Thr Ala Asp Lys Ser Ser Ser Thr Ala Tyr
65                  70                  75                  80

Met Gln Leu Ser Ser Leu Thr Ser Glu Asp Ser Ala Val Tyr Tyr Cys
                85                  90                  95

Ala Arg Leu Gly Lys Gly Leu Leu Pro Pro Phe Asp Tyr Trp Gly Gln
                100                 105                 110

Gly Thr Thr Leu Thr Val Ser Ser Ala Lys Thr Thr Pro Pro Ser Val
                115                 120                 125

Tyr Pro Leu Ala Pro Gly Ser Ala Ala Gln Thr
                130                 135

<210> SEQ ID NO 70
<211> LENGTH: 107
<212> TYPE: PRT
<213> ORGANISM: mus musculus

<400> SEQUENCE: 70

Asp Ile Gln Met Thr Gln Ser Pro Ala Ser Leu Ser Val Ser Val Gly
1               5                   10                  15

Glu Thr Val Thr Ile Thr Cys Arg Ala Ser Glu Asn Ile Tyr Ser Asn
                20                  25                  30

Leu Ala Trp Tyr Gln Gln Lys Gln Gly Lys Ser Pro Gln Leu Leu Val
                35                  40                  45

Tyr Ala Ala Thr Asn Leu Ala Asp Gly Val Pro Ser Arg Phe Ser Gly
        50                  55                  60

Ser Gly Ser Gly Thr Gln Tyr Ser Leu Lys Ile Asn Ser Leu Gln Ser
65                  70                  75                  80

Glu Asp Phe Gly Ser Tyr Tyr Cys Gln His Phe Trp Gly Thr Pro Tyr
                85                  90                  95

Thr Phe Gly Gly Gly Thr Lys Leu Glu Ile Lys
                100                 105
```

TREATMENT OF T CELL LYMPHOMA

CROSS-REFERENCE TO RELATED APPLICATIONS

This application is a continuation of PCT/EP2020/051234, filed Jan. 20, 2020, which claims the benefit of U.S. Provisional Application No. 62/795,194, filed Jan. 22, 2019; which are incorporated herein by reference in their entirety; including any drawings.

REFERENCE TO SEQUENCE LISTING

The present application is being filed along with a Sequence Listing in electronic format. The Sequence Listing is provided as a file entitled "KIR-9-PCT_ST25", created 14 Jan. 2020, which is 54 KB in size. The information in the electronic format of the Sequence Listing is incorporated herein by reference in its entirety.

FIELD OF THE INVENTION

This invention relates to the use of KIR3DL2-targeting agents for the diagnosis and treatment of T cell lymphomas.

BACKGROUND OF THE INVENTION

KIR3DL2/CD158k is a cell surface receptor expressed on subpopulations of healthy circulating NK and CD8+ T lymphocytes. KIR3DL2 has however also been found on the surface of malignant T cells, particularly malignant CD4+ T cells, and consequently has also emerged as a target for the treatment of T cell lymphomas (TCLs).

KIR3DL2-expressing TCLs including cutaneous T-cell lymphomas (CTCLs) such as Mycosis Fungoides (MF) and Sézary Syndrome (SS) (see, e.g. PCT publications WO2010/081890 (Innate Pharma) and WO02/50122 (INSERM)), and well as Peripheral T-cell non-Hodgkin lymphomas (see, e.g., PCT publication WO2014/128221, Innate Pharma). While MF and SS are relatively rare, PTCLs account for 15% to 20% of aggressive lymphomas and for 7% to 10% of all the non-Hodgkin lymphomas (NHLs) in Western countries. They usually occur in middle-aged to elderly patients, and presenting features are characterized by a disseminated disease in 68% of the patients, with systemic symptoms in nearly half of them (45%), bone marrow (BM) involvement in a quarter (25.8%), and extranodal disease in a third (37%). Despite aggressive therapy, more than half the patients die of their disease. While certain distinctive disease entities have improved prognostics if treated, the prognosis for many aggressive PTCLs remains relatively unchanged by the use of second- and third-generation chemotherapy regimens and 5-year overall survival (OS) still remains between 25% and 47% for PTCL-NOS, for example.

Antibodies that specifically bind to KIR3DL2 are well known in the art. Innate Pharma for example have described numerous anti-KIR3DL2 antibodies directed to a range of different epitopes on KIR3DL2, e.g., antibodies 15C11, 19H12, 22B2, 18B10, 12B11, 13H1, 10F6, 2B12, 18C6, 9E10, 10G5, 13H1, 5H1, 1E2, 1C3 and 20E9 described in PCT publication nos. WO2014/044681 and WO2014/044686. Clinical trials by Innate Pharma have demonstrated positive results of an anti-KIR3DL2 antibody in human Mycosis Fungoides and Sézary Syndrome patients. In particular, data from refractory SS patients revealed strong clinical activity upon treatment with repeated administrations of single agent IPH4102 (ADCC-mediating anti-KIR3DL2 antibody), demonstrated by an overall response rate (ORR) of 42.9%, median duration of response (DoR) of 13.8 months and median progression-free survival (PFS) of 11.7 months. These encouraging results, moreover with few side effects and the ability to deplete malignant KIR3DL2-expressing cells without causing the depletion of healthy KIR3DL2-expressing NK and T cells provides an important advance in treating TCLs. However, some patients exhibited progressing disease and/or did not respond sufficiently to initial treatment.

Consequently, there is a need in the art for improved benefit to patients having TCLs.

SUMMARY OF THE INVENTION

The present invention arises, inter alia, from the discovery that gemcitabine and oxaliplatin can each cause increased KIR3DL2 expression in malignant T cells, and that when these agents are combined with a depleting anti-KIR3DL2 antibody, lead to a dramatic increase in ability of immune cells (NK cells) to deplete the malignant T cells.

Interestingly, not only did each of gemcitabine and oxaliplatin separately increase KIR3DL2 expression on TCL cells, but the combination of gemcitabine+oxaliplatin caused an even greater increase of KIR3DL2 expression on TCL cells. It was also observed that the triplet of gemcitabine+oxaliplatin+anti-KIR3DL2 antibody led to a strong ability of immune cells (NK cells) to deplete the malignant T cells compared to the agents independently. Gemcitabine (or nucleoside analogues) and/or oxaliplatin (or other platinum compounds) can therefore be used to potentiate the activity of an anti-KIR3DL2 antibody, or in particular to potentiate the ability of an anti-KIR3DL2 antibody to cause lymphocytes (e.g. T cells, NK cells) to eliminate TCL cells.

The combination of gemcitabine and/or a platinum-based compound with an anti-KIR3DL2 antibody can therefore provide a particularly advantageous treatment of patients having a TCL (e.g. a KIR3DL2-expression TCL, a PTCL, a CTCL, a SS or a MF).

Gemcitabine (GEMZAR®) is approved as is a nucleoside metabolic inhibitor, and for a number of carcinomas including:
- in combination with carboplatin, for the treatment of advanced ovarian cancer that has relapsed at least 6 months after completion of platinum-based therapy,
- in combination with paclitaxel, for first-line treatment of metastatic breast cancer after failure of prior anthracycline-containing adjuvant chemotherapy, unless anthracyclines were clinically contraindicated,
- in combination with cisplatin, for the treatment of non-small cell lung cancer, and
- as a single agent for the treatment of pancreatic cancer.

Oxaliplatin (ELOXATIN®) is a platinum-based agent approved for:
- adjuvant treatment of stage III colon cancer in patients who have undergone complete resection of the primary tumor, and
- treatment of advanced colorectal cancer.

Accordingly, in one aspect the present invention provides improved methods of mediating an anti-tumor immune response against a KIR3DL2-expressing malignant T cell, via the use of antibodies that bind KIR3DL2, in combination with an agent or treatment (e.g. a chemotherapeutic agent) that induces or increases the expression of KIR3DL2 at the surface of the malignant T cell.

In one aspect the present disclosure provides improved methods of enhancing an anti-tumor immune response, via the use of an antibody capable of binding KIR3DL2, in combination with a means for inducing or increasing the expression of KIR3DL2 at the surface of the malignant T cell. In one embodiment, the means for inducing or increasing the expression of KIR3DL2 is a pharmaceutical composition comprising a chemotherapeutic agent (e.g. a nucleoside analogue and/or a platinum agent) and a pharmaceutically acceptable carrier.

In one aspect, provided herein is an antibody that binds KIR3DL2, for use in the treatment of a TCL, wherein the antibody that binds KIR3DL2 is administered in combination with an agent that induces or increases the expression of KIR3DL2 at the surface of malignant T cell.

In one aspect, provided herein is an agent that induces or increases the expression of KIR3DL2 at the surface of a malignant T cell, for use in the treatment of a TCL, wherein the agent that induces or increases the expression of KIR3DL2 at the surface of a malignant T cell is administered in combination with an antibody that binds KIR3DL2.

In one embodiment, provided is a method for treating or preventing a TCL cell in an individual, the method comprising administering to the individual: (a) an agent that induces or increases the expression of KIR3DL2 at the surface of a malignant T cell, and (b) an antibody that binds KIR3DL2.

In one embodiment, provided is a method of potentiating the anti-tumor effect of an antibody that binds KIR3DL2, the method comprising administering to the individual an agent that induces or increases the expression of KIR3DL2 at the surface of a malignant T cell.

In one embodiment, the agent or means for inducing or increasing the expression of KIR3DL2 at the surface of the malignant T cell is a platinum-based agent. In one embodiment, the agent or means for inducing or increasing the expression of KIR3DL2 at the surface of the malignant T cell is a nucleoside metabolic inhibitor, optionally gemcitabine or an analogue or derivative thereof. In one embodiment, the agent or means for inducing or increasing the expression of KIR3DL2 at the surface of the malignant T cell is a combination or a platinum-based agent and a nucleoside metabolic inhibitor (e.g., gemcitabine or an analogue or derivative thereof).

In one embodiment, the antibody that binds KIR3DL2 is an antibody that mediates or directs effector-cell mediated lysis of a KIR3DL2-expressing cell (e.g. a malignant T cell). In one embodiment, the antibody comprises an Fc domain capable of mediating ADCC and/or ADCP. In one embodiment, the antibody is expressed at the surface of an immune effector cell (e.g. as part of a chimeric antigen receptor on an immune effector cell). Optionally, the antibody is a monospecific or a multispecific (e.g. bispecific) antibody that directs ADCC and/or ADCP toward a KIR3DL2-expressing cell. In any aspect, an antibody that binds a KIR3DL2 polypeptide and is capable of depleting KIR3DL2-expressing cells can be characterized as a composition capable of depleting KIR3DL2-expressing cells, wherein the composition comprises an antibody that binds a KIR3DL2 polypeptide. In one embodiment, the antibody that binds KIR3DL2 is lacutamab.

In one aspect of any embodiment herein, the individual can be specified to be a human.

In one embodiment, the anti-KIR3DL2 antibody and the agent or means for inducing or increasing the expression of KIR3DL2 at the surface of the malignant T cell are each administered in a therapeutically effective amount.

In one embodiment, the anti-KIR3DL2 antibody is administered to an individual having a cancer in an amount and frequency sufficient to mediate ADCC toward KIR3DL2-expressing tumor cells.

In one embodiment, the agent or means for inducing or increasing the expression of KIR3DL2 at the surface of the malignant T cell is administered to an individual having a cancer in an amount and frequency sufficient to cause an increase in the expression of KIR3DL2 at the surface of malignant T cells.

In any aspect herein, an individual treated according to the disclosure may be an individual who is a non-responder, or who has experienced a partial or an incomplete response upon prior treatment for the TCL.

In other embodiments, provided are methods for predicting or assessing the efficacy or suitability of an anti-cancer agent for combined use with an antibody that binds a KIR3DL2 polypeptide for the treatment of a TCL, the method comprising determining or assessing (e.g., in vitro) whether the anti-cancer agent is capable of inducing or increasing the expression of KIR3DL2 at the surface of a malignant T cell, wherein a determination that the anti-cancer agent is capable of inducing or increasing the expression of KIR3DL2 at the surface of a malignant T cell indicates that the agent can be used for treatment of cancer in combination with an anti-KIR3DL2 antibody. Determining or assessing whether the anti-cancer agent is capable of inducing or increasing the expression of KIR3DL2 at the surface of a malignant T cell can comprise, for example, bringing malignant KIR3DL2-expressing T cells (e.g. tumor cells) into contact with the agent in vitro and assessing the expression of KIR3DL2. In one embodiment, the anti-cancer agent is a chemotherapeutic agent, optionally a nucleoside analogue or a platinum agent.

These aspects are more fully described in, and additional aspects, features, and advantages will be apparent from, the description of the invention provided herein.

DESCRIPTION OF THE INVENTION

Figure 1:
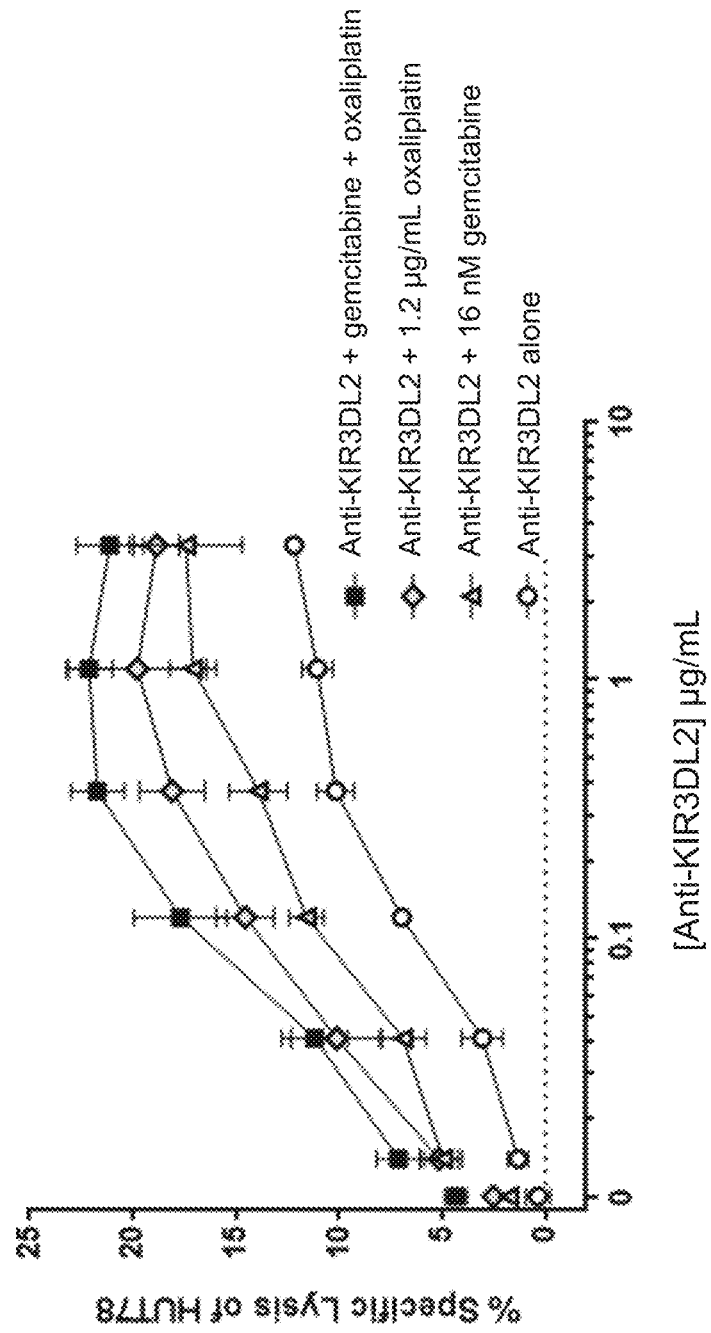
FIG. 1 shows cytotoxicity of anti-KIR3DL2 antibody towards the HUT78 TCL cell line (Sezary Syndrome), The anti-tumor activity of the anti-KIR3DL2 was enhanced by each of gemcitabine and oxaliplatin, and even more by the combination of gemcitabine and oxaliplatin.

As used herein, "a" or "an" may mean one or more. As used in the claim(s), when used in conjunction with the word "comprising", the words "a" or "an" may mean one or more than one. As used herein "another" may mean at least a second or more.

Where "comprising" is used, this can optionally be replaced by "consisting essentially of" or by "consisting of".

Whenever within this whole specification "treatment of TCL" or the like is mentioned with reference to anti-KIR3DL2 binding agent (e.g. antibody), there is meant: (a) method of treatment of TCL, said method comprising the step of administering (for at least one treatment) an anti-KIR3DL2 binding agent, (e.g., in a pharmaceutically acceptable carrier material) to a warm-blooded animal, especially a human, in need of such treatment, in a dose that allows for the treatment of TCL, (a therapeutically effective amount), e.g., in a dose (amount) as specified hereinabove and herein below; (b) the use of an anti-KIR3DL2 binding agent for the treatment of TCL, or an anti-KIR3DL2 binding agent, for use in said treatment (especially in a human); (c) the use of an anti-KIR3DL2 binding agent for the manufacture of a pharmaceutical preparation for the treatment of TCL, a method of using an anti-KIR3DL2 binding agent for the manufacture of a pharmaceutical preparation for the treatment of TCL, comprising admixing an anti-KIR3DL2 binding agent with a pharmaceutically acceptable carrier, or a pharmaceutical preparation comprising an effective dose of an anti-KIR3DL2 binding agent that is appropriate for the treatment of TCL; or (d) any combination of a), b), and c), in accordance with the subject matter allowable for patenting in a country where this application is filed.

The term "antibody," as used herein, refers to polyclonal and monoclonal antibodies. Depending on the type of constant domain in the heavy chains, antibodies are assigned to one of five major classes: IgA, IgD, IgE, IgG, and IgM. Several of these are further divided into subclasses or isotypes, such as IgG1, IgG2, IgG3, IgG4, and the like. An exemplary immunoglobulin (antibody) structural unit comprises a tetramer. Each tetramer is composed of two identical pairs of polypeptide chains, each pair having one "light" (about 25 kDa) and one "heavy" chain (about 50-70 kDa). The N-terminus of each chain defines a variable region of about 100 to 110 or more amino acids that is primarily responsible for antigen recognition. The terms variable light chain ($V_L$) and variable heavy chain ($V_H$) refer to these light and heavy chains respectively. The heavy-chain constant domains that correspond to the different classes of immunoglobulins are termed "alpha," "delta," "epsilon," "gamma" and "mu," respectively. The subunit structures and three-dimensional configurations of different classes of immunoglobulins are well known. IgG are the exemplary classes of antibodies employed herein because they are the most common antibodies in the physiological situation and because they are most easily made in a laboratory setting. In one embodiment, an antibody is a monoclonal antibody. Provided are humanized, chimeric, human, or otherwise-human-suitable antibodies. "Antibodies" includes full-length antibodies as well as any fragment or derivative of any of the herein described antibodies.

The term "hypervariable region" when used herein refers to the amino acid residues of an antibody that are responsible for antigen binding. The hypervariable region generally comprises amino acid residues from a "complementarity-determining region" or "CDR" (e.g., residues 24-34 (L1), 50-56 (L2) and 89-97 (L3) in the light-chain variable domain and 31-35 (H1), 50-65 (H2) and 95-102 (H3) in the heavy-chain variable domain; Kabat et al. 1991) and/or those residues from a "hypervariable loop" (e.g., residues 26-32 (L1), 50-52 (L2) and 91-96 (L3) in the light-chain variable domain and 26-32 (H1), 53-55 (H2) and 96-101 (H3) in the heavy-chain variable domain; Chothia and Lesk, J. Mol. Biol 1987; 196:901-917), or a similar system for determining essential amino acids responsible for antigen binding. Typically, the numbering of amino acid residues in this region is performed by the method described in Kabat et al., supra. Phrases such as "Kabat position", "variable domain residue numbering as in Kabat" and "according to Kabat" herein refer to this numbering system for heavy chain variable domains or light chain variable domains. Using the Kabat numbering system, the actual linear amino acid sequence of a peptide may contain fewer or additional amino acids corresponding to a shortening of, or insertion into, a FR or CDR of the variable domain. For example, a heavy chain variable domain may include a single amino acid insert (residue 52a according to Kabat) after residue 52 of CDR H2 and inserted residues (e.g., residues 82a, 82b, and 82c, etc. according to Kabat) after heavy chain FR residue 82. The Kabat numbering of residues may be determined for a given antibody by alignment at regions of homology of the sequence of the antibody with a "standard" Kabat numbered sequence.

By "framework" or "FR" residues as used herein is meant the region of an antibody variable domain exclusive of those regions defined as CDRs. Each antibody variable domain framework can be further subdivided into the contiguous regions separated by the CDRs (FR1, FR2, FR3 and FR4). The terms "Fc domain," "Fc portion," and "Fc region" refer to a C-terminal fragment of an antibody heavy chain, e.g., from about amino acid (aa) 230 to about aa 450 of human γ (gamma) heavy chain or its counterpart sequence in other types of antibody heavy chains (e.g., α, δ, ε and μ for human antibodies), or a naturally occurring allotype thereof. Unless otherwise specified, the commonly accepted Kabat amino acid numbering for immunoglobulins is used throughout this disclosure (see Kabat et al. (1991) Sequences of Protein of Immunological Interest, 5th ed., United States Public Health Service, National Institute of Health, Bethesda, MD).

The term "specifically binds to" means that an antibody can bind in a competitive binding assay to the binding partner, e.g. KIR3DL2, as assessed using either recombinant forms of the proteins, epitopes therein, or native proteins present on the surface of isolated target cells. Competitive binding assays and other methods for determining specific binding are further described below and are well known in the art.

When an antibody is said to "compete with" a particular monoclonal antibody, it means that the antibody competes with the monoclonal antibody in a binding assay using either recombinant KIR3DL2 molecules or surface expressed KIR3DL2 molecules. For example, if a test antibody reduces the binding of AZ158, 19H12, 2B12 or 12B11 to a KIR3DL2 polypeptide or KIR3DL2-expressing cell in a binding assay, the antibody is said to "compete" respectively with AZ158, 19H12, 2B12 or 12B11.

The term "affinity", as used herein, means the strength of the binding of an antibody to an epitope. The affinity of an antibody is given by the dissociation constant Kd, defined as [Ab]×[Ag]/[Ab-Ag], where [Ab-Ag] is the molar concentration of the antibody-antigen complex, [Ab] is the molar concentration of the unbound antibody and [Ag] is the molar concentration of the unbound antigen. The affinity constant $K_a$ is defined by 1/Kd. Methods for determining the affinity of mAbs can be found in Harlow, et al., Antibodies: A Laboratory Manual, Cold Spring Harbor Laboratory Press, Cold Spring Harbor, N.Y., 1988), Coligan et al., eds., Current Protocols in Immunology, Greene Publishing Assoc. and Wiley Interscience, N.Y., (1992, 1993), and Muller, Meth. Enzymol. 92:589-601 (1983), which references are entirely incorporated herein by reference. One standard method well known in the art for determining the affinity of mAbs is the use of surface plasmon resonance (SPR) screening (such as by analysis with a BIAcore™ SPR analytical device).

A "determinant" designates a site of interaction or binding on a polypeptide.

The term "epitope" refers to an antigenic determinant, and is the area or region on an antigen to which an antibody binds. A protein epitope may comprise amino acid residues directly involved in the binding as well as amino acid residues which are effectively blocked by the specific antigen binding antibody or peptide, i.e., amino acid residues within the "footprint" of the antibody. It is the simplest form or smallest structural area on a complex antigen molecule that can combine with e.g., an antibody or a receptor. Epitopes can be linear or conformational/structural. The term "linear epitope" is defined as an epitope composed of amino acid residues that are contiguous on the linear sequence of amino acids (primary structure). The term "conformational or structural epitope" is defined as an epitope composed of amino acid residues that are not all contiguous and thus represent separated parts of the linear sequence of amino acids that are brought into proximity to one another by folding of the molecule (secondary, tertiary and/or quaternary structures). A conformational epitope is dependent on the 3-dimensional structure. The term "conformational" is therefore often used interchangeably with "structural".

The term "depleting", "deplete" or "depletion", with respect to KIR3DL2-expressing cells means a process, method, or compound that can kill, eliminate, lyse or induce such killing, elimination or lysis (e.g. through induction of ADCC or ADCP), so as to negatively affect the number of KIR3DL2-expressing cells present in a sample or in a subject.

The terms "immunoconjugate", "antibody conjugate", "antibody drug conjugate", and "ADC" are used interchangeably and refer to an antibody that is conjugated to another moiety (e.g. any non-antibody moiety, a therapeutic agent, a cytotoxic moiety, or a label).

The term "agent" is used herein to denote a chemical compound, a mixture of chemical compounds, a biological macromolecule, or an extract made from biological materials. The term "therapeutic agent" refers to an agent that has biological activity.

The term "antibody-dependent cell-mediated cytotoxicity" or "ADCC" is a term well understood in the art, and refers to a cell-mediated reaction in which non-specific cytotoxic cells that express Fc receptors (FcRs) recognize bound antibody on a target cell and subsequently cause lysis of the target cell. Non-specific cytotoxic cells that mediate ADCC include natural killer (NK) cells, macrophages, monocytes, neutrophils, and eosinophils.

The terms "isolated", "purified" or "biologically pure" refer to material that is substantially or essentially free from components which normally accompany it as found in its native state. Purity and homogeneity are typically determined using analytical chemistry techniques such as polyacrylamide gel electrophoresis or high performance liquid chromatography. A protein that is the predominant species present in a preparation is substantially purified.

The terms "polypeptide," "peptide" and "protein" are used interchangeably herein to refer to a polymer of amino acid residues. The terms apply to amino acid polymers in which one or more amino acid residue is an artificial chemical mimetic of a corresponding naturally occurring amino acid, as well as to naturally occurring amino acid polymers and non-naturally occurring amino acid polymer.

The term "recombinant" when used with reference, e.g., to a cell, or nucleic acid, protein, or vector, indicates that the cell, nucleic acid, protein or vector, has been modified by the introduction of a heterologous nucleic acid or protein or the alteration of a native nucleic acid or protein, or that the cell is derived from a cell so modified. Thus, for example, recombinant cells express genes that are not found within the native (nonrecombinant) form of the cell or express native genes that are otherwise abnormally expressed, under expressed or not expressed at all.

Within the context herein, the term antibody that "binds" a polypeptide or epitope designates an antibody that binds said determinant with specificity and/or affinity.

The term "identity" or "identical", when used in a relationship between the sequences of two or more polypeptides, refers to the degree of sequence relatedness between polypeptides, as determined by the number of matches between strings of two or more amino acid residues. "Identity" measures the percent of identical matches between the smaller of two or more sequences with gap alignments (if any) addressed by a particular mathematical model or computer program (i.e., "algorithms"). Identity of related polypeptides can be readily calculated by known methods. Such methods include, but are not limited to, those described in Computational Molecular Biology, Lesk, A. M., ed., Oxford University Press, New York, 1988; Biocomputing: Informatics and Genome Projects, Smith, D. W., ed., Academic Press, New York, 1993; Computer Analysis of Sequence Data, Part 1, Griffin, A. M., and Griffin, H. G., eds., Humana Press, New Jersey, 1994; Sequence Analysis in Molecular Biology, von Heinje, G., Academic Press, 1987; Sequence Analysis Primer, Gribskov, M. and Devereux, J., eds., M. Stockton Press, New York, 1991; and Carillo et al., SIAM J. Applied Math. 48, 1073 (1988).

Methods for determining identity are designed to give the largest match between the sequences tested. Methods of determining identity are described in publicly available computer programs. Computer program methods for determining identity between two sequences include the GCG program package, including GAP (Devereux et al., Nucl. Acid. Res. 12, 387 (1984); Genetics Computer Group, University of Wisconsin, Madison, Wis.), BLASTP, BLASTN, and FASTA (Altschul et al., J. Mol. Biol. 215, 403-410 (1990)). The BLASTX program is publicly available from the National Center for Biotechnology Information (NCBI) and other sources (BLAST Manual, Altschul et al. NCB/NLM/NIH Bethesda, Md. 20894; Altschul et al., supra). The well-known Smith Waterman algorithm may also be used to determine identity.

Treatment of T Cell Malignancies

Described herein are methods useful in the treatment and prevention of a TCL in an individual through the administration of agents that induce or increase KIR3DL2 expression at the surface of malignant T cells, to potentiate the activity of an antibody that binds a KIR3DL2 polypeptide. The treatment regimens and methods described herein can be used for a variety of T cell lymphomas, particularly, CD4+ T cell lymphomas. In any aspect, a TCL can be specified to be a TCL characterized by malignant cells that express KIR3DL2 at their surface.

As shown herein, gemcitabine (Gemzar®, Eli Lilly and Company) can induce or increase KIR3DL2 expression at the surface of malignant T cells. Gemcitabine is a nucleoside analog approved as chemotherapy in the treatment of solid tumors. As with fluorouracil and other analogues of pyrimidines, the drug replaces one of the building blocks of nucleic acids, in this case cytidine, during DNA replication. Accordingly, gemcitabine and analogues and derivatives thereof can be used to potentiate the activity of an antibody that binds a KIR3DL2 polypeptide.

As shown herein, oxaliplatin can induce or increase KIR3DL2 expression at the surface of malignant T cells. Oxaliplatin and other platinum agents are well known in the art, and include for example cisplatin, carboplatin, nedaplatin, phenanthriplatin, picoplatin, satraplatin. Accordingly, platinum agents can be used to potentiate the activity of an antibody that binds a KIR3DL2 polypeptide.

The platinum agent and/or gemcitabine agent can be in any suitable configuration or formulation, including for example as free compound or as part of a conjugate, nanoparticle-formulation, encapsulated (e.g. in a liposome), in each case optionally further in a combination with additional pharmaceutically active agents.

Accordingly, in one aspect, provided are methods for treating an individual having a TCL, the method comprising administering to the individual an effective amount of each of: (a) an antibody that binds a KIR3DL2 polypeptide, and (b) a platinum agent and/or gemcitabine. In one embodiment, the method comprises administering to the individual an antibody that binds a KIR3DL2 polypeptide, a platinum agent (e.g. oxaliplatin) and gemcitabine. In another embodiment, the method comprises administering to the individual an antibody that binds a KIR3DL2 polypeptide and a platinum agent (e.g. oxaliplatin), without combined administration or use of gemcitabine. In another embodiment, the method comprises administering to the individual an antibody that binds a KIR3DL2 polypeptide and gemcitabine, without combined administration or use of oxaliplatin. In another embodiment, the method comprises administering to the individual an antibody that binds a KIR3DL2 polypeptide and gemcitabine, without combined administration or use of a platinum agent.

In one embodiment, the platinum agent (e.g. oxaliplatin) and/or gemcitabine are administered in an amount effective to cause an increase the expression of KIR3DL2 polypeptides on the surface of malignant cells.

In one aspect, provided are methods for increasing the expression of KIR3DL2 polypeptides on the surface of malignant cells, optionally TCL cells (e.g., in vitro or in vivo in an individual having a TCL), the method comprising contacting the malignant cells with an effective amount of a platinum agent and/or gemcitabine. In one embodiment, the method further comprises a step of depleting the KIR3DL2-expressing malignant cells (e.g. having increased expression of KIR3DL2), wherein the step comprises contacting the malignant cells with an effective amount of an antibody that binds a KIR3DL2 polypeptide.

Combination therapies for the treatment of cancer provided herein can comprise administration of: (a) a depleting anti-KIR3DL2 antibody (e.g., a KIR3DL2-binding antibody or antibody fragment, an effector cell expressing at its surface chimeric activating receptor (e.g. T cell receptor) comprising a KIR3DL2-binding antibody fragment) and (b) a platinum agent, optionally oxaliplatin, to treat an individual having a T cell malignancy, optionally a CD4+ T cell malignancy.

In another embodiment, combination therapies for the treatment of cancer provided herein comprises administration of: (a) a depleting anti-KIR3DL2 antibody (e.g., a KIR3DL2-binding antibody or antibody fragment, an effector cell expressing at its surface chimeric activating receptor (e.g. T cell receptor) comprising a KIR3DL2-binding antibody fragment) and (b) a nucleoside analog, optionally gemcitabine, to treat an individual having a T cell malignancy, optionally a CD4+ T cell malignancy.

In another embodiment, combination therapies for the treatment of cancer provided herein comprises administration of: (a) a depleting anti-KIR3DL2 antibody (e.g., a KIR3DL2-binding antibody or antibody fragment, an effector cell expressing at its surface chimeric activating receptor (e.g. T cell receptor) comprising a KIR3DL2-binding antibody fragment) and (b) a platinum agent, optionally oxaliplatin, and (c) a nucleoside analog, optionally gemcitabine, to treat an individual having a T cell malignancy, optionally a CD4+ T cell malignancy.

Provided are therapeutic methods for treating individuals having a TCL, susceptible to a TCL or having experienced a TCL. In one embodiment, the TCL is an aggressive or advanced TCL (e.g. stage IV, or more generally beyond stage II). In one embodiment, the patient has relapsing or refractory disease. In one embodiment, the patient has a poor prognosis for disease progression (e.g. poor prognosis for survival), has a poor prognosis for response to a therapy, or has progressing or relapsing disease following prior treatment with a prior therapy.

In one embodiment, the TCL is an aggressive T-cell neoplasm. In one embodiment, the TCL is aggressive non-cutaneous TCL. In another embodiment, the TCL is aggressive cutaneous TCL, optionally a primary cutaneous CD4+ small/medium T cell lymphoma or a primary CD8+ small/medium T cell lymphoma. In one embodiment, the TCL is a cutaneous T cell lymphoma (CTCL). In one embodiment, the TCL is a peripheral T cell lymphoma (PTCL), optionally a non-cutaneous PTCL. PTCL and PTCL-NOS may optionally be specified to be diseases other than cutaneous T cell lymphomas.

Cutaneous T-cell lymphoma (CTCL) (see the image below) is a group of lymphoproliferative disorders characterized by localization of neoplastic T lymphocytes to the skin. Collectively, CTCL is classified as a type of non-Hodgkin lymphoma (NHL). The World Health Organization—European Organization for Research and Treatment of Cancer (WHO-EORTC) classification of CTCLs is reported in Willemze et al. (2005) Blood 105:3768-3785. The WHO-EORTC divides CTCL into those with indolent clinical behavior and those with aggressive subtypes. A third category is that of precursor hematologic neoplasms that are not T-cell lymphomas (CD4+/CD56+ hematodermic neoplasm, blastic natural killer (NK)-cell lymphoma or B-cell derived primary cutaneous neoplasms). CTCLs which can have indolent clinical behavior include Mycosis fungoides (MF) and its variants, primary cutaneous CD30+ lymphoproliferative disorder (e.g., primary cutaneous anaplastic large cell lymphoma, lymphomatoid papulosis), subcutaneous panniculitis-like T-cell lymphoma (provisional) and primary cutaneous CD4+ small/medium-sized pleomorphic T-cell lymphoma (provisional). CTCLs with aggressive clinical behavior include Sézary syndrome (SS), Adult T-cell leukemia/lymphoma, Extranodal NK/T-cell lymphoma, nasal type, Primary cutaneous peripheral T-cell lymphoma, unspecified, Primary cutaneous aggressive epidermotropic CD8+ T-cell lymphoma (provisional) and Cutaneous gamma/delta-positive T-cell lymphoma (provisional). The methods disclosed herein can be used to treat each of these conditions.

The most common CTCLs are MF and SS. Their features are reviewed, e.g. in Willemze et al. (2005) Blood 105:3768-3785, the disclosure of which is incorporated herein by reference. In most cases of MF, the diagnosis is reached owing to its clinical features, disease history, and histomorphologic and cytomorphologic findings. An additional diagnostic criterion to distinguish CTCL from inflammatory dermatoses is demonstration of a dominant T-cell clone in skin biopsy specimens by a molecular assay (e.g., Southern blot, polymerase chain reaction (PCR)). Genetic testing may also be considered. Classic mycosis fungoides is divided into three stages: (1) Patch (atrophic or non-atrophic): Nonspecific dermatitis, patches on lower trunk and buttocks; minimal/absent pruritus; (2) Plaque: Intensely pruritic plaques, lymphadenopathy and (3) Tumor: Prone to ulceration. Sézary syndrome is defined by erythroderma and leukemia. Signs and symptoms include edematous skin, lymphadenopathy, palmar and/or plantar hyperkeratosis, alopecia, nail dystrophy, ectropion and hepatosplenomegaly. For a diagnosis of Sézary syndrome, criteria typically include absolute Sézary cell count, immunophenotypic abnormalities, loss of T-cell antigens and/or a T-cell clone in the peripheral blood shown by molecular or cytogenetic methods.

CTCL stages include I, II, Ill and IV, according to TNM classification, and as appropriate, peripheral blood involvement. Peripheral blood involvement with mycosis fungoides or Sézary syndrome (MF/SS) cells is correlated with more advanced skin stage, lymph node and visceral involvement, and shortened survival. MF and SS have a formal staging system proposed by the International Society for Cutaneous Lymphomas (ISCL) and the European Organization of Research and Treatment of Cancer (EORTC). See, Olsen et al., (2007) Blood. 110(6):1713-1722; and Agar et al. (2010) J. Clin. Oncol. 28(31):4730-4739, the disclosures of which are incorporated herein by reference.

In one embodiment, the TCL is a peripheral T cell lymphoma (PTCL), optionally a non-cutaneous PTCL. PTCL and PTCL-NOS may optionally be specified to be diseases other than cutaneous T cell lymphomas Sezary Syndrome and Mycosis fungoides which are considered distinct pathologies. In one embodiment, the PTCL is a nodal (e.g. primarily or predominantly nodal) PTCL. Predominantly nodal PTCLs include, inter alia, PTCL-NOS (Peripheral T-cell lymphomas, not otherwise specified), anaplastic large cell lymphomas (ALCL) and angioimmunoblastic T-cell lymphomas (AITL), For example a PTCL may be an aggressive, non-cutaneous, predominantly nodal PCTL (the disease may additionally have extra-nodal presentation).

In one embodiment, the PTCL is an extranodal (e.g. primarily extranodal) PTCL. For example a PTCL may be an aggressive, non-cutaneous, extranodal PCTL.

In one embodiment, the PTCL is an adult T cell leukemia or lymphoma (ATL), e.g., an HTLV+ ATL.

In one embodiment, the PTCL is an extranodal NK-/T-cell lymphoma, nasal type. In one embodiment, the PTCL is an enteropathy-associated T cell lymphoma.

In one embodiment, the PTCL is a hepatosplenic T cell lymphoma, optionally a hepatosplenic αβ T cell lymphoma, optionally a hepatosplenic γδ T cell lymphoma.

In one embodiment, the PTCL is an anaplastic large cell lymphoma (ALCL), optionally an ALK+ ALCL, optionally an ALK– ALCL. ALK+ ALCL generally enjoys favorable prognostics using conventional therapy (93% 5 year survival) but ALK– ALCL has poor prognostics (37%). ALCL is generally characterized by uniform CD30 surface expression. In one embodiment, the PTCL is an angioimmunoblastic T-cell lymphoma (AITL), optionally a cutaneous AITL, optionally a primary cutaneous CD4+ small/medium T cell lymphoma or a primary CD8+ small/medium T cell lymphoma, optionally a non-cutaneous AITL.

In one embodiment, the PTCL is an intestinal lymphoma, e.g. an intestinal ALCL.

In one embodiment, the PTCL is a T-cell prolymphocytic leukemia.

In one embodiment, a PTCL is a PTCL-NOS (Peripheral T-cell lymphoma, not otherwise specified). PTCL-NOS, also referred to as PCTL-U or PTCL-unspecified, are aggressive lymphomas, mainly of nodal type, but extranodal involvement is common. The majority of nodal cases are CD4+ and CD8−, and CD30 can be expressed in large cell variants. Most patients with PTCL-NOS present with nodal involvement; however, a number of extranodal sites may also be involved (e.g., liver, bone marrow, gastrointestinal, skin. Studies generally report a 5-year overall survival of approximately 30%-35% using standard chemotherapy. In the past, a number of definite entities corresponding to recognizable subtypes of T-cell neoplasm, such as Lennert lymphoma, T-zone lymphoma, pleomorphic T-cell lymphoma and T-immunoblastic lymphoma have been described, but evidence that these correspond to distinctive clinicopathologic entities is still lacking. For this reason the recent World Health Organization (WHO) classification of the hematopoietic and lymphoid neoplasms has collected these under the single broad category of PTCL-NOS/U. PTCL-NOS may therefore be specified to exclude certain distinctive clinicopathologic entities such as T-cell prolymphocytic leukemia, ATL/adult T cell leukemia, extranodal NK-/T-cell leukemia nasal type, EATL/enteropathy-type T cell lymphoma, hepatosplenic T-cell lymphoma, subcutaneous panniculitis-like T-cell lymphoma, ALCL/anaplastic large-cell lymphoma, and/or AITL/angioimmunoblastic T cell lymphoma.

PTCL diagnosis criteria can be those of standard medical guidelines, for example, according to the World Health Organization (WHO) classification system (see, e.g., World Health Organization. WHO Classification of Tumours of Haematopoietic and Lymphoid Tissues, $4^{th}$ ed. Lyon, France: IARC Press, 2008). See also, e.g., Foss et al. (2011) Blood 117:6756-6767, the disclosures of which are incorporated herein by reference.

In one embodiment, a TCL is characterized by tumors or tumor cells that do not express significant and/or detectable CD30 polypeptides at their surface (CD30-negative). In other embodiments, the TCL is characterized by tumors or tumor cells that express CD30 at their surface (CD30-positive); in one embodiment, the tumor or tumor cells express at their surface low levels of CD30; in another embodiment, the tumors or tumor cells express at their surface high levels of CD30. Optionally, CD30 expression is determined by immunohistochemistry.

In one exemplary aspect, provided is a method of reducing progression of TCL in a mammalian host, (e.g., a human patient) having a detectable level of cancer cells comprising administering an anti-KIR3DL2 antibody, an anti-KIR3DL2 antibody composition, or a related composition (e.g., a nucleic acid encoding an anti-KIR3DL2 antibody, a cell composition expressing an anti-KIR3DL2 antibody fragment), in an amount sufficient to detectably reduce the progression of the haematological malignancy in the host.

In one exemplary aspect, provided is a method of treating TCL in an individual having a poor disease prognosis and/or who has relapsed, is resistant or is not responsive to therapy with a first therapeutic agent.

PTCL (e.g. PTCL-NOS) is typically based on examination of peripheral blood or tissue biopsy for histological features supplemented by detailed immunohistochemistry, flow cytometry, cytogenetics and molecular genetics. Examination may include, for example, full blood count and differential, tests of renal and hepatic function, lactate dehydrogenase (LDH), Beta2 microglobulin, albumin, serum calcium, uric acid, bone marrow biopsy, chest X-ray and computerised tomography (CT) scan of chest, abdomen and pelvis. Progression is optionally determined by assessing the selective clonal expansion of initiated cells. Methods for detecting cancers and cancer progression can be achieved by any suitable technique, several examples of which are known in the art. Examples of suitable techniques include PCR and RT-PCR (e.g., of cancer cell associated genes or "markers"), biopsy, imaging techniques, karyotyping and other chromosomal analysis, immunoassay/immunocytochemical detection techniques, histological and/or histopathology assays, cell kinetic studies and cell cycle analysis, flow cytometry, and physical examination techniques (e.g., for physical symptoms).

Delivering anti-KIR3DL2 antibodies to a subject (either by direct administration as an isolated or purified antibody (e.g. an antibody in solution), as an antibody fragment expressed by a CAR cell, or by expression from a nucleic acid therein, such as from a pox viral gene transfer vector comprising anti-KIR3DL2 antibody-encoding nucleic acid sequence(s)) and practicing the other methods herein can be used to reduce, treat, prevent, or otherwise ameliorate any suitable aspect of cancer progression (notably TCL progression). The methods herein can be particularly useful in the reduction and/or amelioration of tumor growth (e.g. percentage (tumor cells compared to healthy T cells), number of tumor cells in circulation), and any parameter or symptom associated therewith (e.g. biomarkers). Methods that reduce, prevent, or otherwise ameliorate such aspects of cancer progression, independently and collectively, are advantageous features.

In a further aspect, provided is a method of promoting remission of a TCL in a mammalian host, such as a human patient, comprising administering a composition comprising an anti-KIR3DL2 antibody, to the host, so as to promote TCL remission in the host.

In an even further aspect, provided is a method for reducing the risk of developing a TCL, reducing the time to onset of a cancerous condition, and/or reducing the severity of a TCL diagnosed in the early stages, comprising administering to a host a prophylactically effective amount of an anti-KIR3DL2 antibody or related composition so as to achieve the desired physiological effect(s).

In a further aspect, provided is a method of increasing the likelihood of survival over a relevant period in a human patient diagnosed with TCL. In another aspect, provided is a method for improving the quality of life of a TCL patient comprising administering to the patient a composition in an amount effective to improve the quality of life thereof. In a further aspect, methods described herein can be applied to significantly reduce the number of TCL cells in a vertebrate host, such that, for example, the total number of TCL cells is reduced. In a related sense, provided is a method for killing (e.g. either directly or indirectly causing death of) TCL cells in a vertebrate, such as a human cancer patient.

As used herein, adjunctive or combined administration includes simultaneous administration of the compounds in the same or different dosage form, or separate administration of the compounds (e.g., sequential administration). Thus, a KIR3DL2-binding antibody can be used in combination with a platinum agent and/or gemcitabine. For example, an anti-KIR3DL2 antibody and a platinum agent and/or gemcitabine can be simultaneously administered in a single formulation. Alternatively, the anti-KIR3DL2 antibody and platinum agent and/or gemcitabine can be formulated for separate administration and are administered concurrently or sequentially.

A suitable dose for administration of gemcitabine is a dose of 800-1200 mg/m$^2$, administered intravenously. The administration of gemcitabine can be repeated once every 2 weeks. Alternatively, gemcitabine can be administered at days 1 and 8 of a 3 week cycle (that can be repeated).

A suitable dose for administration of oxaliplatin is a dose of 75-150 mg/m$^2$ (e.g., 75 mg/m$^2$, 100 mg/m$^2$, 130 mg/m$^2$, 75-130 mg/m$^2$), administered intravenously. The administration of oxaliplatin can be repeated every 2 weeks, for example at a dose of 75-100 mg/m$^2$ (e.g., 75 mg/m$^2$, 100 mg/m$^2$). Alternatively oxaliplatin can be administered once every three weeks (e.g. at days 1 and 8 of a 3 week cycle, where the cycle can be repeated). When oxaliplatin is be administered once every three weeks the dose range may optionally be higher than when administered 2 weekly, e.g. a dose of 100-150 mg/m$^2$ (e.g., 100 mg/m$^2$, 130 mg/m$^2$) for the 3-weekly regimen.

Generally, the treatment comprises at least one administration cycle (e.g. a period of eight weeks or less), wherein for each of the at least one cycles, two, three or four doses of the anti-KIR3DL2 antibody are administered and at least two, three or four doses of a platinum agent (e.g. oxaliplatin) and/or gemcitabine are administered.

Gemcitabine and oxaliplatin can be administered on the same day (e.g. day 1), or gemcitabine can for example be administered on a first day (day 1), followed by oxaliplatin on the following day (day 2).

Suitable treatment protocols for treating a human having a CTL (e.g. a PTCL, a CTCL, a MF or SS) include, for example, administering to the patient an effective amount of each of an anti-KIR3DL2 antibody and gemcitabine, wherein the treatment comprises at least one administration cycle in which at least one dose, optionally at least two doses, of the anti-KIR3DL2 antibody is administered (e.g. every week, every two weeks, every four weeks), and at least one dose, optionally at least two doses, of gemcitabine is administered, optionally wherein the gemcitabine is administered at a dose of about 800-1200 mg/m$^2$, optionally about 800-1000 mg/m$^2$. Optionally, gemcitabine is administered once every 2 weeks or on days 1 and 8 of a repeated 3 week cycle. Optionally, the treatment protocol is characterized as being without combined treatment with a platinum agent or oxaliplatin.

An exemplary treatment protocols for treating a human having a MF or SS can include, for example, administering to the patient an effective amount of each of an anti-KIR3DL2 antibody and gemcitabine, wherein the treatment comprises at least one administration cycle in which at least one dose, optionally at least two doses, of the anti-KIR3DL2 antibody is administered (e.g. every week, every two weeks, every four weeks), and at least one dose, optionally at least two doses, of gemcitabine is administered, wherein the gemcitabine is administered at a dose of about 800-1200 mg/m$^2$ on weeks 1, 2 and 3 (e.g. on about days 1, 8 and 15) of a repeated 4 week cycle. The 4 week cycle can be repeated, e.g. for a period of 3, 4, 5, 6 or more months. The protocol may be characterized as being without combined treatment with a platinum agent or oxaliplatin.

Further suitable treatment protocols for treating a human having a CTL (e.g. a PTCL) include, for example, administering to the patient an effective amount of each of an anti-KIR3DL2 antibody and oxaliplatin, wherein the treatment comprises at least one administration cycle in which at least one dose, optionally at least two doses, of the anti- KIR3DL2 antibody is administered (e.g. every week, every two weeks, every four weeks), and at least one dose, optionally at least two doses, of oxaliplatin is administered, optionally wherein the oxaliplatin is administered at a dose of about 75-130 mg/m². Optionally, oxaliplatin is administered once every 2 weeks or once every 3 weeks.

Another suitable treatment protocols for treating a human having a PCTL include, for example, administering to the patient an effective amount of each of an anti-KIR3DL2 antibody, gemcitabine and oxaliplatin, wherein the treatment comprises at least one administration cycle comprising administration of:

at least one dose, optionally at least two doses, of anti-KIR3DL2 antibody (e.g. every week, every two weeks, every four weeks), at least one dose, optionally at least two doses, of gemcitabine, optionally wherein gemcitabine is administered at a dose of about 800-1000 mg/m², optionally wherein gemcitabine is administered once every 2 weeks or on days 1 and 8 of a repeated 3 week cycle, and at least one dose, optionally at least two doses, of oxaliplatin, optionally wherein oxaliplatin is administered at a dose of about 75-130 mg/m², optionally wherein oxaliplatin is administered once every 2 weeks or once every 3 weeks (e.g. or on day 1 of a repeated 3 week cycle). In one embodiment, oxaliplatin and gemcitabine are each administered once every two weeks, optionally further on the same day. In another embodiment, oxaliplatin and gemcitabine are each administered every 3 weeks, wherein oxaliplatin is administered on day 1 of the 3-week period and gemcitabine is administered on days 1 and 8 of the 3-week period.

It will be appreciated that an administration cycle can be a suitable period of time consistent with the administration frequencies described herein. For example, an administration cycle may be a period of 4 weeks, 8 weeks, more than 8 weeks, less than 8 weeks, etc.

In one embodiment, anti-KIR3DL2 antibody is administered on the same day as gemcitabine and/or oxaliplatin. In one embodiment, anti-KIR3DL2 antibody is administered at least one day (e.g. one, two, three days) following administration of gemcitabine. In one embodiment, anti-KIR3DL2 antibody is administered at least one day (e.g. one, two, three days) following administration of oxaliplatin. In one embodiment, anti-KIR3DL2 antibody is administered at least one day (e.g. one, two, three, four, five, six or seven days) following administration of both gemcitabine and oxaliplatin (e.g. at least one day after the later to be administered compound).

The anti-KIR3DL2 antibody (e.g. the humanized 2B12 antibody known as IPH4102 or lacutamab) can be advantageously administered by intravenous infusion at a dose of 1-20 mg/kg body weight, optionally 1-10 mg/kg body weight, or at a flat dose of 750 mg. The anti-KIR3DL2 antibody can be advantageously administered 1-4 times per month, for example once per week, once every two weeks or once every four weeks. In one embodiment, the anti-KIR3DL2 antibody is administered according to a regimen comprising a first phase during which the anti-KIRDL2 antibody is administered weekly (e.g. four weekly administrations), followed by a second phase during which the anti-KIRDL2 antibody is administered less than once per week, e.g. 1-2 times per month, once every two weeks, once per month. In one embodiment, the anti-KIR3DL2 antibody is administered according to a regimen comprising a first phase during which the anti-KIRDL2 antibody is administered weekly (e.g. four weekly administrations), followed by a second phase during which the anti-KIRDL2 antibody is administered once every two weeks (e.g. at least 2 successive administrations administered every two weeks, for example 2, 3, 4, 5, 6, 7, 8, 9 or 10 or more administrations administered once every two weeks), followed by a third phase during which the anti-KIRDL2 antibody is administered once per month (e.g. .g. at least 2 successive administrations administered once per month, for example 2, 3, 4, 5, 6, 7, 8, 9 or 10 or more administrations administered once per month.

When combined with gemcitabine and oxaliplatin, a treatment method can for example be specified as comprising at least one administration cycle (e.g. a period of eight weeks or less, optionally eight weeks, optionally four weeks), wherein for each of the at least one cycles, two, three or four doses of the anti-KIR3DL2 antibody are administered (e.g. humanized 2B12 antibody at a dose of 1-20 or 1-10 mg/kg body weight, at a flat dose of 750 mg) and at least two, three or four doses of gemcitabine and oxaliplatin are administered. Gemcitabine and oxaliplatin can be specified as being administered on the same day or on consecutive days (e.g., oxaliplatin at 75-130 mg/m² administered on the day following the administration of gemcitabine at 800-1000 mg/m²). The KIR3DL2-binding antibody can be specified as being administered on the same day as gemcitabine and/or oxaliplatin, on consecutive days before or after gemcitabine and/or oxaliplatin, or several days before or after gemcitabine and/or oxaliplatin.

In the treatment methods, the KIR3DL2-binding antibody and the platinum and/or gemcitabine agents can be administered separately, together or sequentially, or in a cocktail. In some embodiments, the KIR3DL2-binding antibody is administered prior to the administration of the platinum and/or gemcitabine agent(s). For example, the KIR3DL2-binding antibody can be administered approximately 0 to 30 days, optionally 1 to 7 days, prior to the administration of gemcitabine, or 0 to 30 days, optionally 1 to 7 days, prior to the administration of the platinum agent. In some embodiments, an KIR3DL2-binding antibody is administered from about 30 minutes to about 2 weeks, from about 30 minutes to about 1 week, from about 1 hour to about 2 hours, from about 2 hours to about 4 hours, from about 4 hours to about 6 hours, from about 6 hours to about 8 hours, from about 8 hours to 1 day, or from about 1 to 5 days prior to the administration of gemcitabine (or of the platinum agent). In some embodiments, a KIR3DL2-binding antibody is administered concurrently with the administration of the platinum agent and/or gemcitabine. In some embodiments, the KIR3DL2-binding antibody is administered after the administration of the platinum and/or gemcitabine agent(s). For example, a KIR3DL2-binding antibody can be administered approximately 0 to 30 days, optionally 1 to 7 days, after the administration of the platinum and/or gemcitabine agent(s). In some embodiments, an KIR3DL2-binding antibody is administered from about 30 minutes to about 2 weeks, from about 30 minutes to about 1 week, from about 1 hour to about 2 hours, from about 2 hours to about 4 hours, from about 4 hours to about 6 hours, from about 6 hours to about 8 hours, from about 8 hours to 1 day, or from about 1 to 5 days after the administration of the platinum and/or gemcitabine agent(s).

In one embodiment, the anti-KIR3DL2 antibody and platinum and/or gemcitabine agent are administered at the following doses:

(a) 750 mg anti-KIR3DL2 antibody and (i) 75-130 mg/m² of platinum agent (e.g. oxaliplatin) or (ii) 800-1200 mg/m² of gemcitabine;

(b) 1-10 mg/kg or 750 mg anti-KIR3DL2 antibody and 75-130 mg/m² oxaliplatin;
(c) 1-10 mg/kg or 750 mg anti-KIR3DL2 antibody and 800-1200 mg/m² gemcitabine;
(d) 1-10 mg/kg or 750 mg anti-KIR3DL2 antibody, 75-100 mg/m² oxaliplatin and 800-1000 mg/m² gemcitabine;
(e) 1-10 mg/kg or 750 mg anti-KIR3DL2 antibody, 100-130 mg/m² oxaliplatin and 800-1000 mg/m² gemcitabine.

Also provided are kits, for example kits which include:
(i) a pharmaceutical composition containing an anti-KIR3DL2 antibody and a pharmaceutical composition containing gemcitabine;
(ii) a pharmaceutical composition containing an anti-KIR3DL2 antibody and a pharmaceutical composition containing a platinum agent (e.g. oxaliplatin);
(iii) a pharmaceutical composition containing an anti-KIR3DL2 antibody, a pharmaceutical composition containing a platinum agent (e.g. oxaliplatin), and a pharmaceutical composition containing gemcitabine;
(iv) a first pharmaceutical composition containing an anti-KIR3DL2 antibody, and instructions to administer said anti-KIR3DL2 antibody together with a platinum agent (e.g. oxaliplatin) and/or gemcitabine;
(v) a pharmaceutical composition containing a platinum agent (e.g. oxaliplatin) and/or gemcitabine, and instructions to administer said composition together with an anti-KIR3DL2 antibody;
(vi) a pharmaceutical composition containing a platinum agent (e.g. oxaliplatin), and instructions to administer said composition together with an anti-KIR3DL2 antibody (and optionally further gemcitabine);
(vii) a pharmaceutical composition containing gemcitabine, and instructions to administer said composition together with an anti-KIR3DL2 antibody (and optionally further a platinum agent (e.g. oxaliplatin).

A pharmaceutical composition may optionally be specified as comprising a pharmaceutically-acceptable carrier. An anti-KIR3DL2 antibody, platinum agent and/or gemcitabine may optionally be specified as being present in a therapeutically effective amount adapted for use in any of the methods herein, optionally an amount that increases KIR3DL2 levels at the surface of malignant TCL cells. The kits optionally also can include instructions, e.g., comprising administration schedules, to allow a practitioner (e.g., a physician, nurse, or patient) to administer the composition contained therein to a patient having cancer (e.g., in a particular CTCL or PTCL as disclosed herein). In any embodiment, a kit also can include a syringe.

Optionally, the kits include multiple packages of the single-dose pharmaceutical compositions each containing an effective amount of the anti-KIR3DL2 antibody, and/or the platinum agent (e.g. oxaliplatin) and/or gemcitabine, for a single administration in accordance with the methods provided above. Instruments or devices necessary for administering the pharmaceutical composition(s) also may be included in the kits. For instance, a kit may provide one or more pre-filled syringes or vials containing an amount of the anti-KIR3DL2 antibody, the platinum agent or gemcitabine.

In one embodiment, the present invention provides a kit for treating a TCL in a human patient, the kit comprising:
(a) a dose of an anti-KIR3DL2 antibody comprising the H-CDR1, H-CDR2 and H-CDR3 domains of a heavy chain variable region having the sequence set forth in any of SEQ ID NOS: 32 or 48-51, and the L-CDR1, L-CDR2 and L-CDR3 domains of a light chain variable region having the sequence set forth in SEQ ID NOS: 33 or 43-47; and/or
(b) a dose of a platinum agent (e.g. oxaliplatin) and/or a dose of gemcitabine; and
(c) optionally, instructions for using said anti-KIR3DL2 antibody and/or said platinum agent (e.g. oxaliplatin) and/or gemcitabine in any of the methods described herein.

In one embodiment, a treatment comprises administration of an anti-KIR3DL2 antibody, a platinum agent (e.g., oxaliplatin) and gemcitabine, without administration any further anti-cancer agent(s).

It will be appreciated that a treatment method of the disclosure may or may not involve a step of characterizing tumor cells for KIR3DL2-expression prior to treatment. In any embodiment, KIR3DL2 expression can be determined by immunohistochemistry.

In one embodiment, the methods comprise: (a) determining whether an individual has a TCL, optionally a PTCL; and (b) if the individual has a TCL, optionally a PTCL, determining whether an individual has TCL cells that express a KIR3DL2 polypeptide. A determination that the individual has TCL cells that express a KIR3DL2 polypeptide indicates that the individual can be treated with a treatment method of the disclosure. Optionally the method comprises a step of administering to the individual a treatment of the disclosure.

In one embodiment, the KIR3DL2 polypeptide is expressed in a substantial number of tumor cells (e.g. TCL cells) taken from a given patient. For example, KIR3DL2 may be present on at least 30%, 40%, 50°%, 60%, 70%, 80%, or more of the TCL cells taken from a patient.

A method can optionally further comprise a step of assessment of the development level of a TCL (staging disease) permitting the evaluation of the proportion (e.g. percentage) of malignant TCL cells present within a certain body compartment of a patient. According to this method, cells from a biological sample collected from said body compartment are brought into contact with an anti-KIR3DL2 antibody, and tumor cells (e.g. the proportion of cells) expressing a KIR3DL2 polypeptide at their surface is measured. The cells may be, for example CD4+ cells or CD4-CD8+ cells. A finding that tumor cells express, or predominantly express, KIR3DL2 indicates that the TCL is an aggressive or advanced TCL (e.g. stage IV, or more generally beyond stage II). Such a TCL can be advantageously treated using the treatment methods of the disclosure.

In any embodiment, a method may comprise a step of TCL diagnosis, comprising bringing cells from a biological sample from an individual into contact with an anti-KIR3DL2 antibody and the proportion (e.g. percentage) of T cells expressing a KIR3DL2 polypeptide at their surface is measured, and comparing such proportion to the average proportion (e.g. percentage) of T cells expressing a KIR3DL2 polypeptide at their surface observed in non-TCL humans (e.g., in healthy humans), wherein a TCL-positive diagnosis is made when said measured proportion is significantly higher than said average proportion.

In another embodiment, the methods comprise a step of determining the level of expression of a KIR3DL2 nucleic acid or polypeptide in a biological sample from an individual having received an administration of a platinum agent or gemcitine, e.g. on tumor cells found in a biological sample.

In another embodiment, the methods comprise a step of determining whether an anti-cancer agent (e.g. a platinum agent or gemcitine) increases the level of expression of a KIR3DL2 nucleic acid or polypeptide in a biological sample from an individual, e.g. on tumor cells found in a biological sample.

Determining the level of expression of a KIR3DL2 nucleic acid or polypeptide in a biological sample can comprise comparing the level to a reference level (e.g. a value, weak cell surface staining, etc.) corresponding to a healthy(s) individual or to the individual prior to treatment with the anticancer agent (e.g. platinum agent or gemcitine). A determination that a biological sample expresses a KIR3DL2 nucleic acid or polypeptide at a level that is increased compared to the reference level indicates that the individual has a TCL that can benefit from treatment with an anti-KIR3DL2 antibody, or optionally that the individual has a TCL that can benefit from treatment with an anti-KIR3DL2 antibody in combination with the anti-cancer agent (e.g. a platinum agent and/or gemcitine, respectively). Optionally, detecting a KIR3DL2 polypeptide in a biological sample comprises detecting KIR3DL2 polypeptide expressed on the surface of a malignant lymphocyte.

Production of Antibodies

KIR3DL2 (CD158k) is a disulphide-linked homodimer of three-Ig domain molecules of about 140 kD, described in Pende et al. (1996) J. Exp. Med. 184: 505-518, the disclosure of which is incorporated herein by reference. Several allelic variants have been reported for KIR3DL2 polypeptides, each of these are encompassed by the term KIR3DL2. The amino acid sequence of the mature human KIR3DL2 (allele *002) is shown in SEQ ID NO: 1, below, corresponding to Genbank accession no. AAB52520 in which the 21 amino acid residue leader sequence has been omitted.

```
                                          (SEQ ID NO: 1)
LMGGQDKPF   LSARPSTVVP  RGGHVALQCH

YRRGFNNFML  YKEDRSHVPI  FHGRIFQESF

IMGPVTPAHA  GTYRCRGSRP  HSLTGWSAPS

NPLVIMVTGN  HRKPSLLAHP  GPLLKSGETV

ILQCWSDVMF  EHFFLHRDGI  SEDPSRLVGQ

IHDGVSKANF  SIGPLMPVLA  GTYRCYGSVP

HSPYQLSAPS  DPLDIVITGL  YEKPSLSAQP

GPTVQAGENV  TLSCSSWSSY  DIYHLSREGE

AHERRLRAVP  KVNRTFQADF  PLGPATHGGT

YRCFGSFRAL  PCVWSNSSDP  LLVSVTGNPS

SSWPSPTEPS  SKSGICRHLH  VLIGTSVVIF

LFILLLFFLL  YRWCSNKKNA  AVMDQEPAGD

RTVNRQDSDE  QDPQEVTYAQ  LDHCVFIQRK

ISRPSQRPKT  PLTDTSVYTE  LPNAEPRSKV

VSCPRAPQSG  LEGVF.
```

The cDNA of KIR3DL2 (allele *002) is shown in Genbank accession no. U30272. The amino acid sequence of a human KIR3DL2 allele *003 is shown below, corresponding to Genbank accession no. AAB36593:

```
                                          (SEQ ID NO: 2)
MSLTVVSMAC  VGFFLLQGAW  PLMGGQDKPF

LSARPSTVVP  RGGHVALQCH  YRRGFNNFML

YKEDRSHVPI  FHGRIFQESF  IMGPVTPAHA

GTYRCRGSRP  HSLTGWSAPS  NPVVIMVTGN

HRKPSLLAHP  GPLLKSGETV  ILQCWSDVMF

EHFFLHREGI  SEDPSRLVGQ  IHDGVSKANF

SIGPLMPVLA  GTYRCYGSVP  HSPYQLSAPS

DPLDIVITGL  YEKPSLSAQP  GPTVQAGENV

TLSCSSWSSY  DIYHLSREGE  AHERRLRAVP

KVNRTFQADF  PLGPATHGGT  YRCFGSFRAL

PCVWSNSSDP  LLVSVTGNPS  SSWPSPTEPS

SKSGICRHLH  VLIGTSVVIF  LFILLLFFLL

YRWCSNKKNA  AVMDQEPAGD  RTVNRQDSDE

QDPQEVTYAQ  LDHCVFIQRK  ISRPSQRPKT

PLTDTSVYTE  LPNAEPRSKV  VSCPRAPQSG

LEGVF.
```

Also encompassed are any nucleic acid or protein sequences sharing one or more biological properties or functions with wild type, full length KIR3DL2 respectively, and sharing at least 70%, 80%, 90%, 95%, 96%, 97%, 98%, 99%, or higher nucleotide or amino acid identity.

Closely related KIR3DL1 (CD158e1) is a monomeric molecule of about 70 kD, described in Colonna and Samaridis (1995) Science 268 (5209), 405-408. The cDNA encoding a KIR3DL1 (CD158e2) polypeptide (allele *00101) is shown in Genbank accession no. L41269; the encoded amino acid sequence is shown in Genbank accession no. AAA69870. In one embodiment, a KIR3DL1 polypeptide referred to herein is allele *00101.

Exemplary of antibodies that bind human KIR3DL2 include antibodies 19H12, 12B11, 10F6, 2B12, 9E10, 10G5, 13H1, 5H1, 1E2, 1C3 or 20E9. These and further antibodies are provided in PCT/EP2013/069302 and PCT/EP2013/069293, both filed 17 Sep. 2013, the disclosures of which antibodies are incorporated herein by reference. These antibodies bind selectively to KIR3DL2 and do not bind KIR3DL1 (or KIR3DS1). While antibody 10F6, 2B12, 9E10, 10G5, 13H1, 5H1, 1E2, 1C3 or 20E9 can be used, for example, as therapeutic agent administered to an individual for the depleting of a KIR3DL2 expressing target, e.g. by induction of ADCC toward a pathogenic KIR3DL2-expressing cell, antibody 12B11 and 19H12 will be advantageous for use in detection (e.g. in vitro assays) of KIR3DL2 expression on the surface of cells because 12B11 and 19H12 are particularly efficient in the detection of KIR3DL2-positive cells in detection assays, 12B11 is advantageous for immunohistochemistry assays using frozen tissue sections, while 19H12 is advantageous for flow cytometry detection.

Each of 2B12, 10G5, 19H12 and 12B11 are also suitable for use as therapeutic agent administered to an individual for the elimination of a KIR3DL2-expressing target cells. 19H12 and 12B11 as well as other antibodies disclosed in PCT/EP2013/069293 are capable of being internalized into cells via KIR3DL2 and can be used advantageously as a depleting antibody configured as an antibody-drug conjugate, e.g. when the antibody is conjugated to a toxic moiety. 2B12 and other antibodies disclosed in PCT/EP2013/069302 do not induce any KIR3DL2 internalization into tumor cells, thereby providing advantageous use when effector cell mediated activity is sought, e.g. for depleting antibodies that induce ADCC.

The amino acid sequence of the heavy and light chain variable regions of antibodies 10F6, 9E10, 10G5, 13H1, 1E2, 1C3 or 20E9 are listed in Table A.

TABLE A

| Antibody | SEQ ID NO | Amino acid sequence |
|---|---|---|
| 10F6 VH | 27 | QIQLVQSGPELKKPGETVRI SCKASGYTFTIAGMQWVQKM PGKGLKWIGWINTHSGVPKY AEDFKGRFAFSLETSANIAY LQISNLKNEDTATYFCARGG DEGVMDYWGQGTSVTVS |
| 10F6 VL | 28 | DIVMTQSHKFMSTSVGDRVS ITCKASQDVSTAVAWYHQKP GQSPKLLIYWASTRHTGVPD RFSGSGSGTDYTLTISALQA EDLALYYCQQHYNTPWTFGG GTKLEIK |
| 9E10 VH | 29 | QVQLQQSAAELARPGASVKM SCKASGYTFTSYTMHWVKQR PGQGLEWIGYINPSSGYTDY NQKFKDKTTLTADRSSSTAY MQLSSLTSEDSAVYYCARLG KGLLPPFDYWGQGSTLTVSS |
| 9E10 VL | 30 | EIVLTQSIPSLTVSAGERVT ISCKSNQNLLWSGNQRYCLV WHQWKPGQTPTPLITWTSDR YSGVPDRFIGSGSVTDFTLT ISSVQAEDVAVYFCQQHLHI PYTFGGGTKLEIK |
| 13H1 VH | 31 | EVQLQQSGPELVKPGASMKI SCKASHYSFIGYTMNWVKQR HGKNLEWIGLINPYNGDTTY NQKFKGKASLTVDKSSSTAY MEILSLTSEDSAVYYCAREN WGYPYAMDYWGQGTSVTVS |
| 13H1 VL | 62 | DIVLTQSPASLAVSLGQRAT ISCRASESVDNFGISFMNWF QQKPGQPPKLLIYAASNQGS GVPARFSGSRSGTDFSLNIH PMEEDDTAMYFCQQSKEVPY TFGGGTKLEIK |
| 1E2 VH | 63 | QVQLQQSGAELVRPGVSVKI SCKGSGYTFTDYAMNWVKQS HAKSLEWIGVISTYYGDANY NQKFKGKATMTVDKSSSTAY MELARLTSEDSAIYYCALIY YDYDGSYWGQGTTLTVS |
| 1E2 VL | 64 | DVVMTQTPLSLPVSLGDQAS ISCRSSQSLVHSNGNTYLHW YLQKPGQSPKLLIYKVSNRF SGVPDRFSGSGSGTDFTLKI SRVEAEDLGVYFCSQSTHVP PYTFGGGTKLEIK |
| 1C3 VH | 65 | QVQLQQSGAELARPGASVKL SCKASGYTFTSYWMQWVKQR PGQGLEWIGAIYPDGDTRY TQKFKGKATLTADKSSSTAY MQLSSLASEDSAVYYCARRY DGYYHFDYWGQGTTLTVS |

TABLE A-continued

| Antibody | SEQ ID NO | Amino acid sequence |
|---|---|---|
| 1C3 VL | 66 | DIVMTQSPSSLAVTAGEKVT MSCKSSQSLLWSVNQKNYLS WYQQKQRQPPKLLIYGASIR ESWVPDRFTGSGSGTDFTLT ISNVHAEDLAVYYCQHNHGS FLPLTFGSGTKLEIK |
| 20E9 VH | 67 | QVQLQQSGAEVARPGASVKL SCKSSGFTFTTYWMQWVKQR PGQGLEWIGAIYPGDGDTRY TQKFKGKATLTADKSSITAY MQLSSLASEDSAVYYCARRG DYGNYGMDYWGQGTSVTVSS |
| 20E9 VL | 68 | DVLMTQTPLSLPVSLGDQAS ISCRSSQSIVHSNGNTYLEW YLQKPGQSPKLLIYKVSNHF SGVPDRFSGSGSGTDFTLKI SRVEAEDLGVYYCFQGSHVP PTFGGGTKLEIK |
| 10G5 VH | 69 | QVQLQQSAAELARPGASVKM SCKASGYTFTSYTMHWVKQR PGQGLEWIGYINPSSGYTEN NRKFKDKTTLTADKSSSTAY MQLSSLTSEDSAVYYCARLG KGLLPPFDYWGQGTTLTVSS AKTTPPSVYPLAPGSAAQT |
| 10G5 VL | 70 | DIQMTQSPASLSVSVGETVT ITCRASENIYSNLAWYQQKQ GKSPQLLVYAATNLADGVPS RFSGSGSGTQYSLKINSLQS EDFGSYYCQHFWGTPYTFGG GTKLEIK |

In a specific embodiment, provided is an antibody that binds essentially the same epitope or determinant as any of monoclonal antibodies AZ158, 19B12, 10G5, 12B11, 10G5, or 2B12; optionally the antibody comprises an antigen binding region of antibody AZ158, 10G5, 19B12, 12B11 or 2B12. In any of the embodiments herein, antibody AZ158, 19B12, 12B11, 10G5 or 2B12 can be characterized by its amino acid sequence and/or nucleic acid sequence encoding it. In one embodiment, the monoclonal antibody comprises the Fab or F(ab')$_2$ portion of AZ158, 19B12, 12B11, 10G5 or 2B12. Also provided is a monoclonal antibody that comprises the heavy chain variable region of AZ158, 19B12, 12B11, 10G5 or 2B12. According to one embodiment, the monoclonal antibody comprises the three CDRs of the heavy chain variable region of AZ158, 19B12, 12B11, 10G5 or 2B12. Also provided is a monoclonal antibody that further comprises the variable light chain variable region of AZ158, 19B12, 12B11, 10G5 or 2B12 or one, two or three of the CDRs of the light chain variable region of AZ158, 19B12, 12B11, 10G5 or 2B12. Optionally any one or more of said light or heavy chain CDRs may contain one, two, three, four or five or more amino acid modifications (e.g. substitutions, insertions or deletions). Optionally, provided is an antibody where any of the light and/or heavy chain variable regions comprising part or all of an antigen binding region of antibody AZ158, 19B12, 12B11, 10G5 or 2B12 are fused to an immunoglobulin constant region of the human IgG type, optionally a human constant region, optionally a human IgG1 or IgG3 isotype.

A KIR3DL2 binding antibody (or antibody fragment) for use in treating TCL may for example be in the form of an isolated and/or purified protein composition, or it can be present on or bound to the surface of a cell (e.g. a CAR effector cell such as a T cell, NK cell or NKT cell), or yet further in the form of a nucleic acid that encodes the antibody, such as from a pox or other viral gene transfer vector comprising anti-KIR3DL2 antibody-encoding nucleic acid sequence(s). A cell expressing a chimeric antigen receptor (CAR) can be constructed. Examples of CARs are engineered to comprise an extracellular single chain antibody (scFv) fused to the intracellular signaling domain of the T cell antigen receptor complex zeta chain, and have the ability, when expressed in effector cells such as T cells, NKT cells or NK cells, to redirect antigen recognition (i.e. KIR3DL2 recognition) based on the monoclonal antibody's specificity. In one aspect, provided are genetically engineered immune cells which express and bear on the cell surface membrane a KIR3DL2-specific chimeric immune receptor comprising an intracellular signaling domain, a transmembrane domain (TM) and a KIR3DL2-specific extracellular domain (e.g., a domain derived from variable heavy and light chain regions of the a monoclonal antibody that binds specifically to KIR3DL2, e.g. one of antibodies disclosed herein). Also provided are the KIR3DL2 specific chimeric immune receptors, DNA constructs encoding the receptors, and plasmid expression vectors containing the constructs in proper orientation for expression.

In one embodiment, the KIR3DL2-binding antibody comprises an antibody or antibody fragment that directs ADCC and optionally further ADCP toward a KIR3DL2-expressing cell.

In one embodiment, the antibody used in any embodiment herein binds a KIR3DL2 polypeptide, optionally wherein the antibody does not substantially bind to a KIR3DL1 polypeptide, is characterized by binding affinity ($K_D$) for a human KIR3DL2 polypeptide of less than (better than) 100 ng/ml, optionally between 1 and 100 ng/ml.

The antibody is optionally characterized by an $EC_{50}$ in $^{51}$Cr-release assay for HuT78 tumor lysis by PBMC from healthy volunteers, of less than 100 ng/ml, optionally between 1 and 100 ng/ml, optionally between 1 and 50 ng/ml, optionally between 25 and 75 ng/ml, optionally about 50 ng/ml. The antibody is optionally characterized by an $EC_{50}$ in $^{51}$Cr-release assay for HuT78 tumor lysis by PBMC from healthy volunteers comparable to that of an anti-KIR3DL2 antibody disclosed herein (e.g., having an $EC_{50}$ that is lower or within 1-log or 0.5-log of the $EC_{50}$ of that of a 2B12 antibody disclosed herein having a VH of SEQ ID NO 49: and a VL of SEQ ID NOS: 44 or 45, comprising an Fc domain of wild type or modified human IgG1 isotype, and that mediates ADCC.

Antibody AZ158

AZ158 binds human KIR3DL2 as well as human KIR3DL1 polypeptides (see PCT patent publication no. WO2010/081890). The VH of AZ158 is shown below, with CDRs 1, 2 and 3 underlined, respectively:

(SEQ ID NO: 3)
QVQLKESGPG LVAPSQSLSI TCTVSGFSLT

SFGVHWVRQP PGKGLEWLGV IWAGGSTNYN

SALMSRLSIS KDNSKSQVFL KMNSLQNDDT

AMYYCARGNS NHYVSSFYYF DYWGQGTTLT

VSS.

The VL of AZ158 is shown below with CDRs 1,2 and 3 underlined, respectively:

(SEQ ID NO: 4)
DIQMTQSPSS LSASLGGKVT ITCKASQDIN

KYIAWYQHKP GKGPRLLIHY TSTLQPGIPS

RFSGSGSGRD YSFSISNLEP EDITTYYCLQ

YDNLWTFGGG TKLEIK.

The anti-KIR3DL2 antibodies may include antibodies having variable region or CDR sequences from such AZ158 antibodies (e.g. a heavy and/or light chain variable region fused to a human constant region; a heavy chain variable region fused to a human IgG1 heavy chain constant region); alternatively, the anti-KIR3DL2 antibodies may be an antibody other than the antibodies having variable region or CDR sequences from a AZ158 antibody.

Antibody 19H12

The amino acid sequence of the heavy chain variable region of antibody 19H12 is listed below:

(SEQ ID NO: 5)
QIQLVQSGPELKKPGETVKISCKASGYTFTNFGMNWVKQAP

GKGLKWMGWINTYTGEPTYADDFKGRFAFSLETSASTAYLQ

INNLKNEDMATYFCARNGNFGYYFDYWGQGTTLTVSS.

The amino acid sequence of the light chain variable region of antibody 19H12 is listed below:

(SEQ ID NO: 6)
DVLMTQTPLSLPVSLGDQASFSCRSSQNIVHSNGNTYLEWY

LQKPGQSPSLLIYKVSNRFSGVPDRFSGSGSGTDFTLKITR

VEAEDLGVYYCFQGSHVPFTFGSGTKLEIK.

In one aspect, provided is a purified polypeptide which encodes an antibody, wherein the antibody comprises: a HCDR1 region comprising an amino acid sequence GYTFTNFGMN as set forth in SEQ ID NO: 9, or a sequence of at least 4, 5, 6, 7, 8, 9 or 10 contiguous amino acids thereof (e.g., NFGMN (SEQ ID NO: 7), GYTFTN (SEQ ID NO: 8)), wherein one or more of these amino acids may be substituted by a different amino acid; a HCDR2 region comprising an amino acid sequence WINTYTGEPTYADDF as set forth in SEQ ID NO: 10, or a sequence of at least 4, 5, 6, 7, 8, 9 or 10 contiguous amino acids thereof (e.g. WINTYTGE (SEQ ID NO: 11)), wherein one or more of these amino acids may be substituted by a different amino acid; a HCDR3 region comprising an amino acid sequence NGNFGYYFDY as set forth in SEQ ID NO: 12, or a sequence of at least 4, 5, 6, 7, 8, 9 or 10 contiguous amino acids thereof, wherein one or more of these amino acids may be substituted by a different amino acid; a LCDR1 region comprising an amino acid sequence RSSQNIVHSNGNTYLE as set forth in SEQ ID NO: 13, or a sequence of at least 4, 5, 6, 7, 8, 9 or 10 contiguous amino acids thereof, wherein one or more of these amino acids may be substituted by a different amino acid; a LCDR2 region comprising an amino acid sequence KVSNRFS as set forth in SEQ ID NO: 14, or a sequence of at least 4, 5, 6, 7, 8, 9 or 10 contiguous amino acids thereof, wherein one or more of these amino acids may be substituted by a different amino acid; and/or a LCDR3 region comprising an amino acid sequence FQGSHVPFT as set forth in SEQ ID NO: 15, or a sequence of at least 4, 5, 6, 7, 8, 9 or 10 contiguous amino acids thereof, wherein one or more of these amino acids may be deleted or substituted by a different amino acid, or where the sequence may comprise an insertion of one or more amino acids.

In another aspect, provided is an antibody that binds human KIR3DL2, comprising:
(a) the heavy chain variable region of SEQ ID NO:5, wherein one, two, three or more amino acid residues may be substituted by a different amino acid; and/or
(b) the light chain variable region of SEQ ID NO: 6, wherein one, two, three or more amino acid residues may be substituted by a different amino acid; and/or
(c) the heavy chain variable region of SEQ ID NO: 5, wherein one, two, three or more amino acid residues may be substituted by a different amino acid; and the light chain variable region of SEQ ID NO: 6, wherein one or more of these amino acids may be substituted by a different amino acid; and/or
(d) the heavy chain CDR 1, 2 and 3 (HCDR1, HCDR2, HCDR3) amino acid sequences as shown in SEQ ID NOS: 7-9, 10-11 and 12, respectively, wherein one, two, three or more amino acid residues of any CDR may be substituted by a different amino acid; and/or
(e) the light chain CDR 1, 2 and 3 (LCDR1, LCDR2, LCDR3) amino acid sequences as shown in SEQ ID NOS: 13, 14 or 15, respectively, wherein one, two, three or more amino acid residues of any CDR may be substituted by a different amino acid; and/or
(f) the heavy chain CDR 1, 2 and 3 (HCDR1, HCDR2, HCDR3) amino acid sequences as shown in SEQ ID NOS: 7, 8 or 9, 10 or 11 and 12, respectively, wherein one, two, three or more amino acid residues of any CDR may be substituted by a different amino acid; and the light chain CDR 1, 2 and 3 (LCDR1, LCDR2, LCDR3) amino acid sequences as shown in SEQ ID NOS: 13, 14 or 15, wherein one, two, three or more amino acid residues may be substituted by a different amino acid; and/or
(g) the heavy chain variable region which is at least 60%, 70%, 80%, 85%, 90% or 95% identical to the variable region having an amino acid sequence of SEQ ID NO: 5, wherein one, two, three or more amino acid residues may be substituted by a different amino acid; and/or
(h) the light chain variable region which is at least 60%, 70%, 80%, 85%, 90% or 95% identical to the variable region having an amino acid sequence of SEQ ID NO: 6, wherein one, two, three or more amino acid residues may be substituted by a different amino acid.

Antibody 12B11

The amino acid sequence of the heavy chain variable region of antibody 12B11 is listed below:

(SEQ ID NO: 16)
QLVQSGPELKNPGETVKISCKASGYTFTNYGMNWVKQAPGK

GLKWMGWINTYTGEPTYADDFKGRFAFSLETSASTAYLQIN

NLKNEDTATYFCAHGPWLAYWGQGTLVTVS.

The amino acid sequence of the light chain variable region of antibody 12B11 is listed below:

(SEQ ID NO: 17)
DIKMTQSPSSMYASLGERVTITCKASQDINVYLSWFQQKP

GKSPKTLIYRAIRLVDGVPSRFSGSGSGQDYSLTISSLDY

EDMGIYYCLQYDELPYTFGGGTKLEIE.

In one aspect, provided is a purified polypeptide which encodes an antibody, wherein the antibody comprises: a HCDR1 region comprising an amino acid sequence GYTFTNYGMN as set forth in SEQ ID NO: 20, or a sequence of at least 4, 5, 6, 7, 8, 9 or 10 contiguous amino acids thereof (e.g. NYGMN (SEQ ID NO: 18), GYTFTN (SEQ ID NO: 19)), wherein one or more of these amino acids may be substituted by a different amino acid; a HCDR2 region comprising an amino acid sequence WINTYTGEPTYADDFKG as set forth in SEQ ID NO: 21, or a sequence of at least 4, 5, 6, 7, 8, 9 or 10 contiguous amino acids thereof (e.g. WINTYTGEPT (SEQ ID NO: 22)), wherein one or more of these amino acids may be substituted by a different amino acid; a HCDR3 region comprising an amino acid sequence GPWLAY as set forth in SEQ ID NO: 23, or a sequence of at least 4, 5, 6, 7, 8, 9 or 10 contiguous amino acids thereof, wherein one or more of these amino acids may be substituted by a different amino acid; a LCDR1 region comprising an amino acid sequence KASQDINVYLS as set forth in SEQ ID NO: 24, or a sequence of at least 4, 5, 6, 7, 8, 9 or 10 contiguous amino acids thereof, wherein one or more of these amino acids may be substituted by a different amino acid; a LCDR2 region comprising an amino acid sequence RAIRLVD as set forth in SEQ ID NO: 25, or a sequence of at least 4, 5, 6, 7, 8, 9 or 10 contiguous amino acids thereof, wherein one or more of these amino acids may be substituted by a different amino acid; a LCDR3 region comprising an amino acid sequence LQYDELPYT as set forth in SEQ ID NO: 26, or a sequence of at least 4, 5, 6, 7, 8, 9 or 10 contiguous amino acids thereof, wherein one or more of these amino acids may be deleted or substituted by a different amino acid.

In another aspect, provided is an antibody that binds human KIR3DL2, comprising:
(a) the heavy chain variable region of SEQ ID NO: 16, wherein one, two, three or more amino acid residues may be substituted by a different amino acid; and/or
(b) the light chain variable region of SEQ ID NO: 17, wherein one, two, three or more amino acid residues may be substituted by a different amino acid; and/or
(c) the heavy chain variable region of SEQ ID NO: 16, wherein one or more amino acid residues may be substituted by a different amino acid; and the light chain variable region of SEQ ID NO: 17, wherein one, two, three or more of these amino acids may be substituted by a different amino acid; and/or
(d) the heavy chain CDR 1, 2 and 3 (HCDR1, HCDR2, HCDR3) amino acid sequences as shown in SEQ ID NO: 18, 19 or 20, 21 or 22 and 23, respectively, wherein one, two, three or more of amino acid residues of any CDR may be substituted by a different amino acid; and/or
(e) the light chain CDR 1, 2 and 3 (LCDR1, LCDR2, LCDR3) amino acid sequences as shown in SEQ ID NO: 24, 25 and 26, wherein one, two, three or more amino acid residues of any CDR may be substituted by a different amino acid; and/or
(f) the heavy chain CDR 1, 2 and 3 (HCDR1, HCDR2, HCDR3) amino acid sequences as shown in SEQ ID NO: 18, 19 or 20, 21 or 22 and 23, respectively, wherein one or more amino acid residues of any CDR may be substituted by a different amino acid; and the light chain CDRs 1, 2 and 3 (LCDR1, LCDR2, LCDR3) amino acid sequences as shown in SEQ ID NO: 24, 25 and 26, wherein one, two, three or more amino acid residues of any CDR may be substituted by a different amino acid; and/or
(g) the heavy chain variable region which is at least 60%, 70%, 80%, 85%, 90% or 95% identical to the variable region having an amino acid sequence of SEQ ID NO: 16, wherein one, two, three or more amino acid residues may be substituted by a different amino acid; and/or (h) the light chain variable region which is at least 60%, 70%, 80%, 85%, 90% or 95% identical to the variable region having an amino acid sequence of SEQ ID NO: 17, wherein one, two, three or more amino acid residues may be substituted by a different amino acid.

Antibody 2B12

The amino acid sequence of the heavy chain variable region of antibody 2B12 is listed below (Kabat definition CDRs underlined):

```
                                       (SEQ ID NO: 32)
Q I Q L V Q S G P E L K K P G E T V R I S

C K A S G Y T F T T A G M Q W V Q K T P G

K G L K W I G W I N S H S G V P K Y A E D

F K G R F A F S L E T S A S T A Y L Q I S

T L K N E D T A T Y F C A R G G D E G V M

D Y W G Q G T S V T V S.
```

The amino acid sequence of the light chain variable region of antibody 2B12 is listed below (Kabat CDRs underlined):

```
                                       (SEQ ID NO: 33)
D I V M T Q S H K F M S T S L G D R V S F

T C K A S Q D V S T A V A W Y Q Q K P G Q

S P K L L I Y W T S T R H T G V P D R F T

G S G S G T D Y T L T I S S V Q A E D L A

L Y Y C Q Q H Y S T P W T F G G G T K L E
I K.
```

In one aspect, provided is a purified polypeptide which encodes an antibody, wherein the antibody comprises: a HCDR1 region comprising an amino acid sequence GYTFT-TAGMQ as set forth in SEQ ID NO: 36, or a sequence of at least 4, 5, 6, 7, 8, 9 or 10 contiguous amino acids thereof (e.g. GYTFTT (SEQ ID NO: 34), or TAGMQ (SEQ ID NO: 35)), wherein one or more of these amino acids may be substituted by a different amino acid; a HCDR2 region comprising an amino acid sequence WINSHSGVPKYAE-DFKG as set forth in SEQ ID NO: 37, or a sequence of at least 4, 5, 6, 7, 8, 9 or 10 contiguous amino acids thereof (e.g. WINSHSGVP (SEQ ID NO: 38)), wherein one or more of these amino acids may be substituted by a different amino acid; a HCDR3 region comprising an amino acid sequence GGDEGVMDY as set forth in SEQ ID NO: 39 (optionally further comprising a tryptophan residue), or a sequence of at least 4, 5, 6, 7, 8, 9 or 10 contiguous amino acids thereof, wherein one or more of these amino acids may be substituted by a different amino acid; a LCDR1 region comprising an amino acid sequence KASQDVSTAVA as set forth in SEQ ID NO: 40, or a sequence of at least 4, 5, 6, 7, 8, 9 or 10 contiguous amino acids thereof, wherein one or more of these amino acids may be substituted by a different amino acid; a LCDR2 region comprising an amino acid sequence WTSTRHT as set forth in SEQ ID NO: 41, or a sequence of at least 4, 5, 6, 7, 8, 9 or 10 contiguous amino acids thereof, wherein one or more of these amino acids may be substituted by a different amino acid; a LCDR3 region comprising an amino acid sequence QQHYSTPWT as set forth in SEQ ID NO: 42, or a sequence of at least 4, 5, 6, 7, 8, 9 or 10 contiguous amino acids thereof, wherein one or more of these amino acids may be deleted or substituted by a different amino acid.

In another aspect, provided is an antibody that binds human KIR3DL2, comprising:

(a) the heavy chain CDR 1, 2 and 3 (HCDR1, HCDR2, HCDR3) amino acid sequences as shown in SEQ ID NO: 34, 35 or 36 (HCDR1), 37 or 38 (HCDR2) and 39 (HCDR3), respectively, wherein one, two, three or more of amino acid residues of any CDR may be substituted by a different amino acid; and/or (b) the light chain CDR 1, 2 and 3 (LCDR1, LCDR2, LCDR3) amino acid sequences as shown in SEQ ID NO: 40, 41 and 42, wherein one, two, three or more amino acid residues of any CDR may be substituted by a different amino acid; and/or (c) the heavy chain CDR 1, 2 and 3 (HCDR1, HCDR2, HCDR3) amino acid sequences as shown in SEQ ID NO: 34, 35 or 36 (HCDR1), 37 or 38 (HCDR2) and 39 (HCDR3), respectively, wherein one or more amino acid residues of any CDR may be substituted by a different amino acid; and the light chain CDRs 1, 2 and 3 (LCDR1, LCDR2, LCDR3) amino acid sequences as shown in SEQ ID NO: 40, 41 and 42, wherein one, two, three or more amino acid residues of any CDR may be substituted by a different amino acid; and/or (d) the heavy chain variable region which is at least 60%, 70%, 80%, 85%, 90% or 95% identical to the variable region having an amino acid sequence of SEQ ID NOS: 32 or 48-51, wherein one, two, three or more amino acid residues may be substituted by a different amino acid; and/or (e) the light chain variable region which is at least 60%, 70%, 80%, 85%, 90% or 95% identical to the variable region having an amino acid sequence of SEQ ID NOS: 33 or 43-47, wherein one, two, three or more amino acid residues may be substituted by a different amino acid.

In another aspect of any of the embodiments herein, any of the CDRs 1, 2 and 3 of the heavy and light chains may be characterized by a sequence of at least 4, 5, 6, 7, 8, 9 or 10 contiguous amino acids thereof, and/or as having an amino acid sequence that shares at least 50%, 60%, 70%, 80%, 85%, 90% or 95% sequence identity with the particular CDR or set of CDRs listed in the corresponding SEQ ID NO.

In another aspect, provided is an antibody that competes for KIR3DL2 binding with a monoclonal antibody of (a) to (h), for any of the above antibodies.

Humanized Antibodies

In another aspect, an anti-KIR3DL2 antibody used in the present methods of treatment is a humanized antibody, for example a humanized 2B12 or 10G5 antibody having a VH and VL selected from the 2B12 and 10G5 variable regions shown in Table B, below.

For example, a humanized 2B12 antibody can comprise:

(a) a CDR-H1 comprising the amino acid sequence of SEQ ID NO: 34, 35 or 36;

(b) a CDR-H2 comprising the amino acid sequence of SEQ ID NO: 37 or 38;

(c) a CDR-H3 comprising the amino acid sequence of SEQ ID NO: 39;

(d) a CDR-L1 comprising the amino acid sequence of SEQ ID NO: 40;

(e) a CDR-L2 comprising the amino acid sequence of SEQ ID NO: 41;

(f) a CDR-L3 comprising the amino acid sequence of SEQ ID NO: 42; and (g) human framework sequences.

In one embodiment, a humanized antibody comprises a heavy chain framework from the human subgroup VH1 and/or VH7 together with JH6, optionally the antibodies comprises IGHV7-4-1*02 and/or IGHV1-c*01, together with IGHJ6*01. In one embodiment, a humanized antibody comprises a light chain framework from the human subgroup VK1 and/or VK4, optionally IGKV4-1*01 and/or IGKV1-39*01, together with JH4, optionally IGKJ4*01.

Optionally a human framework comprises one or more mutations, e.g. back mutations, for example.

In another aspect, humanized antibodies comprise a VH domain having at least about 80% sequence identity (e.g., at least about 85%, 90%, 95%, 97%, 98%, or more identity) to the VH domain of humanized 2B12 of SEQ ID NOS: 48-51. In another particular aspect, a humanized antibody comprises: (a) a VH domain that comprises non-human CDR residues incorporated into a human VH domain, wherein the VH domain is at least about 80% (such as at least 90%, 95%, 97%, 98%) identical to humanized 2B12 VH of SEQ ID NOS: 48-51, and (b) a VL domain that comprises non-human CDR residues incorporated into a human VL domain, wherein the VL domain is at least about 80% (such as at least 90%, 95%, 97%, 98%) identical to humanized 2B12 VL of SEQ ID NOS: 43-47.

In another aspect, humanized antibodies comprise a VH domain having at least about 80% sequence identity (e.g., at least about 85%, 90%, 95%, 97%, 98%, or more identity) to the VH domain of humanized 10G5 of SEQ ID NOS: 57-61. In another particular aspect, a humanized antibody comprises: (a) a VH domain that comprises non-human CDR residues incorporated into a human VH domain, wherein the VH domain is at least about 80% (such as at least 90%, 95%, 97%, 98%) identical to humanized 10G5 VH of SEQ ID NOS: 57-61, and (b) a VL domain that comprises non-human CDR residues incorporated into a human VL domain, wherein the VL domain is at least about 80% (such as at least 90%, 95%, 97%, 98%) identical to humanized 10G5 VL of SEQ ID NOS: 52-56.

The 10G5 or 2B12 antibody may further comprise a native or engineered human IgG constant domain. Optionally the constant domain is an IgG1 domain, optionally further comprising a modification to increase Fc receptor binding.

TABLE B

| Antibody domain | Amino acid sequence (SEQ ID NO) |
|---|---|
| 2B12-L0 | DIQMTQSPSFLSASVGDRVTITCKASQDVS TAVAWYQQKPGQPPKLLIYWTSTRHTGVPD RFSGSGSGTDFTLTISSLQAEDVAVYYCQQ HYSTPWTFGGGTKVEIK (SEQ ID NO: 43) |
| 2B12-L1 | DIQMTQSPSFLSASVGDRVTITCKASQDVS TAVAWYQQKPGQPPKLLIYWTSTRHTGVPD RFSGSGSGTDYTLTISSLQAEDVAVYYCQQ HYSTPWTFGGGTKVEIK (SEQ ID NO: 44) |
| 2B12-L2 | DIVMTQSPSFLSASVGDRVTITCKASQDVS TAVAWYQQKPGQPPKLLIYWTSTRHTGVPD RFSGSGSGTDYTLTISSVQAEDVAVYYCQQ HYSTPWTFGGGTKVEIK (SEQ ID NO: 45) |

TABLE B-continued

| Antibody domain | Amino acid sequence (SEQ ID NO) |
|---|---|
| 2B12-L3 | DIVMTQSPSFLSASVGDRVTFTCKASQDVS TAVAWYQQKPGQSPKLLIYWTSTRHTGVPD RFSGSGSGTDYTLTISSVQAEDVAVYYCQQ HYSTPWTFGGGTKVEIK (SEQ ID NO: 46) |
| 2B12-L4 | DIVMTQSHKFLSASVGDRVTFTCKASQDVS TAVAWYQQKPGQSPKLLIYWTSTRHTGVPD RFSGSGSGTDYTLTISSVQAEDVAVYYCQQ HYSTPWTFGGGTKLEIK (SEQ ID NO: 47) |
| 2B12-H1 | QVQLVQSGSELKKPGASVKVSCKASGYTFT TAGMQWVQKSPGQGLEWMGWINSHSGVPKY AEDFKGRFVFSLDTSVSTAYLQISSLKAED TAVYFCARGGDEGVMDYWGQGTTVTVSS (SEQ ID NO: 48) |
| 2B12-H2 | QIQLVQSGSELKKPGASVKVSCKASGYTFT TAGMQWVRQAPGQGLEWIGWINSHSGVPKY AEDFKGRFVFSLDTSVSTAYLQISSLKAED TAVYFCARGGDEGVMDYWGQGTTVTVSS (SEQ ID NO: 49) |
| 2B12-H3 | QIQLVQSGSELKKPGASVKVSCKASGYTFT TAGMQWVQKSPGQGLEWIGWINSHSGVPKY AEDFKGRFAFSLDTSVSTAYLQISSLKAED TAVYFCARGGDEGVMDYWGQGTTVTVSS (SEQ ID NO: 50) |
| 2B12-H4 | QIQLVQSGSELKKPGASVKVSCKASGYTFT TAGMQWVQKTPGKGLEWIGWINSHSGVPKY AEDFKGRFAFSLDTSASTAYLQISSLKAED TAVYFCARGGDEGVMDYWGQGTSVTVSS (SEQ ID NO: Si) |
| 10G5-L0 | DIQMTQSPSSLSASVGDRVTITCRASENTY SNLAWYQQKPGKAPKLLLYAATNLADGVPS RFSGSGSGTDYTLTISSLQPEDFATYYCQH FWGTPYTFGQGTKLEIK (SEQ ID NO: 52) |
| 10G5-L2 | DIQMTQSPSSLSASVGDRVTITCRASENTY SNLAWYQQKPGKAPQLLVYAATNLADGVPS RFSGSGSGTDYTLTISSLQPEDFATYYCQH FWGTPYTFGGGTKLEIK (SEQ ID NO: 53) |
| 10G5-L3 | DIQMIQSPSSLSASVGDRVTITCRASENIY SNLAWYQQKPGKAPQLLVYAATNLADGVPS RFSGSGSGTQYTLTISSLQPEDFATYYCQH FWGTPYTFGGGTKLEIK (SEQ ID NO: 54) |
| 10G5-L4 | DIQMIQSPSSLSASVGDRVTITCRASENIY SNLAWYQQKQGKAPQLLVYAATNLADGVPS RFSGSGSGTQYTLTINSLQPEDFATYYCQH FWGTPYTFGGGTKLEIK (SEQ ID NO: 55) |
| 10G5-L5 | DIQMIQSPSSLSASVGETVTITCRASENTY SNLAWYQQKQGKAPQLLVYAATNLADGVPS RFSGSGSGTQYTLTINSLQPEDFATYYCQH FWGTPYTFGGGTKLEIK (SEQ ID NO: 56) |
| 10G5-H0 | QVQLVQSGAEVKKPGASVKVSCKASGYTFT SYTMHWVRQAPGQGLEWMGYINPSSGYTEN NRKFKDRVTMTRDTSTSTVYMELSSLRSED TAVYYCARLGKGLLPPFDYWGQGTTVTVSS (SEQ ID NO: 57) |
| 10G5-H3 | QVQLVQSGAEVKKPGASVKVSCKASGYTFT SYTMHWVRQAPGQGLEWIGYINPSSGYTEN NRKFKDKTTMTADTSTSTAYMELSSLRSED TAVYYCARLGKGLLPPFDYWGQGTTVTVSS (SEQ ID NO: 58) |

TABLE B-continued

| Antibody domain | Amino acid sequence (SEQ ID NO) |
| --- | --- |
| 10G5-H4 | QVQLQQSGAEVKKPGASVKMSCKASGYTFT SYTMHWVRQAPGQGLEWIGYINPSSGYTEN NRKFKDKTTLTADTSTSTAYMELSSLRSED TAVYYCARLGKGLLPPFDYWGQGTTLTVSS (SEQ ID NO: 59) |
| 10G5-H5 | QVQLVQSGAELARPGASVKVSCKASGYTFT SYTMHWVRQAPGQGLEWIGYINPSSGYTEN NRKFKDKTTLTADKSTSTAYMELSSLRSED TAVYYCARLGKGLLPPFDYWGQGTTVTVSS (SEQ ID NO: 60) |
| 10G5-H6 | QVQLQQSGAEVKKPGASVKMSCKASGYTFT SYTMHWVKQRPGQGLEWIGYINPSSGYTEN NRKFKDKTTLTADKSTSTAYMELSSLRSED TAVYYCARLGKGLLPPFDYWGQGTTLTVSS (SEQ ID NO: 61) |

In one embodiment, a humanized 2B12 monoclonal antibody comprises:
(a) a heavy chain variable region comprising an amino acid sequence of SEQ ID NO: 49, and
(b) a light chain variable region comprising an amino acid sequence of SEQ ID NO: 44.

In one embodiment, a humanized 2B12 monoclonal antibody comprises:
(a) a heavy chain variable region comprising an amino acid sequence of SEQ ID NO: 49, and
(b) a light chain variable region comprising an amino acid sequence of SEQ ID NO: 45.

In one embodiment, a humanized 10G5 monoclonal antibody comprises:
(a) a heavy chain variable region comprising an amino acid sequence of SEQ ID NO: 58, and
(b) a light chain variable region comprising an amino acid sequence of SEQ ID NO: 53.

In one embodiment, a humanized 10G5 monoclonal antibody comprises:
(a) a heavy chain variable region comprising an amino acid sequence of SEQ ID NO: 59, and
(b) a light chain variable region comprising an amino acid sequence of SEQ ID NO: 53.

In one embodiment, the humanized 2B12 antibody is or comprises the heavy and light chain amino acid sequence of the antibody IPH4102 (Innate Pharma, France), also known as lacutamab (see WHO Drug Information, Vol. 32, No. 4, 2018). Lacutamab is a humanized 2B12 antibody (having the Kabat heavy and light chain CDR1, 2 and 3 of 2B12) and comprises a heavy chain variable region comprising an amino acid sequence of SEQ ID NO: 49 and a light chain variable region comprising an amino acid sequence of SEQ ID NO: 44.

While it will be appreciated that any suitable antibody can be used, in one aspect the antibodies that are used bind to the same area or region as a known anti-KIR3DL2 antibody, including any of the anti-KIR3DL2 antibodies described herein. An anti-KIR3DL2 antibodies may bind to an epitope that at least partially overlaps, or includes at least one residue in the segment corresponding to residues 1-192, residues 1-98, or residues 99-192 of the KIR3DL2 polypeptide of SEQ ID NO: 1 (or a subsequence thereof). In one embodiment, all key residues of the epitope is in a segment corresponding to residues 1-192, residues 1-98 or residues 99-192 of the KIR3DL2 polypeptide of SEQ ID NO: 1. In one embodiment, the antibodies bind an epitope comprising 1, 2, 3, 4, 5, 6, 7 or more residues in the segment corresponding to residues 1-192, 1-98 or 99-192 of the KIR3DL2 polypeptide of SEQ ID NO: 1. Preferably the residues bound by the antibody are present on the surface of the of the KIR3DL2 polypeptide.

Optionally, the antibodies bind an epitope comprising residues P179 and/or residue S181 of SEQ ID NO: 1. Optionally, the antibodies bind to an epitope comprising 1, 2, 3, 4, 5, 6 or 7 or more residues selected from the group consisting of: N99, H100, E130, H131, F132, V178, P179, H180, S181, P182, Y183 and/or residue Q184 of SEQ ID NO: 1.

PCT/EP2013/069302 and PCT/EP2013/069293 describes the testing of a series of mutant human KIR3DL2 polypeptides. Binding of anti-KIR3DL2 antibodies to cells transfected with the KIR3DL2 mutants was measured and compared to the ability of anti-KIR3DL2 antibody to bind wild-type KIR3DL2 polypeptide (SEQ ID NO: 1). A reduction in binding between an anti-KIR3DL2 antibody and a mutant KIR3DL2 polypeptide as used herein means that there is a reduction in binding affinity (e.g., as measured by known methods such FACS testing of cells expressing a particular mutant, or by Biacore testing of binding to mutant polypeptides) and/or a reduction in the total binding capacity of the anti-KIR3DL2 antibody (e.g., as evidenced by a decrease in Bmax in a plot of anti-KIR3DL2 antibody concentration versus polypeptide concentration). A significant reduction in binding indicates that the mutated residue is directly involved in binding to the anti-KIR3DL2 antibody or is in close proximity to the binding protein when the anti-KIR3DL2 antibody is bound to KIR3DL2. An antibody epitope will may thus include such residue and may include additional residues spatially adjacent to such residue.

In some embodiments, a significant reduction in binding means that the binding affinity and/or capacity between an anti-KIR3DL2 antibody and a mutant KIR3DL2 polypeptide is reduced by greater than 40%, greater than 50%, greater than 55%, greater than 60%, greater than 65%, greater than 70%, greater than 75%, greater than 80%, greater than 85%, greater than 90% or greater than 95% relative to binding between the antibody and a wild type KIR3DL2 polypeptide (e.g., the polypeptide shown in SEQ ID NO: 1). In certain embodiments, binding is reduced below detectable limits. In some embodiments, a significant reduction in binding is evidenced when binding of an anti-KIR3DL2 antibody to a mutant KIR3DL2 polypeptide is less than 50% (e.g., less than 45%, 40%, 35%, 30%, 25%, 20%, 15% or 10%) of the binding observed between the anti-KIR3DL2 antibody and a wild-type KIR3DL2 polypeptide (e.g., the extracellular domain shown in SEQ ID NO: 1). Such binding measurements can be made using a variety of binding assays known in the art. A specific example of one such assay is described in the Example section.

In some embodiments, anti-KIR3DL2 antibodies exhibit significantly lower binding for a mutant KIR3DL2 polypeptide in which a residue in a wild-type KIR3DL2 polypeptide (e.g., SEQ ID NO: 1) is substituted. In the shorthand notation used here, the format is: Wild type residue: Position in polypeptide: Mutant residue, with the numbering of the residues as indicated in SEQ ID NO: 1.

Optionally, the antibodies have reduced binding to a KIR3DL2 polypeptide having a substitution at residues N99, H100, E130, H131, F132, V178, P179, H180, S181, P182, Y183 and/or residue Q184 of SEQ ID NO: 1.

In some embodiments, an anti-KIR3DL2 antibody binds a wild-type KIR3DL2 polypeptide having a sequence of SEQ ID NO: 1 but has decreased binding to a mutant KIR3DL2 polypeptide having any one or more (e.g., 1, 2, 3 or 4) of the following mutations: P179T and/or S181T (with reference to SEQ ID NO: 1). In one embodiment, binding to the mutant KIR3DL2 is significantly reduced compared to binding to the wild-type KIR3DL2.

In some embodiments, anti-KIR3DL2 antibodies exhibit significantly lower binding for a mutant KIR3DL2 polypeptide in which a residue in a segment corresponding to residues 1-98, residues 99-292, or residues 99-192 (or a subsequence thereof) in a wild-type KIR3DL2 polypeptide (e.g., SEQ ID NO: 1) is substituted with a different amino acid.

In one aspect, an antibody can compete with monoclonal antibody AZ158, 10G5, 19H12, 2B12 or 12B11 and recognizes bind to, or have immunospecificity for substantially or essentially the same, or the same, epitope or "epitopic site" on a KIR3DL2 molecule as monoclonal antibody AZ158, 10G5, 19H12, 2B12 or 12B11. In other embodiments, the monoclonal antibody consists of, or is a derivative or fragment of, antibody AZ158, 10G5, 19H12, 2B12 or 12B11.

It will be appreciated that, while antibodies may bind to the same epitope as antibody AZ158, 10G5, 19H12, 2B12 or 12B11, suitable antibodies can recognize and be raised against any part of the KIR3DL2 polypeptide so long as the antibody binds KIR3DL2 and has the desired functionality. For example, any fragment of KIR3DL2, e.g., human KIR3DL2, or any combination of KIR3DL2 fragments, can be used as immunogens to raise antibodies, and the antibodies can recognize epitopes at any location within the KIR3DL2 polypeptide, so long as they can do so on KIR3DL2 expressing NK cells as described herein. In an embodiment, the recognized epitopes are present on the cell surface, i.e. they are accessible to antibodies present outside of the cell. Optionally, the epitope is the epitope specifically recognized by antibody AZ158, 10G5, 19H12, 2B12 or 12B11. Further, antibodies recognizing distinct epitopes within KIR3DL2 can be used in combination, e.g. to bind to KIR3DL2 polypeptides with maximum efficacy and breadth among different individuals.

The antibodies may be produced by a variety of techniques known in the art. Typically, they are produced by immunization of a non-human animal, optionally a mouse, with an immunogen comprising a KIR3DL2 polypeptide, optionally a human KIR3DL2 polypeptide. The KIR3DL2 polypeptide may comprise the full length sequence of a human KIR3DL2 polypeptide, or a fragment or derivative thereof, typically an immunogenic fragment, i.e., a portion of the polypeptide comprising an epitope exposed on the surface of cells expressing a KIR3DL2 polypeptide, optionally the epitope recognized by the AZ158, 10G5, 19H12, 2B12 or 12B11 antibody. Such fragments typically contain at least about 7 consecutive amino acids of the mature polypeptide sequence, or at least about 10 consecutive amino acids thereof. Fragments typically are essentially derived from the extracellular domain of the receptor. In one embodiment, the immunogen comprises a wild-type human KIR3DL2 polypeptide in a lipid membrane, typically at the surface of a cell. In one embodiment, the immunogen comprises intact cells, particularly intact human cells, optionally treated or lysed. In another embodiment, the polypeptide is a recombinant KIR3DL2 polypeptide.

The step of immunizing a non-human mammal with an antigen may be carried out in any manner well known in the art for stimulating the production of antibodies in a mouse (see, for example, E. Harlow and D. Lane, Antibodies: A Laboratory Manual., Cold Spring Harbor Laboratory Press, Cold Spring Harbor, NY (1988), the entire disclosure of which is herein incorporated by reference). The immunogen is suspended or dissolved in a buffer, optionally with an adjuvant, such as complete or incomplete Freund's adjuvant. Methods for determining the amount of immunogen, types of buffers and amounts of adjuvant are well known to those of skill in the art and are not limiting in any way. These parameters may be different for different immunogens, but are easily elucidated.

Similarly, the location and frequency of immunization sufficient to stimulate the production of antibodies is also well known in the art. In a typical immunization protocol, the non-human animals are injected intraperitoneally with antigen on day 1 and again about a week later. This is followed by recall injections of the antigen around day 20, optionally with an adjuvant such as incomplete Freund's adjuvant. The recall injections are performed intravenously and may be repeated for several consecutive days. This is followed by a booster injection at day 40, either intravenously or intraperitoneally, typically without adjuvant. This protocol results in the production of antigen-specific antibody-producing B cells after about 40 days. Other protocols may also be used as long as they result in the production of B cells expressing an antibody directed to the antigen used in immunization.

For polyclonal antibody preparation, serum is obtained from an immunized non-human animal and the antibodies present therein isolated by well-known techniques. The serum may be affinity purified using any of the immunogens set forth above linked to a solid support so as to obtain antibodies that react with KIR3DL2 polypeptides.

In an alternate embodiment, lymphocytes from a non-immunized non-human mammal are isolated, grown in vitro, and then exposed to the immunogen in cell culture. The lymphocytes are then harvested and the fusion step described below is carried out.

For exemplary monoclonal antibodies, the next step is the isolation of splenocytes from the immunized non-human mammal and the subsequent fusion of those splenocytes with an immortalized cell in order to form an antibody-producing hybridoma. The isolation of splenocytes from a non-human mammal is well-known in the art and typically involves removing the spleen from an anesthetized non-human mammal, cutting it into small pieces and squeezing the splenocytes from the splenic capsule through a nylon mesh of a cell strainer into an appropriate buffer so as to produce a single cell suspension. The cells are washed, centrifuged and resuspended in a buffer that lyses any red blood cells. The solution is again centrifuged and remaining lymphocytes in the pellet are finally resuspended in fresh buffer.

Once isolated and present in single cell suspension, the lymphocytes can be fused to an immortal cell line. This is typically a mouse myeloma cell line, although many other immortal cell lines useful for creating hybridomas are known in the art. Murine myeloma lines include, but are not limited to, those derived from MOPC-21 and MPC-11 mouse tumors available from the Salk Institute Cell Distribution Center, San Diego, U.S.A., X63 Ag8653 and SP-2 cells available from the American Type Culture Collection, Rockville, Maryland U.S.A. The fusion is effected using polyethylene glycol or the like. The resulting hybridomas are then grown in selective media that contains one or more substances that inhibit the growth or survival of the unfused, parental myeloma cells. For example, if the parental myeloma cells lack the enzyme hypoxanthine guanine phosphoribosyl transferase (HGPRT or HPRT), the culture medium for the hybridomas typically will include hypoxanthine, aminopterin, and thymidine (HAT medium), which substances prevent the growth of HGPRT-deficient cells.

Hybridomas are typically grown on a feeder layer of macrophages. The macrophages can be from littermates of the non-human mammal used to isolate splenocytes and are typically primed with incomplete Freund's adjuvant or the like several days before plating the hybridomas. Fusion methods are described in Goding, "Monoclonal Antibodies: Principles and Practice," pp. 59-103 (Academic Press, 1986), the disclosure of which is herein incorporated by reference.

The cells are allowed to grow in the selection media for sufficient time for colony formation and antibody production. This is usually between about 7 and about 14 days.

The hybridoma colonies are then assayed for the production of antibodies that specifically bind to KIR3DL2 polypeptide gene products, optionally the epitope specifically recognized by antibody AZ158, 19H12, 2B12 or 12B11. The assay is typically a colorimetric ELISA-type assay, although any assay may be employed that can be adapted to the wells that the hybridomas are grown in. Other assays include radioimmunoassays or fluorescence activated cell sorting. The wells positive for the desired antibody production are examined to determine if one or more distinct colonies are present. If more than one colony is present, the cells may be re-cloned and grown to ensure that only a single cell has given rise to the colony producing the desired antibody. Typically, the antibodies will also be tested for the ability to bind to KIR3DL2 polypeptides, e.g., KIR3DL2-expressing cells.

Hybridomas that are confirmed to produce a monoclonal antibody can be grown up in larger amounts in an appropriate medium, such as DMEM or RPMI-1640. Alternatively, the hybridoma cells can be grown in vivo as ascites tumors in an animal. After sufficient growth to produce the desired monoclonal antibody, the growth media containing monoclonal antibody (or the ascites fluid) is separated away from the cells and the monoclonal antibody present therein is purified. Purification is typically achieved by gel electrophoresis, dialysis, chromatography using protein A or protein G-Sepharose, or an anti-mouse Ig linked to a solid support such as agarose or Sepharose beads (all described, for example, in the Antibody Purification Handbook, Biosciences, publication No. 18-1037-46, Edition AC, the disclosure of which is hereby incorporated by reference). The bound antibody is typically eluted from protein A/protein G columns by using low pH buffers (glycine or acetate buffers of pH 3.0 or less) with immediate neutralization of antibody-containing fractions. These fractions are pooled, dialyzed, and concentrated as needed.

Positive wells with a single apparent colony are typically re-cloned and re-assayed to insure only one monoclonal antibody is being detected and produced.

Antibodies may also be produced by selection of combinatorial libraries of immunoglobulins, as disclosed for instance in (Ward et al. Nature, 341 (1989) p. 544, the entire disclosure of which is herein incorporated by reference).

The identification of one or more antibodies that bind(s) to the antigen of interest, i.e. KIR3DL2, particularly or essentially the same region, determinant or epitope as monoclonal antibody AZ158, 19H12, 2B12 or 12B11, can be readily determined using any one of a variety of immunological screening assays in which antibody competition can be assessed. Many such assays are routinely practiced and are well known in the art (see, e.g., U.S. Pat. No. 5,660,827, issued Aug. 26, 1997, which is specifically incorporated herein by reference).

For example, where the test antibodies to be examined are obtained from different source animals, or are even of a different Ig isotype, a simple competition assay may be employed in which the control (AZ158, 19H12, 2B12 or 12B11, for example) and test antibodies are admixed (or pre-adsorbed) and applied to a sample containing KIR3DL2 polypeptides. Protocols based upon western blotting and the use of BIACORE analysis are suitable for use in such competition studies.

In certain embodiments, one pre-mixes the control antibodies (e.g., AZ158, 19H12, 2B12 or 12B11, for example) with varying amounts of the test antibodies (e.g., about 1:10 or about 1:100) for a period of time prior to applying to the KIR3DL2 antigen sample. In other embodiments, the control and varying amounts of test antibodies can simply be admixed during exposure to the KIR3DL2 antigen sample. As long as one can distinguish bound from free antibodies (e.g., by using separation or washing techniques to eliminate unbound antibodies) and 2B12 from the test antibodies (e.g., by using species-specific or isotype-specific secondary antibodies or by specifically labeling AZ158, 19H12, 2B12 or 12B11 with a detectable label) one can determine if the test antibodies reduce the binding of AZ158, 19H12, 2B12 or 12B11 to the antigens. The binding of the (labelled) control antibodies in the absence of a completely irrelevant antibody can serve as the control high value. The control low value can be obtained by incubating the labelled (AZ158, 19H12, 2B12 or 12B11) antibodies with unlabelled antibodies of exactly the same type (AZ158, 19H12, 2B12 or 12B11), where competition would occur and reduce binding of the labelled antibodies. In a test assay, a significant reduction in labelled antibody reactivity in the presence of a test antibody is indicative of a test antibody that "cross-reacts" or competes with the labelled (AZ158, 19H12, 2B12 or 12B11) antibody. Any test antibody that reduces the binding of AZ158, 19H12, 2B12 or 12B11 to KIR3DL2 antigens by at least about 50%, such as at least about 60%, or more preferably at least about 80% or 90% (e.g., about 65-100%), at any ratio of AZ158, 19H12, 2B12 or 12B11:test antibody between about 1:10 and about 1:100 can be selected. In one embodiment, such test antibody will reduce the binding of AZ158, 19H12, 2B12 or 12B11 to the KIR3DL2 antigen by at least about 90% (e.g., about 95%).

Competition can also be assessed by, for example, a flow cytometry test. In such a test, cells bearing a given KIR3DL2 polypeptide can be incubated first with 2B12, for example, and then with the test antibody labelled with a fluorochrome or biotin. The antibody is said to compete with 2B12 if the binding obtained upon preincubation with a saturating amount of 2B12 is about 80%, preferably about 50%, about 40% or less (e.g., about 30%, 20% or 10%) of the binding (as measured by mean of fluorescence) obtained by the antibody without preincubation with 2B12. Alternatively, an antibody is said to compete with 2B12 if the binding obtained with a labelled 2B12 antibody (by a fluorochrome or biotin) on cells preincubated with a saturating amount of test antibody is about 80%, preferably about 50%, about 40%, or less (e.g., about 30%, 20% or 10%) of the binding obtained without preincubation with the test antibody.

Determination of whether an antibody binds within an epitope region can be carried out in ways known to the person skilled in the art. As one example of such mapping/characterization methods, an epitope region for an anti-KIR3DL2 antibody may be determined by epitope "foot-printing" using chemical modification of the exposed amines/carboxyls in the respective KIR3DL2 protein. One specific example of such a foot-printing technique is the use of HXMS (hydrogen-deuterium exchange detected by mass spectrometry) wherein a hydrogen/deuterium exchange of receptor and ligand protein amide protons, binding, and back exchange occurs, wherein the backbone amide groups participating in protein binding are protected from back exchange and therefore will remain deuterated. Relevant regions can be identified at this point by peptic proteolysis, fast microbore high-performance liquid chromatography separation, and/or electrospray ionization mass spectrometry. See, e.g., Ehring H, Analytical Biochemistry, Vol. 267 (2) pp. 252-259 (1999) Engen, J. R. and Smith, D. L. (2001) Anal. Chem. 73, 256A-265A. Another example of a suitable epitope identification technique is nuclear magnetic resonance epitope mapping (NMR), where typically the position of the signals in two-dimensional NMR spectra of the free antigen and the antigen complexed with the antigen binding peptide, such as an antibody, are compared. The antigen typically is selectively isotopically labeled with 15N so that only signals corresponding to the antigen and no signals from the antigen binding peptide are seen in the NMR-spectrum. Antigen signals originating from amino acids involved in the interaction with the antigen binding peptide typically will shift position in the spectrum of the complex compared to the spectrum of the free antigen, and the amino acids involved in the binding can be identified that way. See, e.g., Ernst Schering Res Found Workshop. 2004; (44): 149-67; Huang et al., Journal of Molecular Biology, Vol. 281 (1) pp. $6_{1-6}7$ (1998); and Saito and Patterson, Methods. 1996 June; 9 (3): 516-24.

Epitope mapping/characterization also can be performed using mass spectrometry methods. See, e.g., Downard, J Mass Spectrom. 2000 April; 35 (4): 493-503 and Kiselar and Downard, Anal Chem. 1999 May 1; 71 (9): 1792-1801. Protease digestion techniques also can be useful in the context of epitope mapping and identification. Antigenic determinant-relevant regions/sequences can be determined by protease digestion, e.g., by using trypsin in a ratio of about 1:50 to KIR3DL2 or o/n digestion at and pH 7-8, followed by mass spectrometry (MS) analysis for peptide identification. The peptides protected from trypsin cleavage by the anti-KIR3DL2 binder can subsequently be identified by comparison of samples subjected to trypsin digestion and samples incubated with antibody and then subjected to digestion by e.g., trypsin (thereby revealing a footprint for the binder). Other enzymes like chymotrypsin, pepsin, etc., also or alternatively can be used in similar epitope characterization methods. Moreover, enzymatic digestion can provide a quick method for analyzing whether a potential antigenic determinant sequence is within a region of the KIR3DL2 polypeptide that is not surface exposed and, accordingly, most likely not relevant in terms of immunogenicity/antigenicity.

Site-directed mutagenesis is another technique useful for elucidation of a binding epitope. For example, in "alanine-scanning", each residue within a protein segment is replaced with an alanine residue, and the consequences for binding affinity measured. If the mutation leads to a significant reduction in binding affinity, it is most likely involved in binding. Monoclonal antibodies specific for structural epitopes (i.e., antibodies which do not bind the unfolded protein) can be used to verify that the alanine-replacement does not influence over-all fold of the protein. See, e.g., Clackson and Wells, Science 1995; 267:383-386; and Wells, Proc Natl Acad Sci USA 1996; 93:1-6.

Electron microscopy can also be used for epitope "foot-printing". For example, Wang et al., Nature 1992; 355:275-278 used coordinated application of cryoelectron microscopy, three-dimensional image reconstruction, and X-ray crystallography to determine the physical footprint of a Fab-fragment on the capsid surface of native cowpea mosaic virus.

Other forms of "label-free" assay for epitope evaluation include surface plasmon resonance (SPR, BIACORE) and reflectometric interference spectroscopy (RifS). See, e.g., Fägerstam et al., Journal Of Molecular Recognition 1990; 3:208-14; Nice et al., J. Chroma-togr. 1993; 646:159-168; Leipert et al., Angew. Chem. Int. Ed. 1998; 37:3308-3311; Kroger et al., Biosensors and Bioelectronics 2002; 17:937-944.

It should also be noted that an antibody binding the same or substantially the same epitope as an antibody can be identified in one or more of the exemplary competition assays described herein.

Once antibodies are identified that are capable of binding KIR3DL2 and/or having other desired properties (e.g., the ability to mediate ADCC and/or antibody-dependent cellular phagocytosis (ADCP)), they will also typically be assessed, using standard methods including those described herein, for their ability to bind to other polypeptides, including unrelated polypeptides. Ideally, the antibodies only bind with substantial affinity to KIR3DL2, e.g., human KIR3DL2, and do not bind at a significant level to unrelated polypeptides. However, it will be appreciated that, as long as the affinity for KIR3DL2 is substantially greater (e.g., 5×, 10×, 50×, 100×, 500×, 1000×, 10,000×, or more) than it is for other, unrelated polypeptides), then the antibodies are suitable for use in the present methods.

The binding of the antibodies to KIR3DL2-expressing cells can also be assessed in non-human primates, e.g. cynomolgus monkeys, or other mammals such as mice. Provided is an antibody, as well as fragments and derivatives thereof, wherein said antibody, fragment or derivative specifically bind KIR3DL2, and which furthermore bind KIR3DL2 from non-human primates, e.g., cynomolgus monkeys.

Upon immunization and production of antibodies in a vertebrate or cell, particular selection steps may be performed to isolate antibodies as claimed. In this regard, in a specific embodiment, the disclosure also relates to methods of producing such antibodies, comprising: (a) immunizing a non-human mammal with an immunogen comprising a KIR3DL2 polypeptide; and (b) preparing antibodies from said immunized animal; and (c) selecting antibodies from step (b) that are capable of binding KIR3DL2.

In one aspect of any of the embodiments, the antibodies prepared according to the present methods are monoclonal antibodies. In another aspect, the non-human animal used to produce antibodies is a mammal, such as a rodent, bovine, porcine, fowl, horse, rabbit, goat, or sheep.

According to an alternate embodiment, the DNA encoding an antibody that binds an epitope present on KIR3DL2 polypeptides is isolated from the hybridoma and placed in an appropriate expression vector for transfection into an appropriate host. The host is then used for the recombinant production of the antibody, or variants thereof, such as a humanized version of that monoclonal antibody, active fragments of the antibody, chimeric antibodies comprising the antigen recognition portion of the antibody, or versions comprising a detectable moiety.

DNA encoding a monoclonal antibody can be readily isolated and sequenced using conventional procedures (e.g., by using oligonucleotide probes that are capable of binding specifically to genes encoding the heavy and light chains of murine antibodies). Once isolated, the DNA can be placed into expression vectors, which are then transfected into host cells such as E. coli cells, simian COS cells, Chinese hamster ovary (CHO) cells, or myeloma cells that do not otherwise produce immunoglobulin protein, to obtain the synthesis of monoclonal antibodies in the recombinant host cells. As described elsewhere in the present specification, such DNA sequences can be modified for any of a large number of purposes, e.g., for humanizing antibodies, producing fragments or derivatives, or for modifying the sequence of the antibody, e.g., in the antigen binding site in order to optimize the binding specificity of the antibody.

Recombinant expression in bacteria of DNA encoding the antibody is well known in the art (see, for example, Skerra et al., Curr. Opinion in Immunol., 5, pp. 256 (1993); and Pluckthun, Immunol. 130, p. 151 (1992).

Once an antigen-binding compound is obtained it may be assessed for its ability to induce ADCC, ADCP and/or CDC towards, and/or deplete KIR3DL2-expressing target cells. Assessing the antigen-binding compound's ability to induce ADCC, ADCP and/or CDC (complement dependent cytotoxicity) or generally lead to the elimination or inhibition of activity of KIR3DL2-expressing target cells, can be carried out at any suitable stage of the method. This assessment can be useful at one or more of the various steps involved in the identification, production and/or development of an antibody (or other compound) destined for therapeutic use. For example, activity may be assessed in the context of a screening method to identify candidate antigen-binding compounds, or in methods where an antigen-binding compound is selected and made human suitable (e.g. made chimeric or humanized in the case of an antibody), where a cell expressing the antigen-binding compound (e.g. a host cell expressing a recombinant antigen-binding compound) has been obtained and is assessed for its ability to produce functional antibodies (or other compounds), and/or where a quantity of antigen-binding compound has been produced and is to be assessed for activity (e.g. to test batches or lots of product). Generally the antigen-binding compound will be known to specifically bind to a KIR3DL2 polypeptide. The step may involve testing a plurality (e.g., a very large number using high throughput screening methods or a smaller number) of antigen-binding compounds.

Testing ADCP, CDC and ADCC can be carried out can be determined by various assays including those known in the art and those described in the experimental examples herein. Testing ADCC typically involves assessing cell-mediated cytotoxicity in which a KIR3DL2-expressing target cell (e.g. a TCL cell or other KIR3DL2-expressing cell) with bound anti-KIR3DL2 antibody is recognized by an effector cell bearing Fc receptors, without the involvement of complement. A cell which does not express a KIR3DL2 antigen can optionally be used as a control. Activation of NK cell cytotoxicity is assessed by measuring an increase in cytokine production (e.g. IFN-γ production) or cytotoxicity markers (e.g. CD107 mobilization). In one embodiment, the antibody will induce an increase in cytokine production, expression of cytotoxicity markers, or target cell lysis of at least 20%, 50%, 80%, 100%, 200% or 500% in the presence of target cells, compared to a control antibody (e.g. an antibody not binding to KIR3DL2, a KIR3DL2 antibody having murine constant regions). In another example, lysis of target cells is detected, e.g. in a chromium release assay, for example the antibody will induce lysis of at least 10%, 20%, 30%, 40% or 50% of target cells.

Fragments and derivatives of antibodies (which are encompassed by the term "antibody" or "antibodies" as used in this application, unless otherwise stated or clearly contradicted by context) can be produced by techniques that are known in the art. "Fragments" comprise a portion of the intact antibody, generally the antigen binding site or variable region. Examples of antibody fragments include Fab, Fab', Fab'-SH, F(ab')2, and Fv fragments; diabodies; any antibody fragment that is a polypeptide having a primary structure consisting of one uninterrupted sequence of contiguous amino acid residues (referred to herein as a "single-chain antibody fragment" or "single chain polypeptide"), including without limitation (1) single-chain Fv molecules (2) single chain polypeptides containing only one light chain variable domain, or a fragment thereof that contains the three CDRs of the light chain variable domain, without an associated heavy chain moiety and (3) single chain polypeptides containing only one heavy chain variable region, or a fragment thereof containing the three CDRs of the heavy chain variable region, without an associated light chain moiety; and multispecific antibodies formed from antibody fragments. Included, inter alia, are a nanobody, domain antibody, single domain antibody or a "dAb".

In certain embodiments, the DNA of a hybridoma producing an antibody can be modified prior to insertion into an expression vector, for example, by substituting the coding sequence for human heavy- and light-chain constant domains in place of the homologous non-human sequences (e.g., Morrison et al., PNAS pp. 6851 (1984)), or by covalently joining to the immunoglobulin coding sequence all or part of the coding sequence for a non-immunoglobulin polypeptide. In that manner, "chimeric" or "hybrid" antibodies are prepared that have the binding specificity of the original antibody. Typically, such non-immunoglobulin polypeptides are substituted for the constant domains of an antibody.

Thus, according to another embodiment, the antibody is humanized. "Humanized" forms of antibodies according are specific chimeric immunoglobulins, immunoglobulin chains or fragments thereof (such as Fv, Fab, Fab', F(ab')2, or other antigen-binding subsequences of antibodies) which contain minimal sequence derived from the murine immunoglobulin. For the most part, humanized antibodies are human immunoglobulins (recipient antibody) in which residues from a complementary-determining region (CDR) of the recipient are replaced by residues from a CDR of the original antibody (donor antibody) while maintaining the desired specificity, affinity, and capacity of the original antibody.

In some instances, Fv framework residues of the human immunoglobulin may be replaced by corresponding non-human residues. Furthermore, humanized antibodies can comprise residues that are not found in either the recipient antibody or in the imported CDR or framework sequences. These modifications are made to further refine and optimize antibody performance. In general, the humanized antibody will comprise substantially all of at least one, and typically two, variable domains, in which all or substantially all of the CDR regions correspond to those of the original antibody and all or substantially all of the FR regions are those of a human immunoglobulin consensus sequence. The humanized antibody optimally also will comprise at least a portion of an immunoglobulin constant region (Fc), typically that of a human immunoglobulin. For further details see Jones et al., Nature, 321, pp. 522 (1986); Reichmann et al, Nature, 332, pp. 323 (1988); Presta, Curr. Op. Struct. Biol., 2, pp. 593 (1992); Verhoeyen et Science, 239, pp. 1534; and U.S. Pat. No. 4,816,567, the entire disclosures of which are herein incorporated by reference.) Methods for humanizing the antibodies are well known in the art.

The choice of human variable domains, both light and heavy, to be used in making the humanized antibodies is very important to reduce antigenicity. According to the so-called "best-fit" method, the sequence of the variable domain of an antibody is screened against the entire library of known human variable-domain sequences. The human sequence which is closest to that of the mouse is then accepted as the human framework (FR) for the humanized antibody (Sims et al., J. Immunol. 151, pp. 2296 (1993); Chothia and Lesk, J. Mol. 196, 1987, pp. 901). Another method uses a particular framework from the consensus sequence of all human antibodies of a particular subgroup of light or heavy chains. The same framework can be used for several different humanized antibodies (Carter et al., PNAS 89, pp. 4285 (1992); Presta et al., J. Immunol., 151, p. 2623 (1993)).

It is further important that antibodies be humanized with retention of high affinity for KIR3DL2 receptors and other favorable biological properties. To achieve this goal, according to one method, humanized antibodies are prepared by a process of analysis of the parental sequences and various conceptual humanized products using three-dimensional models of the parental and humanized sequences. Three-dimensional immunoglobulin models are commonly available and are familiar to those skilled in the art. Computer programs are available which illustrate and display probable three-dimensional structures of selected candidate immunoglobulin sequences. Inspection of these displays permits analysis of the likely role of the residues in the functioning of the candidate immunoglobulin sequence, i.e., the analysis of residues that influence the ability of the candidate immunoglobulin to bind its antigen. In this way, FR residues can be selected and combined from the consensus and import sequences so that the desired antibody characteristic, such as increased affinity for the target antigen (5), is achieved. In general, the CDR residues are directly and most substantially involved in influencing antigen binding.

Another method of making human or humanized monoclonal antibodies is to use a genetically modified mouse for immunization. Several murine hosts that have had their immunoglobulin genes replaced by functional human immunoglobulin genes are known.

Thus, antibodies produced by this mouse or in hybridomas made from the B cells of such a mouse, are already human or humanized. Exemplary animals are described in U.S. Pat. No. 6,162,963 and Jakobovitz et al., Nature 362 (1993) 255, which are herein incorporated in reference. Human antibodies may also be produced according to various other techniques, such as by selection of antibody repertoires using phage display methods. Such techniques are known to the skilled person and can be implemented starting from monoclonal antibodies as disclosed in the present application.

A KIR3DL2 binding compound, e.g., an anti-KIR3DL2 antibody, may be further bound to a second moiety, wherein the antibody is capable of delivering the second moiety to a KIR3DL2-expressing cell. Optionally the second moiety is a therapeutic agent, a toxic agent, and/or a detectable agent.

While antibodies in underivatized or unmodified form, particularly of the IgG1 or IgG3 type are expected to inhibit the proliferation of the overproliferating cells or be cytotoxic towards overproliferating cells such as in those from a PTCL patient, e.g., by directing ADCC, ADCP and/or CDC toward KIR3DL2-expressing PTCL cells, it is also possible to prepare derivatized antibody immunoconjugates that are cytotoxic. In one embodiment, once the KIR3DL2 specific antibodies are isolated and optionally otherwise modified (e.g. humanized), they will be derivatized to make them toxic to cells. In this way, administration of the antibody to PTCL patients will lead to the relatively specific binding of the antibody to overproliferating cells, thereby directly killing or inhibiting the cells underlying the disorder.

In view of the ability of the anti-KIR3DL2 antibodies to induce ADCC and CDC, the antibodies can also be made with modifications that increase their ability to bind Fc receptors which can affect effector functions such as antibody-dependent cytotoxicity, mast cell degranulation, and phagocytosis, as well as immunomodulatory signals such as regulation of lymphocyte proliferation and antibody secretion. Typical modifications include modified human IgG1 constant regions comprising at least one amino acid modification (e.g. substitution, deletions, insertions), and/or altered types of glycosylation, e.g., hypofucosylation.

Anti-KIR3DL2 antibodies may comprise an Fc domain (or portion thereof) of human IgG1 or IgG3 isotype, optionally modified.

In certain embodiments, a CH2 and/or CH3 domain (or Fc domain comprising same) may comprise one or more amino acid modifications (e.g. amino acid substitutions) which increase binding to human CD16 and optionally another receptor such as FcRn. Optionally, the modifications will not substantially decrease or abolish the ability of the Fc-derived polypeptide to bind to neonatal Fc receptor (FcRn), e.g. human FcRn. Typical modifications include modified human IgG1-derived constant regions comprising at least one amino acid modification (e.g. substitution, deletions, insertions), and/or altered types of glycosylation, e.g., hypofucosylation. Such modifications can affect interaction with Fc receptors: FcγRI (CD64), FcγRII (CD32), and FcγRIII (CD16). FcγRI (CD64), FcγRIIA (CD32A) and FcγRIII (CD 16) are activating (i.e., immune system enhancing) receptors while FcγRIIB (CD32B) is an inhibiting (i.e., immune system dampening) receptor. A modification may, for example, increase binding of the Fc domain to FcγRIIIa on effector (e.g. NK) cells and/or decrease binding to FcγRIIB. Examples of modifications are provided in PCT publication no. WO2014/044686, the disclosure of which is incorporated herein by reference. Specific mutations (in IgG1 Fc domains) which affect (enhance) FcγRIIIa or FcRn binding are also set forth below.

| Isotype | Species | Modification | Effector Function | Effect of Modification |
|---|---|---|---|---|
| IgG1 | Human | T250Q/M428L | Increased binding to FcRn | Increased half-life |
| IgG1 | Human | 1M252Y/S254T/ T256E + H433K/ N434F | Increased binding to FcRn | Increased half-life |
| IgG1 | Human | E333A | Increased binding to FcγRIIIa | Increased ADCC and CDC |
| IgG1 | Human | S239D/I332E or S239D/A330L/ I332E | Increased binding to FcγRIIIa | Increased ADCC |
| IgG1 | Human | P257I/Q311 | Increased binding to FcRn | Unchanged half-life |
| IgG1 | Human | S239D/I332E/ G236A | Increased FcγRIIa/FcγRIIb ratio | Increased macrophage phagocytosis |

A variant Fc region may comprise at least one amino acid modification (for example, possessing 1, 2, 3, 4, 5, 6, 7, 8, 9, or more amino acid modifications) in the CH2 and/or CH3 domain of the Fc region, wherein the modification enhances binding to a human CD16 polypeptide. In other embodiments, an Fc region comprises at least one amino acid modification (for example, 1, 2, 3, 4, 5, 6, 7, 8, 9, or more amino acid modifications) in the CH2 domain of the Fc region from amino acids 237-341, or within the lower hinge-CH2 region that comprises residues 231-341. In some embodiments, an Fc region comprises at least two amino acid modifications (for example, 2, 3, 4, 5, 6, 7, 8, 9, or more amino acid modifications), wherein at least one of such modifications is within the CH3 region and at least one such modifications is within the CH2 region. Encompassed also are amino acid modifications in the hinge region. In one embodiment, encompassed are amino acid modifications in the CH1 domain, optionally in the upper hinge region that comprises residues 216-230 (Kabat EU numbering). Any suitable functional combination of Fc modifications can be made, for example any combination of the different Fc modifications which are disclosed in any of U.S. Pat. Nos. 7,632,497; 7,521,542; 7,425,619; 7,416,727; 7,371,826; 7,355,008; 7,335,742; 7,332,581; 7,183,387; 7,122,637; 6,821,505 and 6,737,056; and/or in PCT Publications Nos. WO2011/109400; WO 2008/105886; WO 2008/002933; WO 2007/021841; WO 2007/106707; WO 06/088494; WO 05/115452; WO 05/110474; WO 04/1032269; WO 00/42072; WO 06/088494; WO 07/024249; WO 05/047327; WO 04/099249 and WO 04/063351; and/or in Lazar et al. (2006) Proc. Nat. Acad. Sci. USA 103(11): 405-410; Presta, L. G. et al. (2002) Biochem. Soc. Trans. 30(4):487-490; Shields, R. L. et al. (2002) J. Biol. Chem. 26; 277(30): 26733-26740 and Shields, R. L. et al. (2001) J. Biol. Chem. 276(9):6591-6604).

EXAMPLES

Example 1—In Vitro Combination Studies with Chemotherapeutic Agents

It is known that chemotherapeutic agents can negatively affect the host immune system and consequently inhibit the efficacy of therapeutic antibodies that mediate ADCC. Consequently, we sought to evaluate whether chemotherapeutic agents affect the NK cell-mediated ADCC activity of humanized 2B12 antibody lacutamab having human IgG1 isotype and the VH and VL amino acid sequences shown in SEQ ID NOS: 49 and 44, respectively. Chemotherapeutic agents were added, alone or in combination, to an in vitro cellular cytotoxicity (ADCC) assay with allogeneic NK cells and KIR3DL2-expressing Sézary Syndrome cell line (Hut 78), in presence of increasing concentrations of the anti-KIR3DL2 antibody.

Results are shown in FIG. 1. In this experimental setting, neither gemcitabine nor oxaliplatin interfered with anti-KIR3DL2 antibody-induced ADCC against the HUT78 CTCL cell line. In fact, anti-KIR3DL2 anti-tumor activity was surprisingly enhanced by each of gemcitabine and oxaliplatin, and even more by the combination of gemcitabine and oxaliplatin.

Example 2—Gemcitabine and Oxaliplatin Each Enhance KIR3DL2 Expression

In order to study the possible reasons for the enhancement of anti-KIR3DL2 antibody-induced ADCC against the HUT78 CTCL cell line we assessed whether KIR3DL2 expression could be modulated by the same chemotherapy agents in vitro.

Briefly, Hut78 cells (Sezary Syndrome cell line) or RAJI-KIR3DL2 cells (RAJI B-NHL cell line transfected with human KIR3DL2 were incubated with ascending doses of gemcitabine and oxaliplatin. Median intensity of fluorescence of KIR3DL2 on tumor cell line surface was analyzed by flow cytometry.

Figure 2:
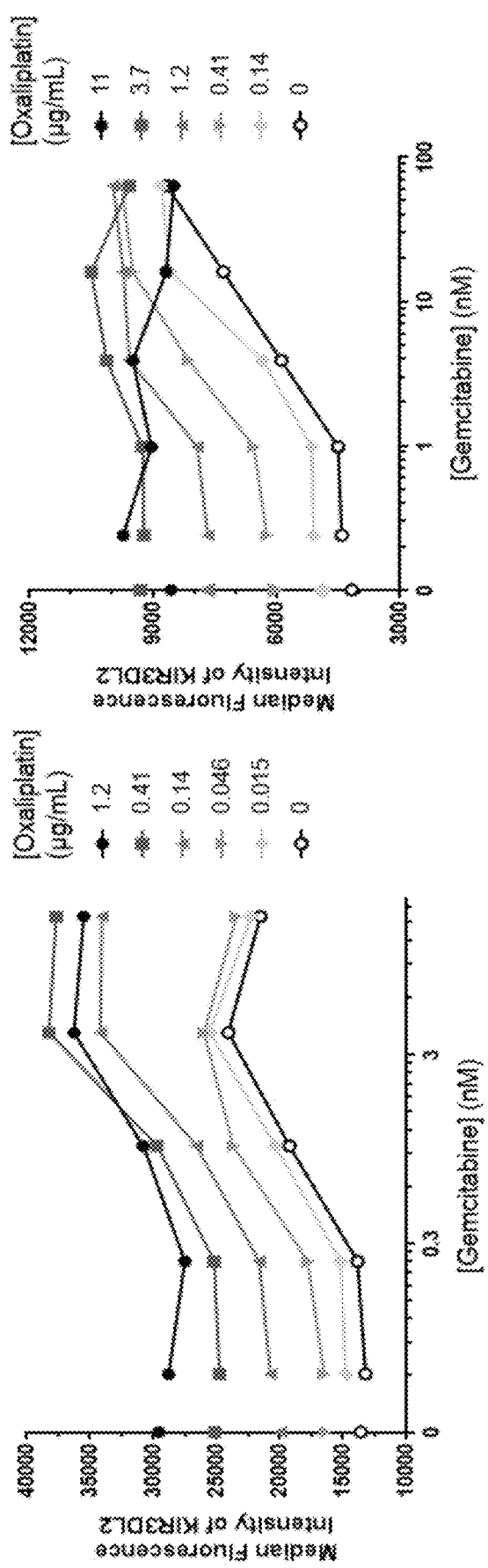
FIG. 2 shows that gemcitabine and oxaliplatin increases cell surface KIR3DL2 expression in tumor cells. RAJI-KIR3DL2 (48 hour incubation) (FIG. 2, left hand panel) or Hut 78 (transfected B-NHL cell line; 24 hour incubation (FIG. 2, right hand panel) were incubated with ascending doses of gemcitabine and oxaliplatin. Median intensity of fluorescence of KIR3DL2 on tumor cell line surface was analyzed by flow cytometry.

Results are shown in FIG. 2. RAJI-KIR3DL2 cells are shown in Panel A (left hand side) and Hut78 cells are shown in Panel B (right hand side. Both oxaliplatin and gemcitabine were found to enhance KIR3DL2 surface expression, on both cell lines, in a dose-dependent fashion, up to a plateau of 2 to 3-fold as compared to baseline (FIG. 2). These figures are representative of two independent experiments. Of note, other chemotherapeutic agents, such as cyclophosphamide, did not increase KIR3DL2 expression in the same experimental conditions.

Altogether, these results support the exploration of the combination of the anti-KIR3DL2 antibody with gemcitabine and oxaliplatin, particularly in relapsed PTCL patients which may have a particular need for improved treatments.

Example 3—In Vivo Efficacy

A xenograft model in the CB17-SCID mouse whereby the immunocompromised mouse strain that retains fully functional NK cells and macrophages. In addition, mouse Fc-receptors effectively bind human Fc, allowing murine effector cells to be recruited by humanized mAb and perform ADCC or ADCP in vivo. The B-NHL cell line RAJI was transfected to stably express KIR3DL2 (RAJI-KIR3DL2), and the transfectants were inoculated ($5\times10^6$ cells) to the SCID mice by IV thereby providing a disseminated tumor model. Initially, individual doses of gemcitabine and oxaliplatin were established in this xenograft model. However, while gemcitabine and oxaliplatin can be used in together in humans, it was not possible to find doses of gemcitabine and oxaliplatin that could be combined to provide active yet be tolerated in these mice. Consequently, anti-KIR3DL2 antibody (lacutamab) was combined with either gemcitabine or oxaliplatin separately.

In this disseminated tumor model (n=9 mice per group), the mice groups were thus treated twice a week with the following:
  isotype control mAb,
  anti-KIR3DL2 antibody (lacutamab),
  gemcitabine (50 mg/kg),
  oxaliplatin (5 mg/kg),
  anti-KIR3DL2 antibody (lacutamab)+gemcitabine (50 mg/kg), or
  anti-KIR3DL2 antibody (lacutamab)+oxaliplatin (5 mg/kg).

Both anti-KIR3DL2 antibody and isotype control were administered at 0.3 µg per injection.

Figure 3:
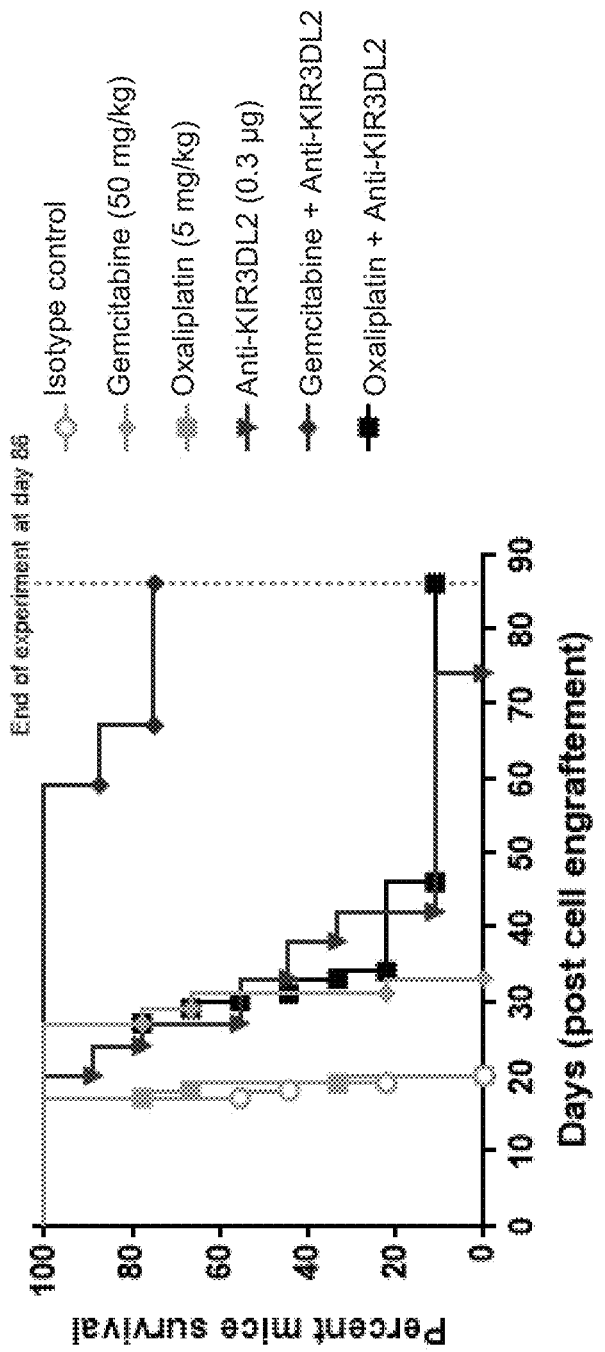
FIG. 3 shows survival of mice (n=9 per group) engrafted IV with Raji-KIR3DL2 and treated twice a week with: with isotype control mAb, IPH4102 (0.3 µg per injection), gemcitabine (50 mg/kg) or oxaliplatin (5 mg/kg), both IPH4102+ gemcitabine or both IPH4102+ oxaliplatin.

Results are shown in FIG. 3. The combination of anti-KIR3DL2 antibody and oxaliplatin was at least as active as anti-KIR3DL2 antibody alone (oxaliplatin had very limited, if any, anti-tumor effect on its own in the model). Interestingly, anti-KIR3DL2 antibody and gemcitabine showed synergistic anti-tumor activity in vivo. Mice treated with anti-KIR3DL2 antibody and gemcitabine had a significantly improved survival as compared to mice treated with each agent separately. The effects displayed above were reproduced in 2 independent experiments, with 9 mice par group each time.

These results, together with in vitro combination data and potential induction of KIR3DL2 by gemcitabine and oxaliplatin, support the therapeutic combination of anti- KIR3DL2 antibodies with gemcitabine and oxaliplatin in TCL patients. While the combination with humanized 2B12 was particularly potent as an anticancer treatment, the ability of gemcitabine and/or oxaliplatin to increase KIR3DL2 expression may also be useful for the purpose of enhancing the anti-tumor of antibodies that alone are less potent than 2B12. The combinations may be particularly effective in relapsed PTCL patients.

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law), regardless of any separately provided incorporation of particular documents made elsewhere herein.

Unless otherwise stated, all exact values provided herein are representative of corresponding approximate values (e.g., all exact exemplary values provided with respect to a particular factor or measurement can be considered to also provide a corresponding approximate measurement, modified by "about," where appropriate).

The description herein of any aspect or embodiment of the invention using terms such as "comprising", "having," "including," or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

We claim:

1. A method for treating a T-cell lymphoma (TCL) in an individual, the method comprising administering to the individual an antibody that binds a KIR3DL2 polypeptide in combination with gemcitabine and oxaliplatin, wherein the antibody comprises the heavy chain CDR1, 2 and 3 of the heavy chain variable region of SEQ ID NO: 32 and the light chain CDR1, 2 and 3 of the light chain variable region of SEQ ID NO: 33.

2. The method of claim 1, wherein gemcitabine is administered at a dose of 800-1000 mg/m² once every two weeks.

3. The method of claim 1, wherein oxaliplatin is administered at a dose of 75-100 mg/m² once every two weeks.

4. The method of claim 1, wherein oxaliplatin is administered at a dose of 75-130 mg/m² once every three weeks.

5. The method of claim 1, wherein the antibody is administered from once per week to once every four weeks.

6. The method of claim 1, wherein the antibody that binds KIR3DL2 polypeptide is administered once per week or the antibody is administered once per week in a first phase followed by a second phase in which the antibody is administered once every two weeks or once per month.

7. The method of claim 6, wherein the antibody is administered at a dose of 1-20 mg/kg or at a flat dose of 750 mg.

8. The method of claim 1, wherein the TCL is a peripheral T cell lymphoma (PTCL), adult T cell leukemia (ATL), enteropathy associated T cell lymphoma (EATL), PTCL-NOS or anaplastic large cell lymphoma (ALCL).

9. The method of claim 1, said method further comprising a step of
a) determining the KIR3DL2 polypeptide status of malignant cells within the individual having a TCL, and
b) upon a determination that the individual has KIR3DL2 polypeptide expressed on the surface of malignant cells, administering to the individual the antibody that binds a KIR3DL2 polypeptide in combination with oxaliplatin and gemcitabine.

10. The method of claim 9, wherein determining whether a KIR3DL2 polypeptide that is expressed on the surface of said malignant cells comprises obtaining from the individual a biological sample that comprises peripheral T cell lymphoma cells, bringing said cells into contact with an antibody that binds a KIR3DL2 polypeptide, and detecting cells expressing KIR3DL2.

11. The method of claim 1, wherein the antibody that has reduced binding to a KIR3DL2 polypeptide having a mutation at residues 160 and/or residue G62, compared to a wild-type KIR3DL2 polypeptide of SEQ ID NO: 1.

12. The method of claim 1, wherein gemcitabine is administered at a dose of 800-1000 mg/m² on days 1 and 8 of a 3 week cycle.

* * * * *